(12) United States Patent
Hayashi et al.

(10) Patent No.: US 7,437,831 B2
(45) Date of Patent: Oct. 21, 2008

(54) LINEAR GUIDE APPARATUS

(75) Inventors: Eiji Hayashi, Maebashi (JP); Soichiro Kato, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/869,328

(22) Filed: Oct. 9, 2007

(65) Prior Publication Data

US 2008/0083123 A1    Apr. 10, 2008

(30) Foreign Application Priority Data

| Oct. 6, 2006 | (JP) | ............................. 2006-274591 |
| Dec. 27, 2006 | (JP) | ............................. 2006-351194 |
| May 25, 2007 | (JP) | ............................. 2007-139183 |

(51) Int. Cl.
*G01B 21/16* (2006.01)
*F16C 33/00* (2006.01)
*B23Q 1/62* (2006.01)

(52) U.S. Cl. ......................................... 33/706; 33/1 M
(58) Field of Classification Search .................... 33/706, 33/707, 708, 1 M; 384/13, 15, 43–45
See application file for complete search history.

(56) References Cited

U.S. PATENT DOCUMENTS

| 5,967,667 | A | 10/1999 | Yatsu | |
| 6,019,513 | A | 2/2000 | Tsukada et al. | |
| 6,155,717 | A | 12/2000 | Michioka et al. | |
| 6,257,766 | B1 | 7/2001 | Agari | |
| 6,290,394 | B1 * | 9/2001 | Obara et al. | ................... 384/13 |
| 6,435,718 | B1 | 8/2002 | Weiss et al. | |
| 6,442,861 | B1 * | 9/2002 | Boge et al. | ..................... 33/706 |
| 6,658,754 | B2 * | 12/2003 | Omi | ............................ 33/706 |
| 6,712,511 | B2 * | 3/2004 | Matsui et al. | ................. 384/45 |
| 7,040,019 | B2 * | 5/2006 | Kaimi et al. | ................... 33/707 |
| 2002/0114544 | A1 * | 8/2002 | Matsui et al. | ................. 384/45 |
| 2007/0189645 | A1 * | 8/2007 | Chen et al. | ..................... 384/13 |
| 2007/0193470 | A1 * | 8/2007 | Mochizuki | .................. 104/287 |
| 2007/0223845 | A1 * | 9/2007 | Kakei et al. | .................... 384/15 |
| 2007/0242906 | A1 * | 10/2007 | Kakei | ........................... 384/15 |
| 2008/0078096 | A1 * | 4/2008 | Matsumura et al. | ........... 33/706 |
| 2008/0083123 | A1 * | 4/2008 | Hayashi et al. | ............... 33/1 M |

FOREIGN PATENT DOCUMENTS

JP         9-112551 A     5/1997

* cited by examiner

*Primary Examiner*—Yaritza Guadalupe-McCall
(74) *Attorney, Agent, or Firm*—Sughrue Mion, PLLC

(57) ABSTRACT

A side seal fixing unit 24, which is made up of a U-shaped pressing member 25 which presses and holds a side seal 20 against a lubricant application member 22, a pivot shaft 26 provided at one end portion of the pressing of the pressing member 25 along a height direction of a guide rail 10 and a support plate 27 which supports rotatably the pressing member 25 via the pivot shafty 26 is provided between an end cap 17 and the lubricant application member 22.

24 Claims, 45 Drawing Sheets

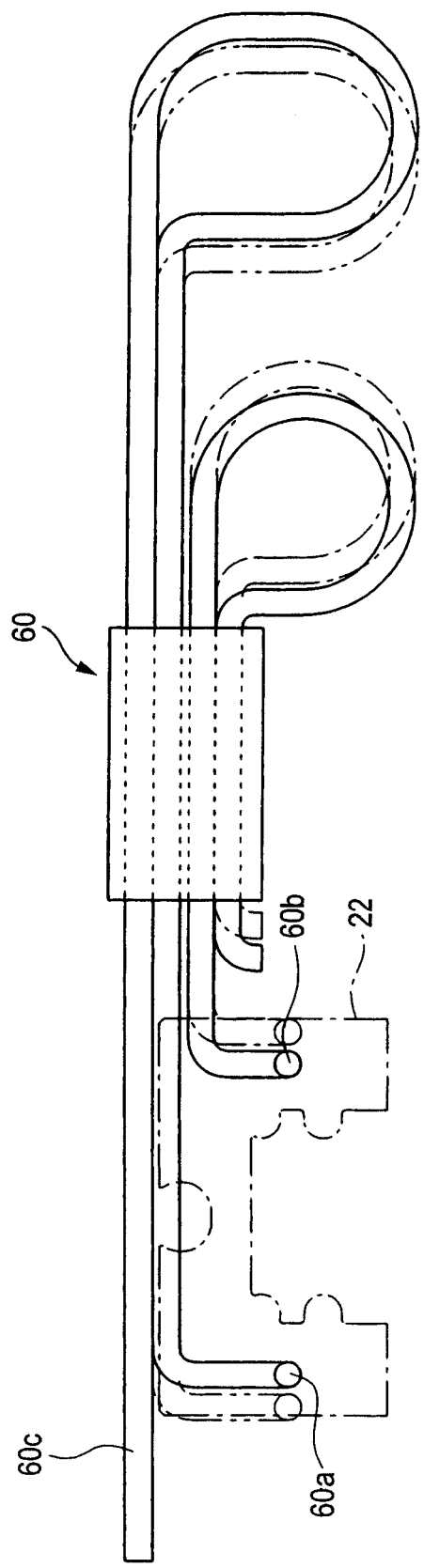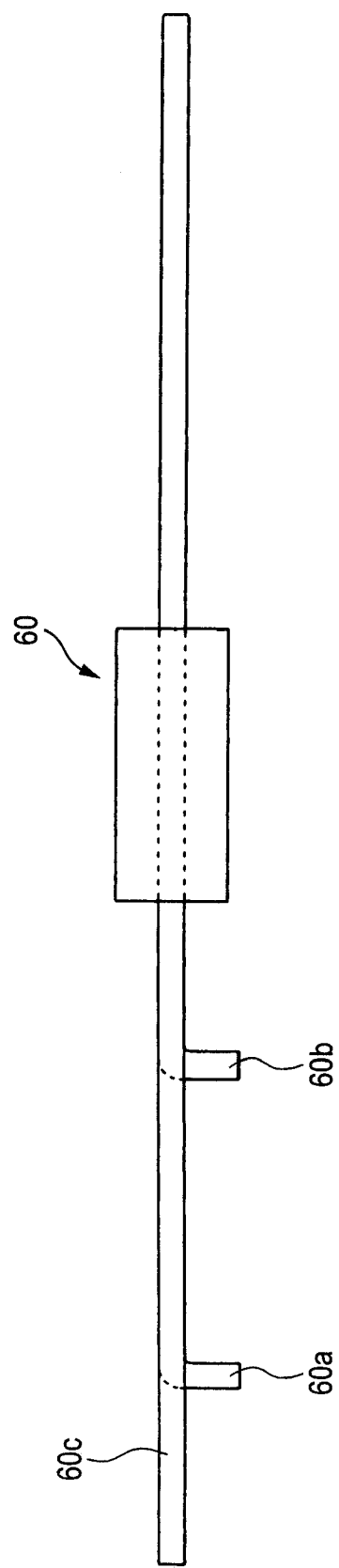

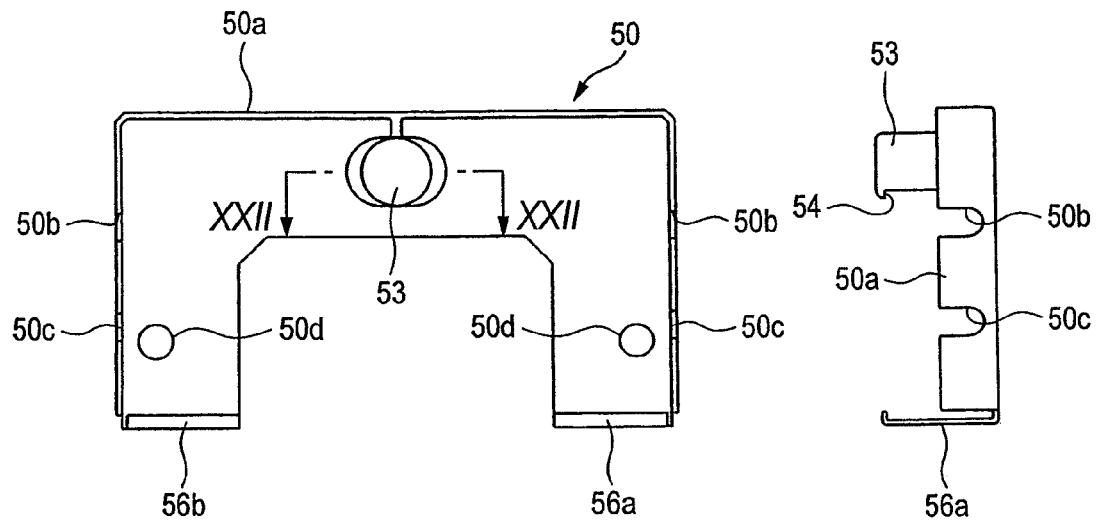
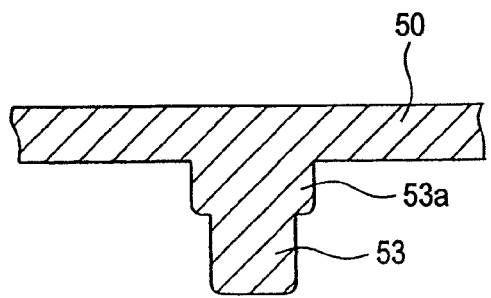

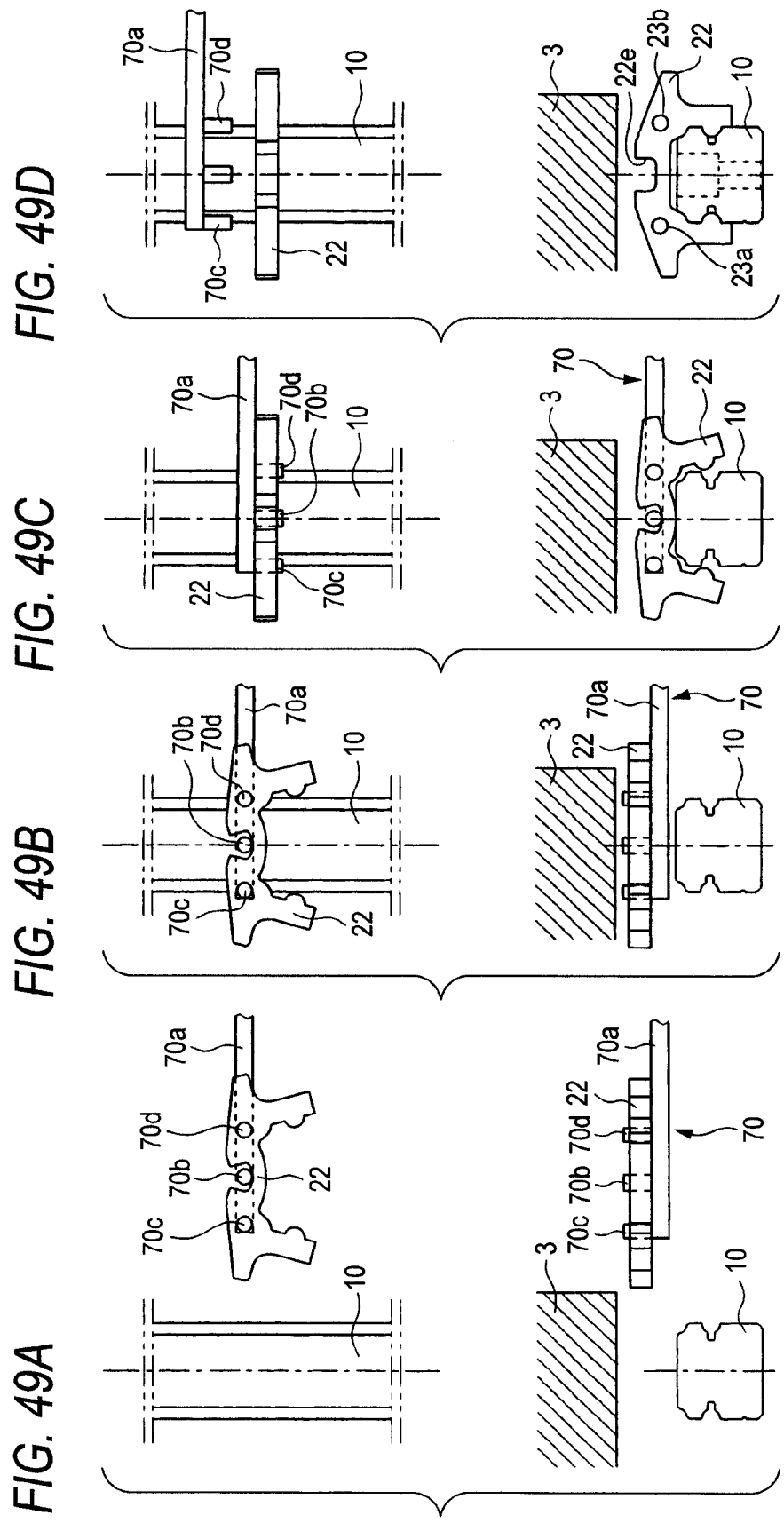

LINEAR GUIDE APPARATUS

BACKGROUND OF THE INVENTION

1. Field of the Invention

The present invention relates to a linear guide apparatus which guides a rectilinearly reciprocating object along its moving direction.

2. Description of Related Art

Among linear guide apparatuses used in machine tools, there is a linear guide apparatus which has a rectilinearly formed guide rail and a slider which moves relatively in a longitudinal direction of the guide rail and has a large number of rolling elements incorporated in an interior thereof. In addition, the slider has a slider main body, and the slider main body is configured to include a bearing having a plurality of rolling element raceway surfaces which face rolling element raceway surfaces formed on left and right side surface portions of the guide rail, a pair of end caps which are mounted on one end and the other end of the bearing, a plurality of return guides incorporated in each of the end caps and the large number of rolling elements, and side seats are provided at end portions of the side caps as seal members for sealing gaps defined between the guide rail and the end caps.

In the linear guide apparatus described above, since the rolling elements roll on the rolling element rolling raceway surfaces when the slider moves relatively in the longitudinal direction of the guide rail, there is caused an inherent problem that lubricant needs to be refilled periodically via a grease nipple in order to prevent the seizing of the rolling elements. Thus, in order to solve the problem, there has been proposed a linear guide apparatus in which plate-shaped lubricant application members each having a lubricant application portion which is made of a polymer material containing a lubricant and is brought into contact with the rolling element raceway surfaces of the guide rail are interposed between the side seals and the end caps, respectively (refer to Japanese Patent Unexamined Publication No. JP-A-09-112551).

In the linear guide apparatus described above, the refill of lubricant is made unnecessary to be carried out in the middle of a period of time while it is in service and hence the lubricant can be supplied to the rolling element raceway surfaces and the rolling elements for a long period of time. However, in the event that the amount of lubricant contained in the lubricant application member is decreased to a low level, the lubricant application member in use needs to be replaced with another lubricant application member, although the frequency at which such a replacement occurs is not high. Generally, the side seals and the lubricant application members are fixed to the end caps and the bearing with a plurality of fixing screws. However, when replacing the lubricant application member, the fixing screws need to be removed from the end caps. Due to this, with the linear guide apparatus that has been described above, there has been an inherent problem that many labor hours and much time are required to replace lubricant application members.

In addition, as is disclosed in the JP-A-09-112551, the lubricant application member and the like are fixed in arm portions in a width direction thereof with a plurality of fixing screws from an end face side thereof. Incidentally, there may be a case where the linear guide apparatus described above is used as a guiding member in a slide table apparatus. In particular, as the configuration of such a slide table apparatus, a configuration is used in many cases in which two guide rails are used, two or more sliders are combined with each guide rail, the two guide rails are fixed to a base in parallel to each other, and the respective sliders are fixed to a lower surface of a slide table. In this case, as is shown in FIG. 58, in the event that a slide table b of a slider table system is fixed to an upper surface portion of a slider main body a, when attempting to replace a lubricant application member c whose lubricant content is low with a new lubricant application member, it becomes extremely difficult or impossible to remove and refasten fixing screws disposed, in particular, in a portion hidden by a lower side of the slide table b (in particular, in the case of the slider shown in FIG. 58, a portion of a left-hand side lubricant application member c where a far-side arm portion thereof lies). Therefore, since the lubricant application member c cannot be removed from a guide rail d in such a state, the lubricant application member c needs to be replaced after the slide table b has been removed from the slider main body a. Because of this, many works and much time have been required to remove the slide table b.

In addition, it is considered to reduce the frequency at which lubricant application members are replaced or to obviate the necessity of replacement thereof by separately providing a tank or the like and a fluid supply apparatus which are necessary to refill lubricant to the lubricant application members. However, when attempting to mount the tank or the like externally, an extra space will become necessary for the tank or the like. Further, when attempting to provide the tank or the like within the slider main body in order to save space, deterioration in strength of the slider and a complex construction will be called for. In addition, the provision of the fluid supply apparatus will also result in calling for complex equipment including piping and the like.

SUMMARY OF THE INVENTION

The invention has been made in view of the problems that have been described above. An object thereof is to provide a linear guide apparatus which can facilitate the replacement of lubricant application members without requiring many labor hours and much time. In addition, another object of the invention is to provide a slide table apparatus which can facilitate the replacement of lubricant application members which is retained at an end portion of a slider of a linear guide apparatus. Furthermore, a further object of the invention is to provide a lubricant application member replacement jig which can facilitate the replacement of lubricant application members which is retained at an end portion of a slider of a linear guide apparatus.

With a view to attaining the objects described above, according to a first aspect of the invention, there is provided a linear guide apparatus including:

a guide rail;

a slider which moves relatively in a longitudinal direction of the guide rail and includes a slider main body;

a lubricant application member containing a lubricant and provided at an end portion of the slider main body; and a pressing member provided on a front side of the lubricant application member, wherein the pressing member is brought into engagement with a side surface of the slider so that the lubricant application member is fixed to the slider.

According to a second aspect of the invention, there is provided a linear guide apparatus including:

a guide rail; and a slider which moves relatively in a longitudinal direction of the guide rail, wherein the slider comprises:

a slider main body having an end cap;

a side seal which seals a gap between the guide rail and the end cap;

a lubricant application member interposed between the side seal and the end cap;

a side seal fixing unit disposed between the end cap and the lubricant application member, and including:

pressing member which presses the side seal against the lubricant application member;

a pivot shaft provided at one end portion of the pressing member along a height direction of the guide rail; and a support plate which rotatably supports the pressing member via the pivot shaft.

According to a third aspect of the invention, it is preferable that the support plate is fixed to the end cap with a plurality of bolts.

According to a fourth aspect of the invention, it is preferable that the support plate includes a recessed portion on a side surface portion thereof, the pressing member has a locking projection at an opposite end side of the pivot shaft so as to fit in the recessed portion.

According to a fifth aspect of the invention, there is provides a linear guide apparatus including:

a guide rail; and a slider which moves relatively in a longitudinal direction of the guide rail, wherein the slider comprises:

a slider main body having an end cap;

a side seal which seals a gap between the guide rail and the end cap;

a lubricant application member interposed between the side seal and the end cap;

a side seal fixing unit including:

a pressing member which presses the side seal against the lubricant application member and includes raised portions or recessed portions; and a lubricant application member receiving member provided between the end cap and the lubricant application member, wherein the lubricant application member receiving member includes locking portions which are brought into engagement with the raised portions or recessed portions of the pressing member and are provided on left and right side surface portions.

According to a sixth aspect of the invention, there is provided a linear guide apparatus including:

a guide rail;

a slider provided so as to move in a direction in which the guide rail extends, the slider including:

a slider main body;

a seal member disposed at an end portion of the slider main body in a moving direction thereof; and a lubricant application member interposed between the seal member and the slider main body for application of a lubricant;

a seal retaining member which is interposed between the slider main body and the lubricant application member and retains the seal member against the slider main body; and a seal pressing member which presses the seal member from an outside of the seal retaining member, wherein the seal pressing member is brought into contact with the seal member over a surface, or at a plurality of points or lines which are not aligned in a straight line.

According to a seventh aspect of the invention, it is preferable that the seal retaining member including:

a projecting portion which projects substantially in a moving direction of the slider while avoiding the lubricant application member and the seal member; and an elastic projecting portion which projects substantially in the moving direction of the slider while avoiding the lubricant application member and the seal member and has elasticity, wherein the seal pressing member and the seal member are retained by bringing the seal pressing member into engagement with the projecting portion by virtue of the elasticity of the elastic projecting portion.

According to an eighth aspect of the invention, it is preferable that the seal retaining member including an elastic projecting portion which projects substantially in a moving direction of the slider while avoiding the lubricant application member and the seal member and has elasticity, the seal pressing member has a projecting portion which projects substantially in the moving direction of the slider while avoiding the lubricant application member and the seal member, and the seal pressing member and the seal member are retained by bringing the projecting portion of the seal pressing member into engagement with the slider main body by virtue of the elasticity of the elastic projecting portion.

According to a ninth aspect of the invention, the linear guide apparatus as set forth in the seventh aspect of the invention, preferably, the linear guide apparatus includes a seal pressing member fixing member which projects substantially in a moving direction of the slider from the slider main body while avoiding the lubricant application member and the seal member to be brought into engagement with the seal pressing member.

According to a tenth aspect of the invention, it is preferable that the seal pressing member is fixed to the seal retaining member by the seal pressing member fixing member which is provided between the slider main body and the seal pressing member.

According to an eleventh aspect of the invention, it is preferable that the seal pressing member fixing member includes:

a pair of left and right plate-shaped elastic pieces which are elastically deformable in a width direction of the slider; and claw portions at distal end portions of the plate-shaped elastic pieces which are brought into engagement with left and right side surface portions of the seal pressing member.

According to a twelfth aspect of the invention, it is preferable that the seal pressing member includes a positioning portion which fits on a projection which projects from the seal retaining member for positioning the seal pressing member in such a state that the seal pressing member floats above an upper surface of the guide rail.

According to a thirteenth aspect of the invention, it is preferable that a cross section of the projection is a square shape.

According to a fourteenth aspect of the invention, there is provided a linear guide apparatus including:

a guide rail;

at least one slider provided so as to move in a direction in which the guide rail extends, the slider including:

a slider main body; and a lubricant application member which is disposed at an end portion of the slider main body in a moving direction thereof and contains a lubricant;

a lubricant application member retaining unit including:

a cover member which is fixed to an end portion of the slider main body and accommodates therein the lubricant application member;

a plate-shaped pressing member provided on a front side of the cover member; and a pivot shaft which supports pivotally an upper end portion of the pressing member so that the upper end portion of the pressing member rotates freely relative to the cover member.

According to a fifteenth aspect of the invention, it is preferable that the pivot shaft is disposed at right angles to the direction in which the guide rail extends and horizontally relative to an upper surface portion of the guide rail and the lubricant application member retaining unit includes a pressing member fixing unit which fixes a lower end portion of the pressing member to the cover member.

According to a sixteenth aspect of the invention, it is preferable that a horizontal distance from the center of the pivot shaft to a front surface of the pressing member in such a state that the pressing member is closed is made smaller than a vertical distance from the center of the pivot shaft to an upper surface of the slider main body.

According to a seventeenth aspect of the invention, it is preferable that the slider main body includes:

a bearing having arm portions lying on left and right sides of the guide rail; and a large number of rolling elements which are incorporated between rolling element rolling grooves formed on inner surfaces of the arm portions of the bearing and rolling element rolling grooves formed on left and right side surface portions of the guide rail, wherein the lubricant application member includes:

a pair of left and right rolling groove slide contact portions which are brought into slide contact with the rolling element rolling grooves formed on the left and right side surface portions of the guide rail; and a connecting portion which connects together upper end portions of the rolling groove slide contact portions at a position above the guide rail.

According to an eighteenth aspect of the invention, it is preferable that the connecting portion of the lubricant application member has a relief relative to the upper surface portion of the guide rail.

According to a nineteenth aspect of the invention, there is provided a slide table apparatus including:

a base;

at least two sets of linear guide apparatuses which are disposed in parallel to each other on the base and each of which includes:

a guide rail; and at least one slider which moves relatively in a direction in which the guide rail extends; and a slide table to which upper surfaces of the sliders of the linear guide apparatuses are fixed and is movably guided relative to the base, wherein the linear guide apparatuses are a linear guide apparatus as set forth in the eighteenth aspect of the invention According to a twentieth aspect of the invention, it is preferable that the linear guide apparatuses are the linear guide apparatus as set forth in the fourteenth aspect of the invention, and a horizontal distance from the center of the pivot shaft to a front surface of the pressing member in such a state that the pressing member is closed is made smaller than a vertical distance from the center of the pivot shaft to a lower surface of the slide table.

According to a twenty-first aspect of the invention, there is provided a lubricant application member replacement jig used when a lubricant application member as set forth in the eighteenth aspect of the invention is replaced, including:

at least two engagement portions which are brought into engagement with the lubricant application member and elastically deform the lubricant application member in such a manner as to be freely pushed in or pulled out relative to the guide rail in a vertical direction.

According to a twenty-second aspect of the invention, it is preferable that the engagement portions include a pair of left and right pins, and the lubricant application member replacement jig further includes a pair of operation members which operate to open and close the pair of pins in a width direction of the lubricant application member.

According to a twenty-third aspect of the invention, it is preferable that the engagement portions include two pins which fit, respectively, in two pin insertion holes provided in advance in the lubricant application member, and a space between the pins is smaller than a space between the pin insertion holes.

According to a twenty-fourth aspect of the invention, it is preferable that an engagement pin which is brought into engagement with a notched portion formed in a central portion on an upper surface of the lubricant application member is provided between the two pins.

According to the first to fifth aspects of the invention, since it is not required for the bolts to be removed when the lubricant application member whose lubricant content is decreased to a low level is replaced with a new one, the replacement of the lubricant application members can be facilitated without requiring many man hours and much time.

According to the sixth to thirteenth aspects of the invention, in addition to the advantage described above, since the seal pressing member is brought into contact with the seal member over surface or at the plurality of points which are not aligned in the straight line, a decrease in the sealing performance of the seal member can be prevented which would otherwise be caused by a deviation in the position of the seal member such as a tilt towards the moving direction of the slider due to a frictional force being generated in the contact portion between the guide rail and the seal member.

According to the fourteenth to sixteenth aspects of the invention, the lubricant application member can be retained at the end portion of the slider without using fastening screws which pass through the lubricant application member. Consequently, the replacement of lubricant application members can be facilitated without requiring many man hours and much time. In addition, since lubricant application members can be replaced from either side of the slider, the replace work can be facilitated further. Moreover, the lubricant application member can be retained in a stable state. In addition, no tank or the like needs to be provided for refill of lubricant.

According to the nineteenth to twenty-fourth aspects of the invention, when the lubricant application member whose lubricant content is decreased to a low level is replaced with a new one, even in the event that the lubricant application member needs to pushed in or pulled out from a narrow gap as in the case where for example, the lubricant application member is incorporated in the slide table apparatus, since the slide table does not have to be removed from the slider main body, the replacement of lubricant application members can be facilitated without requiring many man hours and much time.

BRIEF DESCRIPTION OF THE DRAWINGS

FIGS. 20A and 20B are drawings showing an example of a jig which is used when removing the lubricant application member from an interior of a lubricant application member accommodation case.

FIGS. 21A and 21B are front and side views of the lubricant application member accommodation case;

FIG. 22 is a sectional view taken along the line XXII-XXII in FIG. 21;

FIG. 49 are drawings showing a procedure for implementing replacing work of the lubricant application member using the lubricant application member replacement jig shown in FIG. 40;

DETAILED DESCRIPTION OF THE PREFERRED EMBODIMENTS

Figure 1:
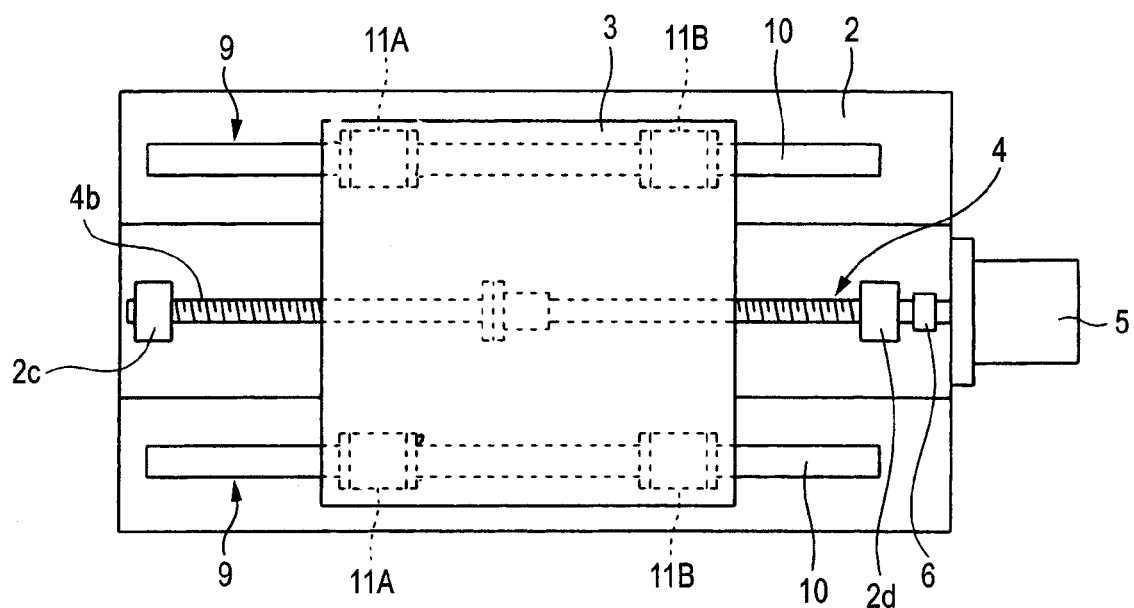
FIG. 1 is a plan view of a slide table apparatus.

Hereinafter, embodiments of the invention will be described based on the drawings.

FIGS. 1 to 11 are drawings which show a first embodiment of the invention, and slide table apparatus 1 includes a base 2 and a slide table 3.

The slide table 3 has a lower surface portion 3a (refer to FIG. 2) which faces an upper surface portion of the base 2, and a nut 4a for a ball screw 4 which drives to feed the slide table 3 is fixed to the lower surface portion 3a of the slide table 3.

The ball screw 4 includes a screw shaft 4b which is brought into thread engagement with the nut 4a via a large number of balls (not shown). This screw shaft 4b is rotatably supported in locations near to end portions thereof by bearings 2c, 2d which are provided on the base 2, and a motor shaft of a ball screw driving motor 5 (refer to FIG. 1) for driving the screw shaft 4b is connected to one end portion of the screw shaft 4b via a coupling 6.

The ball screw driving motor 5 is fixed to the base 2, and a plurality of linear guide apparatuses 9 for guiding the side table 3 in an axial direction of the ball screw 4 are placed in parallel to each other on an upper surface portion 2a of the base 2. Note that although the combination of the ball screw and the motor is used as a driving mechanism for the slide table 3, in place of this combination, other types of driving mechanisms including, for example, a linear motor may be used as required. Furthermore, the invention can be applied to a slide table apparatus having no driving mechanism.

The linear guide apparatus 9 includes, as is shown in FIG. 1, a guide rail 10 and sliders 11A, 11B which move relatively in a longitudinal direction of the guide rail 10, and a large number of spherical rolling elements 12 (refer to FIG. 3) are incorporated in an interior of each of the sliders 11A, 11B.

The sliders 11A, 11B each include a bearing 15 having rolling element rolling grooves 16 which face rolling element rolling grooves 13 (refer to FIG. 3) formed in two rows on each of left and right side surface portions of the guide rail 10, a pair of end caps 17, 17 (refer to FIG. 4) mounted at one end and the other end of the bearing 15 and return guides (not shown) incorporated more than one in each of the end caps 17, 17. A slider main body is made up of the bearing 15, the end caps 17, 17, the return guides and the large number of rolling elements 12. The sliders 11A, 11B are each made up of, in addition to the slider main body, side seals 20, lubricant application members 22 and side seal fixing unit 24, which will all be described later, as well as other components which are added as required (for example, seal members other than the side seals, separators and the like). A plurality of (four, for example) threaded holes 18 (refer to FIG. 4) are formed in an upper surface portion of the bearing 15. These threaded holes 18 are adapted to brought into thread engagement with slide table fixing bolts 19 (refer to FIG. 3), and the slide table 3 is fixed to the upper surface portion of the bearing by means of a plurality of side table fixing bolts 19.

In addition, the sliders 11A, 11B each has a pair of side seals 20, 20 (refer to FIG. 4) which seal gaps between the guide rail 10 and the end caps 17, respectively, and plate-shaped lubricant application members 22 (refer to FIG. 5) are provided between the side seals 20, 20 and the end caps 17, respectively, for applying a lubricant to the rolling element rolling grooves 13 on the guide rail 10.

The rolling elements 12 are made to roll on groove surfaces of the rolling element rolling grooves 13, 16 in association with relative movement of the sliders 11A, 11B. The rolling elements 12 which have finished rolling the groove surfaces of the rolling element rolling grooves 13, 16 are made to change their directions in rolling element direction changing paths (not shown) formed between the end cap 17 and the return guides. Thereafter, the rolling elements 12 are introduced into rolling element return passages 21 (refer to FIG. 3) which are formed along the axial direction of the guide rail 10 within the bearing 15.

The lubricant application member 22 is formed substantially into the same shape as that of the side seal 20. In addition, the lubricant application member 22 is made up of rolling groove slide contact portions (arm portions) 22a, 22b which are brought into slide contact with the rolling element rolling grooves 13 formed on the left and right side surface portions of the guide rail 10 and a connecting portion 22c which connects together upper end portions of the rolling groove slide contact portions (arm portions) 22a, 22b in a position above the guide rail 10. Four arc-shaped projections 22d (refer to FIG. 6) are provided on the rolling groove slide contact portions (arm portions) 22a, 22b of the lubricant application member 22 as rolling groove contact portions which are brought into slide contact with the rolling element rolling grooves 13 on the guide rail 10, so that lubricant is designed to be supplied from these arc-shaped projections 22d to the rolling element rolling grooves 13 on the guide rail 10. Note that while the lubricant application member 22 is described as being brought into contact with the guide rail 10 only at these arc-shaped projections 22d, the lubricant application member 22 may be brought into contact with other portions than the rolling element rolling grooves on the side surface portions of the guide rail 10. In addition, a relief 71 (refer to FIG. 6) is provided on the connecting portion 22c relative to an upper surface portion of the guide rail 10, so as to attempt to facilitate the replacement of lubricant application members 22, which will be described later. Furthermore, pin insertion holes 23, into which pins of a lubricant application member replacement jig (will be described later) are inserted, are provided open in the rolling groove slide contact portions 22a, 22b of the lubricant application member 22. In addition, the lubricant application member 22 is made of a polymer material (for example, polyurethane rubber, polyolefin-based resin or the like) which contains a lubricant such as a synthetic oil of, for example, poly-alpha olefin (PAO) or mineral oil, and a side seal fixing unit 24 (refer to FIGS. 4 and 5) for fixing the side seal 20 to the end cap 17 is provided between the lubricant application member 22 and the end cap 17.

The side seal fixing unit 24 has a U-shaped pressing member 25 (refer to FIGS. 7 and 8) which presses the side seal 20 against the lubricant application member 22, and a pivot shaft 26 is provided at one end portion of the pressing member 25 in such a manner as to project therefrom along a height direction of the guide rail 10. In addition, the side seal fixing unit 24 has a support plate 27 which rotatably supports the pressing member 25 via the pivot shaft 26 and a plurality of fixing screws 28 for fixing the support plate 27 together with the end cap 17 to the bearing 15. Further, a recessed portion 30 is provided on a side surface portion of the support plate 27 in such a manner that a locking projection 29 (refer to FIG. 8) provided on the other end portion of the pressing member 25, that is the opposite end portion to the pivot shaft 26, is allowed to fit therein. In addition, a cylindrical portion 32 is provided on the support plate 27 in such a manner as to project therefrom so that the cylindrical portion 32 fits in an arc-shaped notched portion 22e (refer to FIG. 6) which is formed in a central portion of an upper end of the lubricant application member 22. Further, a cover plate 33 is formed integrally with the support plate 27 in such a manner as to cover an upper surface portion, side surface portions and a lower surface portion of the lubricant application member 22. Note that in FIG. 7, reference numeral 27a denotes a through hole through which the fixing screw 28 passes.

This pressing member 25 is preferably formed by resilient material so as to resiliently press the side seal 20 against the lubricant application member 22.

Figure 4:
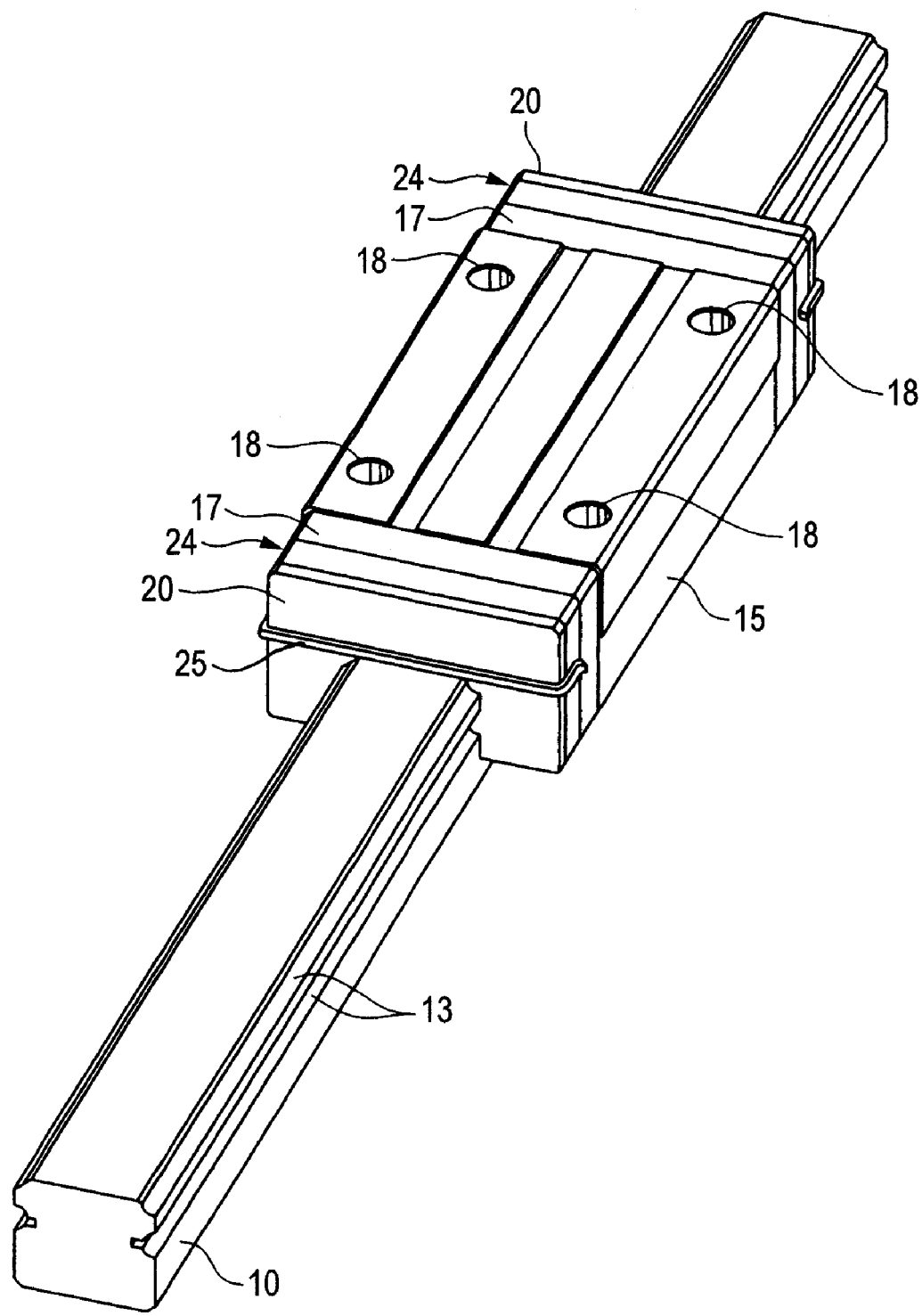
FIG. 4 is a perspective view of the linear guide apparatus shown in FIG. 2.
Figure 5:
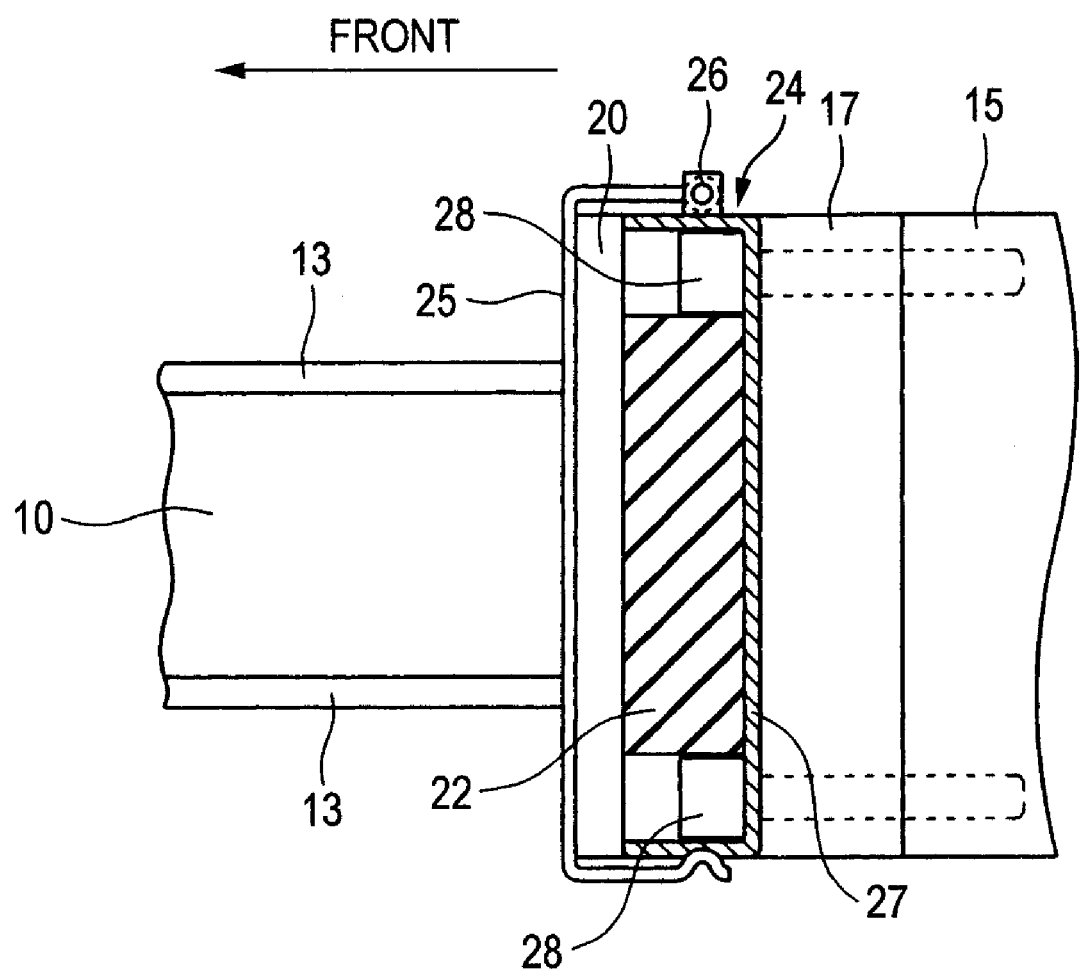
FIG. 5 is a plan view showing part of the linear guide apparatus according to the first embodiment of the invention.
Figure 6:
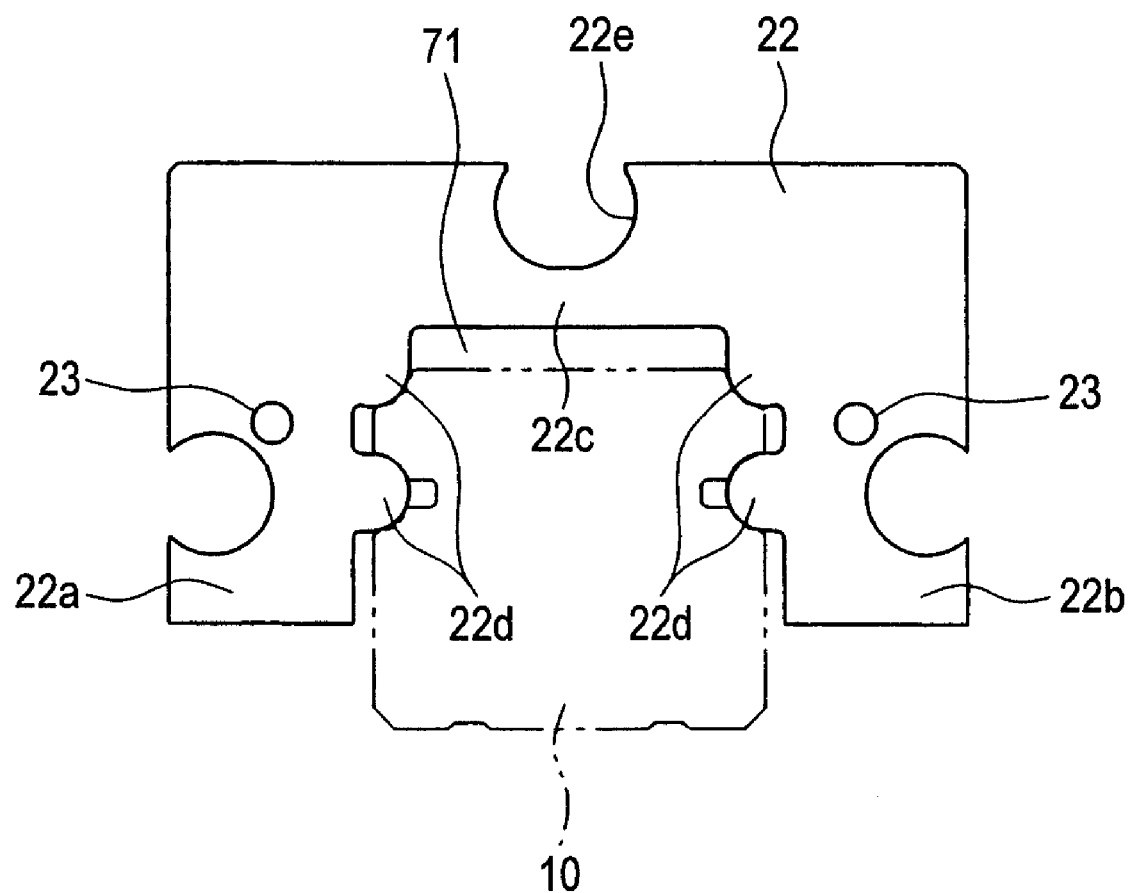
FIG. 6 is a front view of a lubricant application member shown in FIG. 5.
Figure 7:
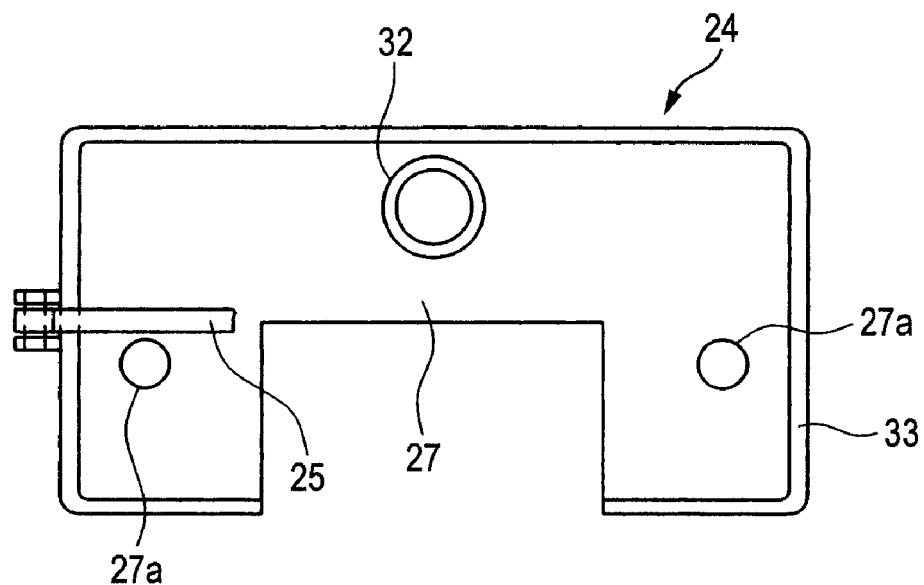
FIG. 7 is a front view of a side seal fixing unit shown in FIG. 4.
Figure 8:
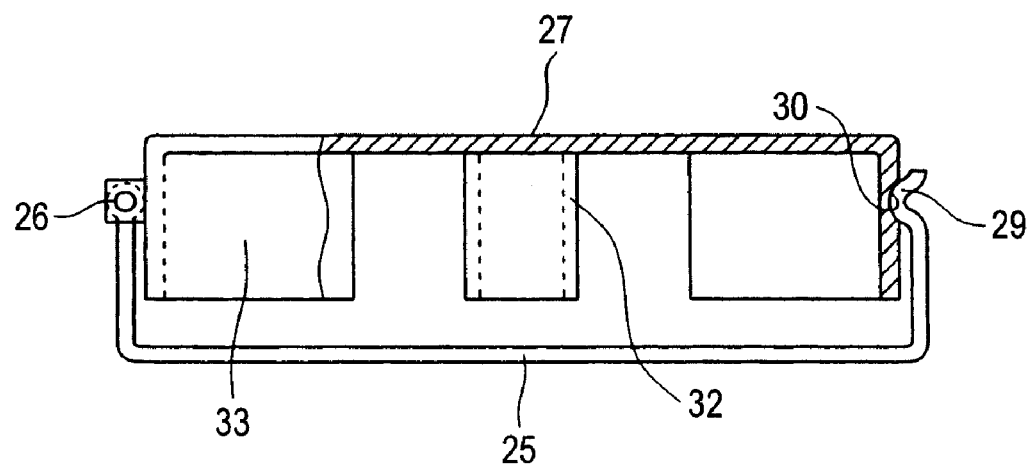
FIG. 8 is a partially sectioned plan view of the side seal fixing unit shown in FIG. 5.

Further, as shown in FIGS. 4 and 5, the pressing member 25 is provided on a front side of the lubricant application member 22. That is, the pressing member 25 is provided on a moving direction end side of the lubricant application member 22.

Figure 9A:
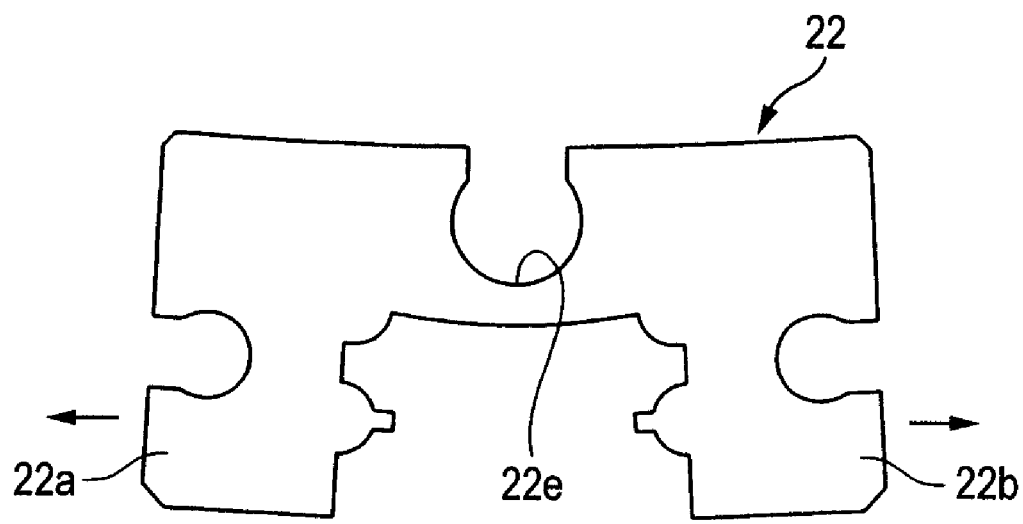
FIGS. 9A and 9B are drawings which explain the function of a cylindrical portion provided on a support plate of the side seal fixing unit.
Figure 9B:
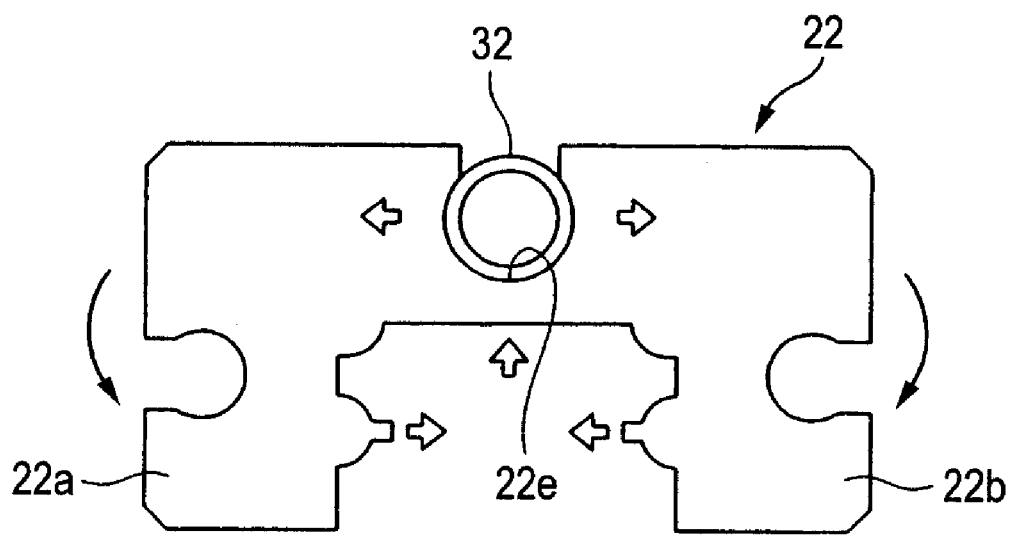

The cylindrical portion 32 is formed slightly larger in diameter than the arc-shaped notched portion 22e, so that the lubricant application member 22 is elastically deformed from a state shown in FIG. 9A to a state shown in FIG. 9B by the cylindrical portion 32 fitting in the arc-shaped notched portion 22e.

Figure 10:
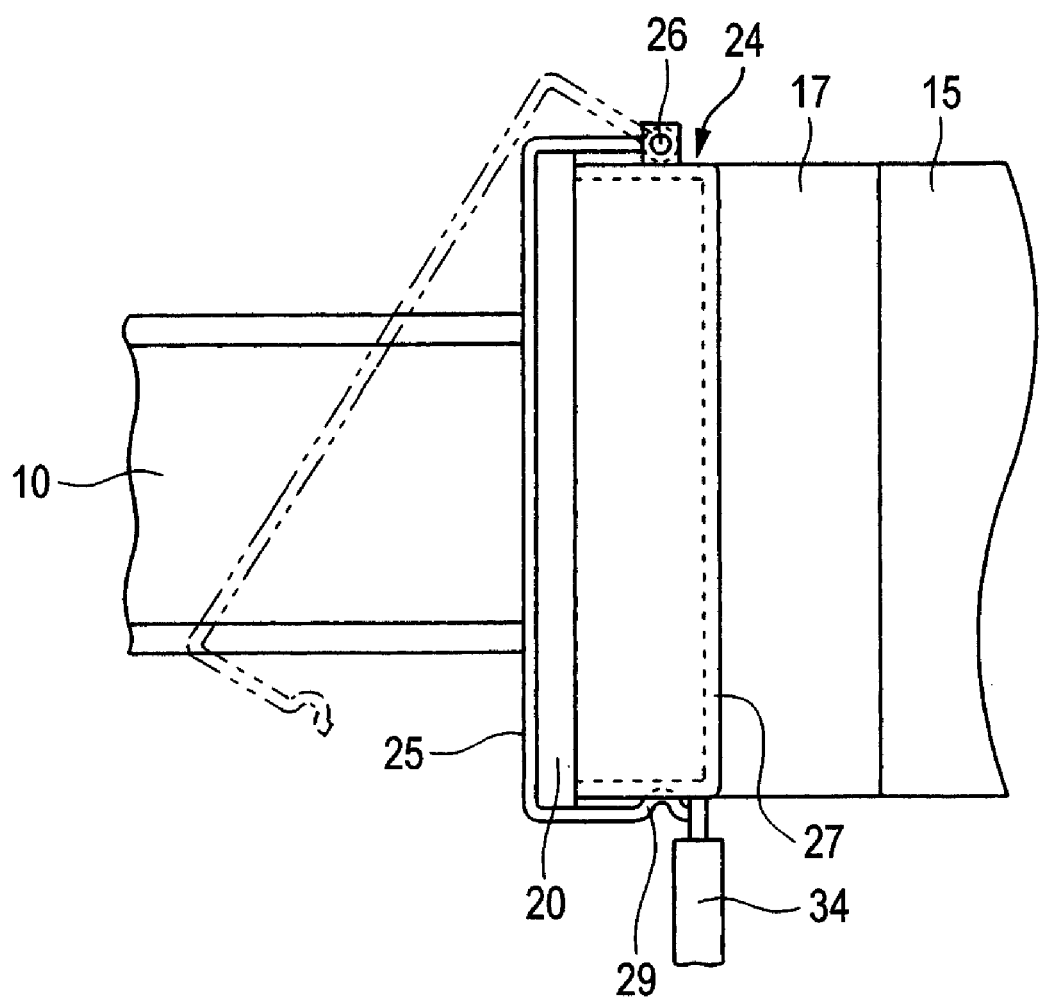
FIG. 10 is a drawing which explains the function of the linear guide apparatus according to the first embodiment of the invention.
Figure 11:
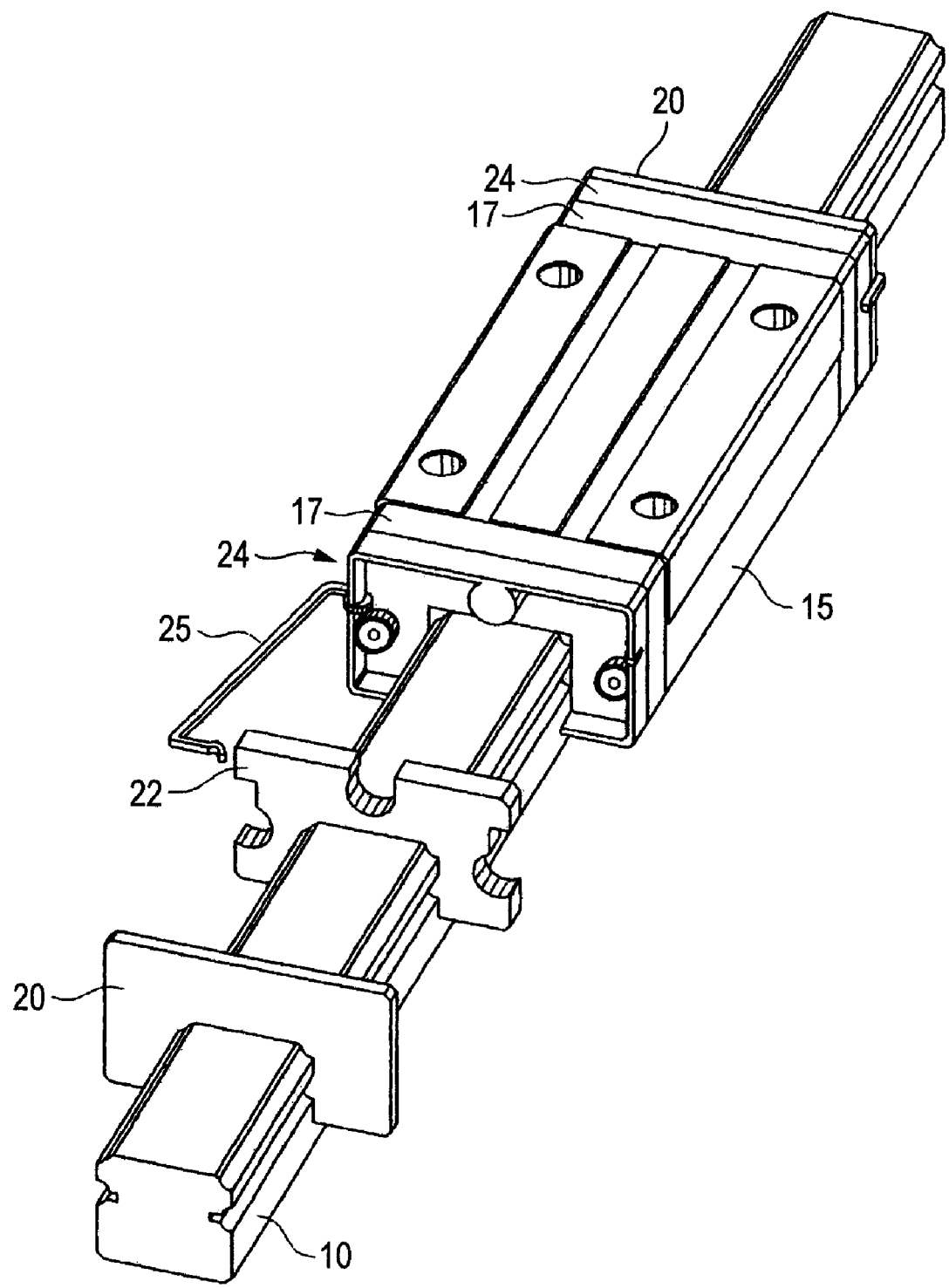
FIG. 11 is a drawing which explains a procedure for replacing the lubricant application member of the linear guide apparatus according to the first embodiment of the invention.

In the configuration that has been described heretofore, for example, as is shown in FIG. 10, when a distal end portion of a rod-shaped jig 34 is made to approach the locking projection 29 provided at the end portion of the pressing member 25, so as to move the locking projection 29 of the pressing member 25 to the left as seen in FIG. 10 by the rod-shaped jig 34, the engagement between the locking projection 29 and the recessed portion 30 is released. Accordingly, the side seal 20 and the lubricant application member 22 are made free relative to the side seal fixing unit 24. Consequently, when the lubricant application member 22 whose lubricant content is decreased to a low level is attempted to be replaced with a new one, the necessity of removing bolts is obviated by releasing the engagement between the locking projection 29 provided at the end portion of the pressing member 25 and the recessed portion 30 provided on the side surface portion of the support plate 27, thereafter, as is shown in FIG. 11, moving the side seal 20 in a direction in which the side seal 20 moves away from the end cap 17. Therefore, the replacement of the lubricant application member 22 with the new one can be facilitated without requiring many labor hours and much time. In addition, on both the sliders 11A, 11B, in the event that the side seal fixing unit 24 is provided in such a manner that the locking projection 29 is disposed transversely outwards of the slide table apparatus 1, the release of the engagement is preferably enabled easily without using the jigs.

Figure 12A:
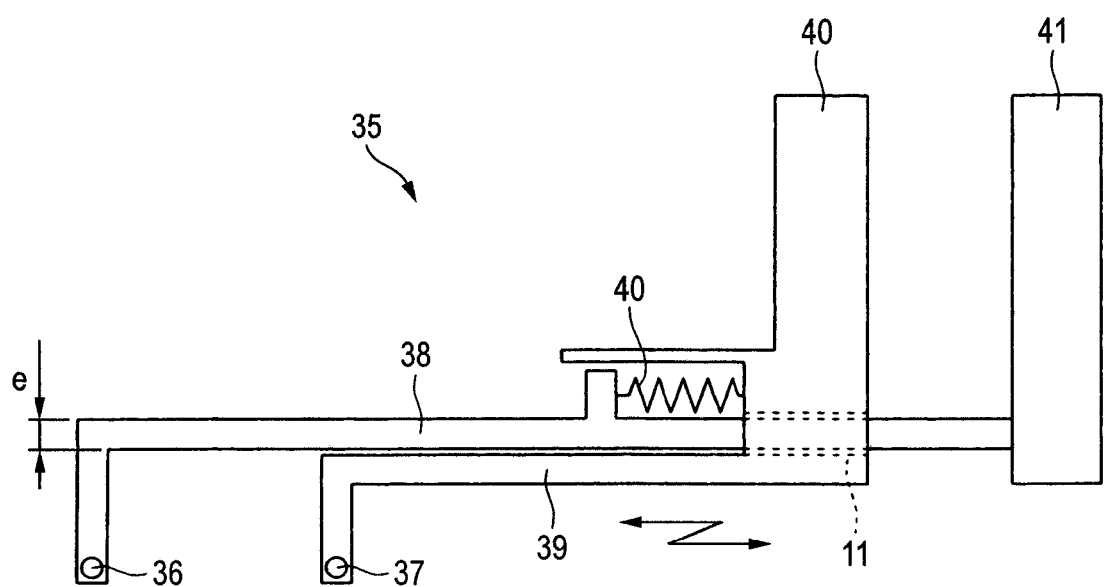
FIGS. 12A and 12B are drawings showing an example of a lubricant application member replacement jig which is used when replacing lubricant application members.
Figure 12B:
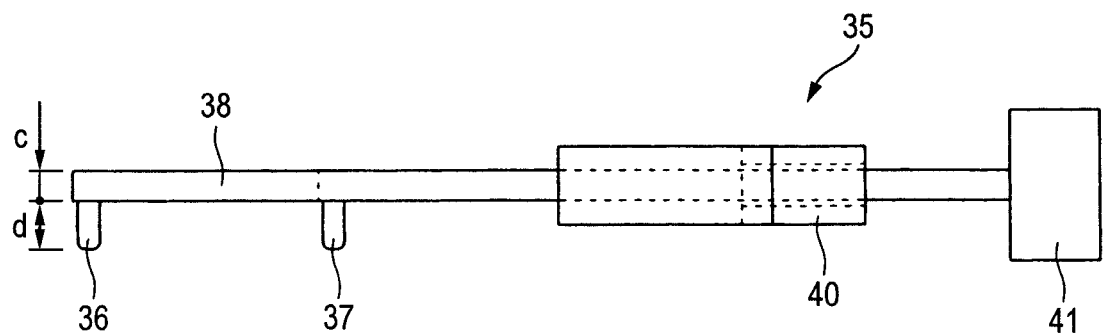

Next, an example of the lubricant application member replacement jig that is used when the lubricant application member 22 is replaced is shown in FIG. 12. A lubricant application member replacement jig 35 shown in the figure includes pins 36, 37 which are inserted into the pin insertion holes 23 (refer to FIG. 6) as engaged portions which are provided in the arm portions 22a, 22b of the lubricant application member 22 and operation members 38, 39 which operate to open and close the pins 36, 37 in a width direction of the lubricant application member 22, and handle portions 40, 41 are provided at proximal end portions of the operation members 38, 39, respectively, which move the pins 36, 37 against the spring force of a spring member 40 in a direction in which they move away from each other.

Figure 13A:
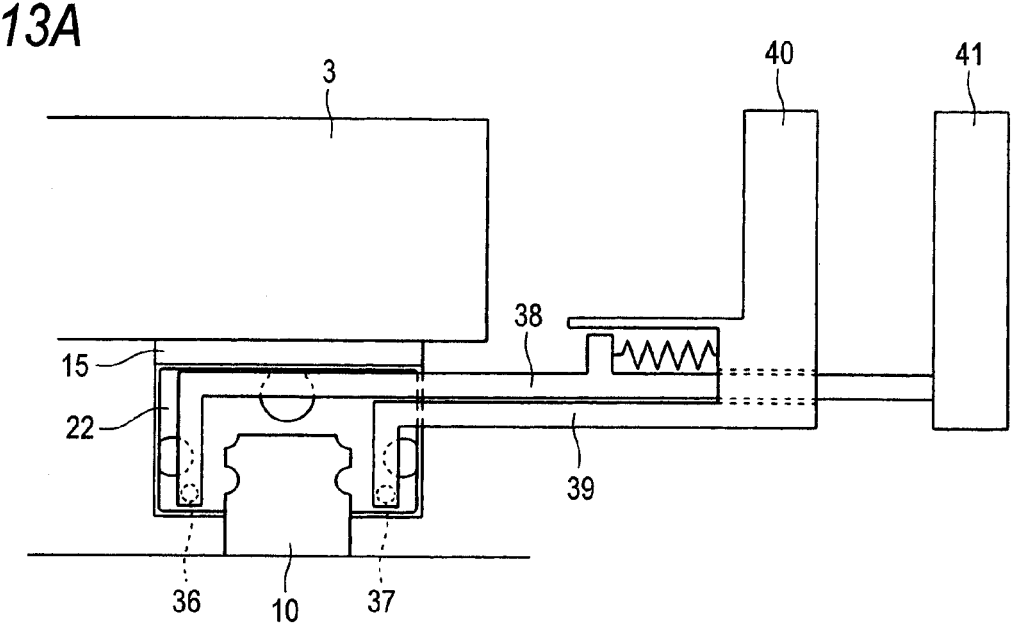
FIGS. 13A and 13B are drawings which explain a method of using the lubricant application member replacement jig shown in FIG. 12.
Figure 13B:
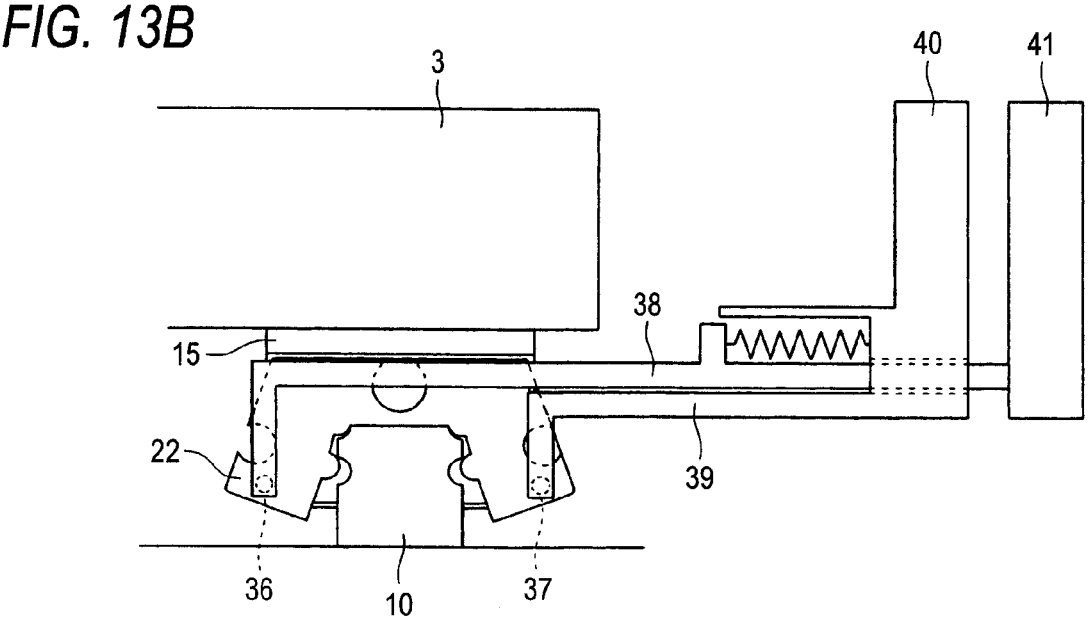

In the configuration that has been described above, as is shown in FIG. 13A, at first, the pins 36, 37 of the lubricant application member replacement jig 35 are inserted into the pin insertion holes 23 of the lubricant application member 22. Thereafter, the pins 36, 37 are moved in the direction in which they move away from the each other by operating the operation members 38, 39. Then, the lubricant application member 22 is, as is shown in FIG. 13B, deformed elastically, whereby the arc-shaped projecting portions 22d of the lubricant application member 22 are caused to move apart from the rolling element rolling grooves 13 of the guide rail 10. In this state, when the lubricant application member 22 is rotated in a direction in which the surface of one end of the lubricant application member 22 substantially faces a lower surface of the slide table 3, the lubricant application member 22 can be removed near to the operator through a gap defined between the lower surface of the slide table 3 and the upper surface of the guide rail 10.

When a new lubricant application member 22 is mounted, the mounting operation may be performed according to substantially an opposite procedure. With a new lubricant application member 22 made to be retained on the lubricant application member replacement jig 35, the new lubricant application member 22 is inserted to a portion above the guide rail 10 through the gap between the lower surface of the slide table 3 and the upper surface of the guide rail 10, so as to fit on the guide rail 10 in such a state that the operation members 38, 39 are operated in a direction in which they move away from each other so as to elastically deform the lubricant application member 22 in such a manner as to fit on the guide rail 10, Next, the lubricant application member 20 is caused to move along the guide rail 10, so as to be accommodated in the cover plate 33, and following this, the side seal 20 is cased to move along the guide rail 10 until the side seal 20 is brought into abutment with the cover plate 33. Finally, the pressing member 25 is caused to swivel so as to bring the locking projection 29 into engagement with the recessed portion 30, whereby the side seal 20 is fixed in place. Since this configuration obviates the necessity of removing the slide table 3 from the bearing 15 when the lubricant application member 22 whose lubricant content is decreased to a low level is replaced with a new one, the replacement of the lubricant application member 22 with a new one can be facilitated without requiring many labor hours and much time. This can also be applied to the lubricant application members of the sliders 11A, 11B which lie on the sides thereof where the sliders 11A, 11B face each other.

Figure 14:
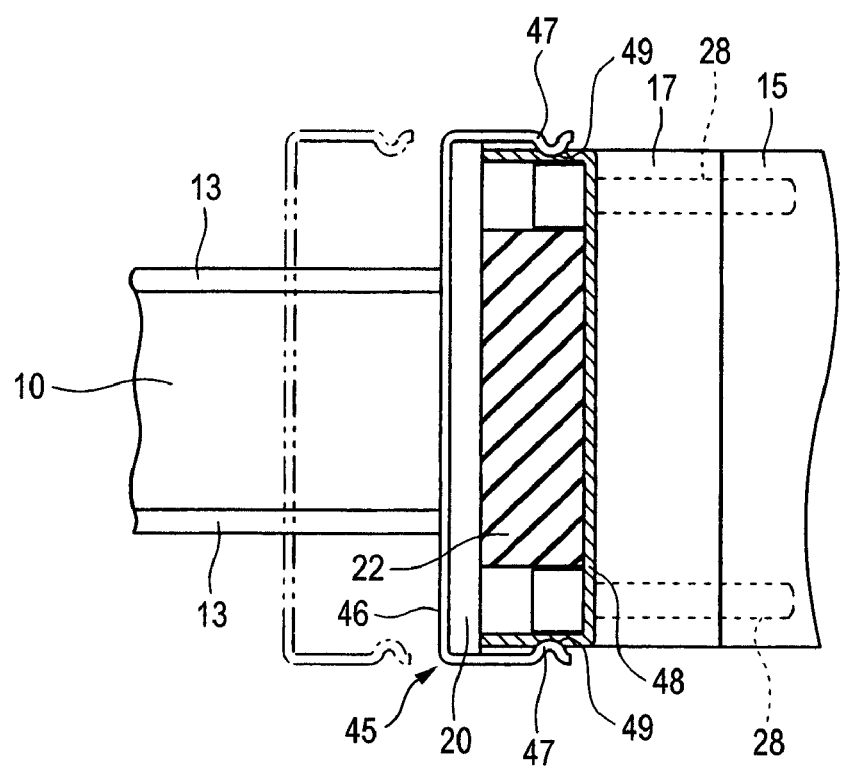
FIG. 14 is a plan view showing part of a linear guide apparatus according to a second embodiment of the invention.

In the embodiment that has been described heretofore, while the side seal fixing unit made up of the U-shaped pressing member 25 which presses and holds the side seal 20 against the lubricant application member 22, the pivot shaft 26 which is provided at the one end portion of the pressing member 25 in such a manner as to extend along the height direction of the guide rail 10 and the support plate 27 which supports rotatably the pressing member 25 via the pivot shaft 26 is used as the side seal fixing unit for fixing the side seal 20 to the end cap 17, as in a second embodiment shown in FIG. 14, a side seal fixing member 45 may be used which is made up of a U-shaped pressing member 46 which presses and holds a side seal 20 against a lubricant application member 22 and a lubricant application member receiving member 48 having on left and right side surface portions thereof recessed portions 49 which function as locking portions which fit on raised portions (or recessed portions) 47 provided at both end portions of the pressing member 46.

In addition, in the first and second embodiments, while the U-shaped pressing member is illustrated as the pressing member 25 which presses and holds the side seal 20 against the lubricant application member 22, the pressing member does not necessarily have to be formed into the U-shape but may be formed into, for example, an L-shape or T-shape.

Next, referring to FIGS. 15 to 24, a third embodiment of the invention will be described.

Figure 15:
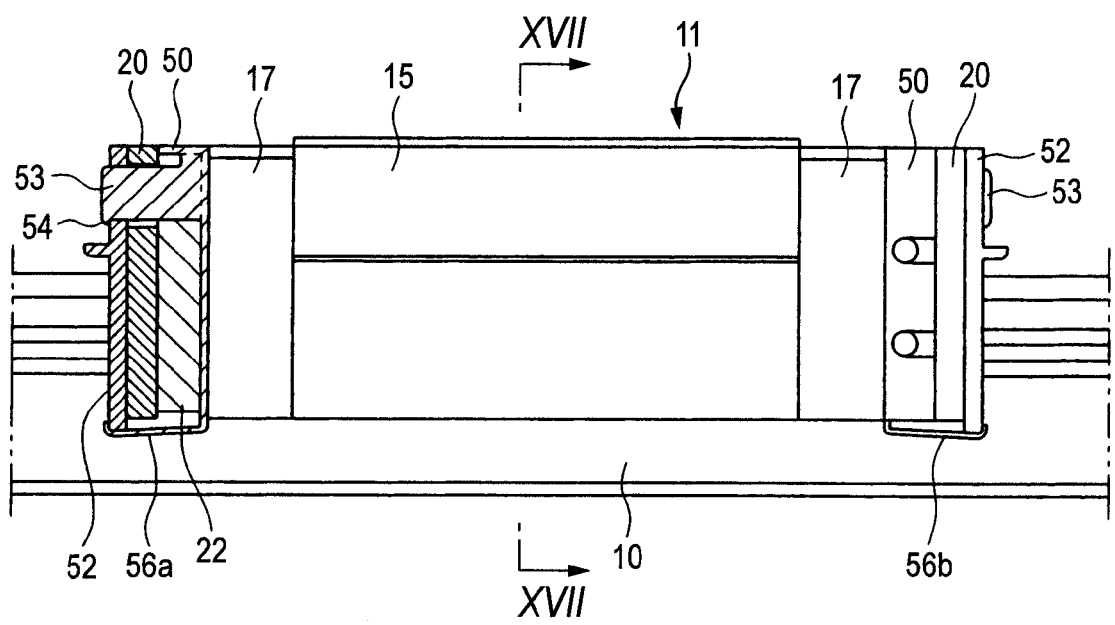
FIG. 15 is a side view of a linear guide apparatus according to a third embodiment of the invention.
Figure 16:
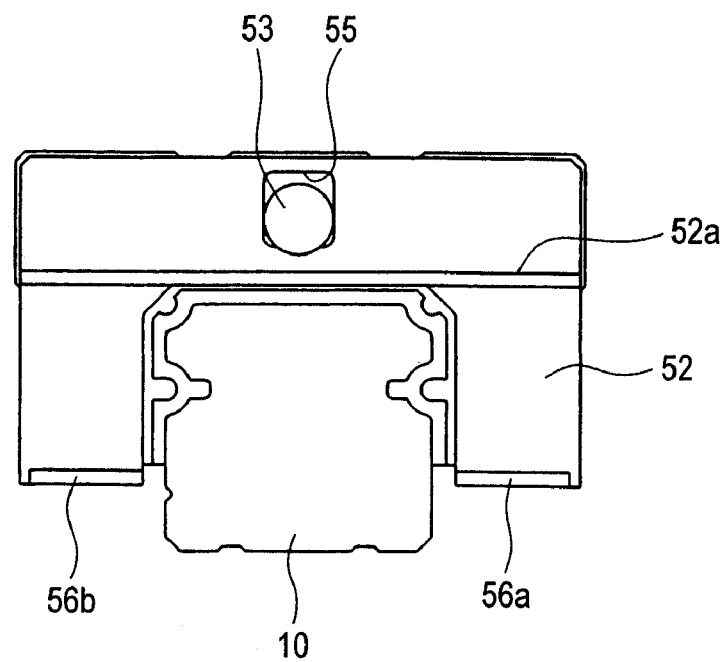
FIG. 16 is a front view of the linear guide apparatus according to the third embodiment of the invention.
Figure 17:
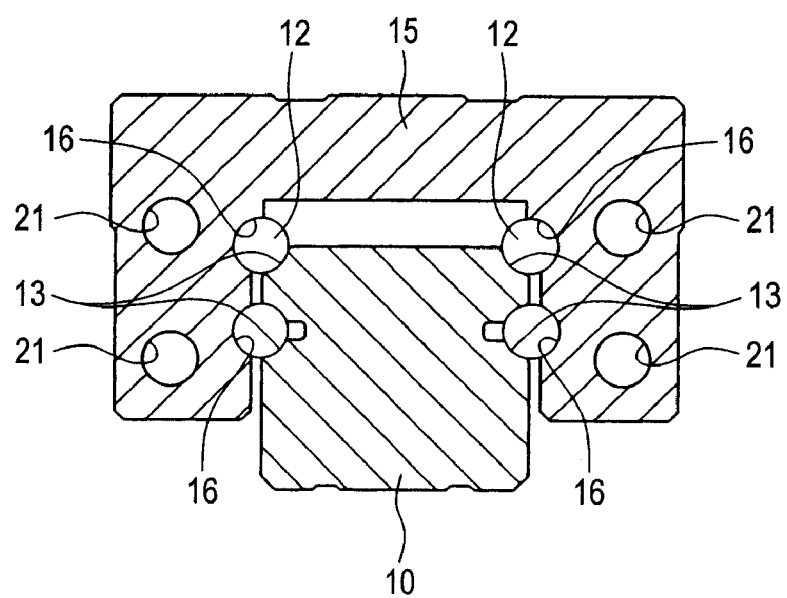
FIG. 17 is a sectional view taken along the line XVII-XVII in FIG. 15.

FIG. 15 is a side view of a linear guide apparatus according to a third embodiment of the invention, FIG. 16 is a front view of the linear guide apparatus according to the same embodiment, and FIG. 17 is a sectional view taken along the line XVII-XVII in FIG. 15, and the linear guide apparatus according to the third embodiment includes a guide rail 10 and a slider 11.

The guide rail 10 is formed in a straight line, two rolling element rolling grooves 13 as rolling element raceway surfaces are formed along a longitudinal direction of the guide rail on each of left and right side surface portions of the guide rail 10.

The rolling element rolling grooves 13 face four rolling element rolling grooves 16 which are formed on a bearing 15 of the slider 11, respectively. A large number of rolling elements 12 are incorporated between the rolling element grooves 13 and the rolling element grooves 16. These rolling elements 12 are made to roll on groove surfaces of the rolling element rolling grooves 13, 16 as the slider 11 moves relatively in the longitudinal direction of the guide rail 10. Four rolling element return passages 21 are formed in an interior of the bearing 15 for circulation of the rolling elements 12 which have finished rolling on the groove surfaces of the rolling element rolling grooves 13, 16.

The slider 11 has a pair of end caps 17. These end caps 17 are mounted on a front end face and a rear end face of the bearing 15. In addition, return guides (not shown) are incorporated in these end caps 17, and the rolling elements 12 which have finished rolling on the groove surfaces of the rolling element rolling grooves 13, 16 are made to change their directions in direction changing paths (not shown) formed between the end cap 17 and the return guides to thereafter be introduced into the rolling element return passages 21. A slider main body is made up of the bearing 15, the pair of end caps 17, the return guides, the large number of rolling elements 12 and the like. The slider 11 is made up of side seals 20, lubricant application members 22, lubricant application member accommodation cases 50 and side seal pressing members 52, which will all be described later, as well as other components which are added as required (for example, seal members other than the side seals, separators and the like).

In addition, the slider 11 has a pair of side seals 20 which function as seal members which seal gaps defined between the guide rail 10 and the end caps 17 so as to prevent the intrusion of foreign matters, and lubricant application member accommodation cases 50 are provided as seal retaining members between the side seals 20 and the end caps 17, respectively.

The lubricant application member accommodation case 50 is fixed to the end cap 17 by means of a plurality of screws, and a plate-shaped lubricant application member 22 for applying a lubricant to the rolling element rolling grooves 13 on the guide rail 10 is accommodated in an interior of the lubricant application member accommodation case 50.

The side seal 20 is held against the lubricant application member 22 by means of a side seal pressing member 52 as a plate-shaped seal pressing member. A shaft 53 as a projecting portion is provided on the lubricant application member accommodation case 50 in which the lubricant application member 22 is accommodated in such a manner as to extend in a thickness direction of the side seal pressing member 52 (substantially in a moving direction of the slider 11) after it has passed through the lubricant application member 22 and the side seal 20. Plate-shaped elastic pieces 56a, 56b are provided which function as elastic projecting portions which push the side seal pressing member 52 upwards so as to bring an open window 55 formed in a central portion of the side seal pressing member 52 into engagement with a claw portion 54 which is provided at a distal end portion of the shaft 53.

The shaft 53 and the plate-shaped elastic pieces 56a, 56b are provided integrally on the lubricant application member accommodation case 50, and a push-down piece 52a which pushes the side seal pressing member 52 downwards against the elastic forces of the plate-shaped elastic pieces 56a, 56b is provided on the side seal pressing member 52 in such a manner as to project from a front surface of the side seal pressing member 52.

Figure 18:
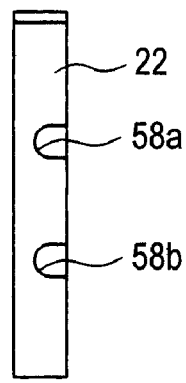
FIG. 18 is a side view of a lubricant application member.

FIG. 18 is a side view of the lubricant application member 22, and as is shown in the same figure, jig insertion holes 58a, 58b are provided, respectively, on left and right side surface portions of the lubricant application member 22 into which a jig 60 (shown in FIG. 20) is inserted when attempting to remove the lubricant application member 22 from the lubricant application member accommodation case 50 with the jig 60.

Figure 19:
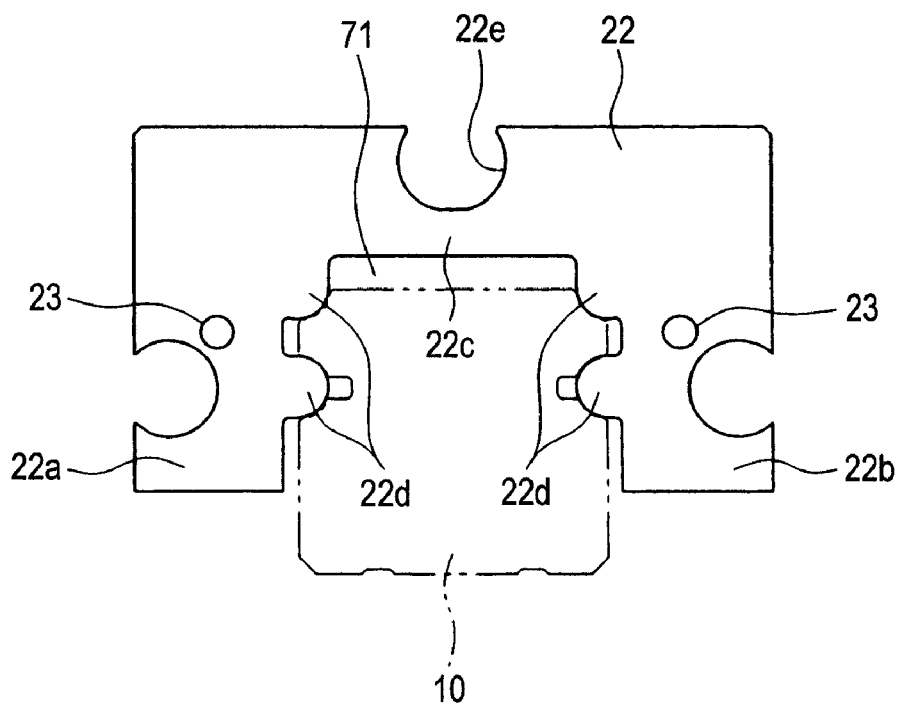
FIG. 19 is a front view of the lubricant application member.
Figure 23A:
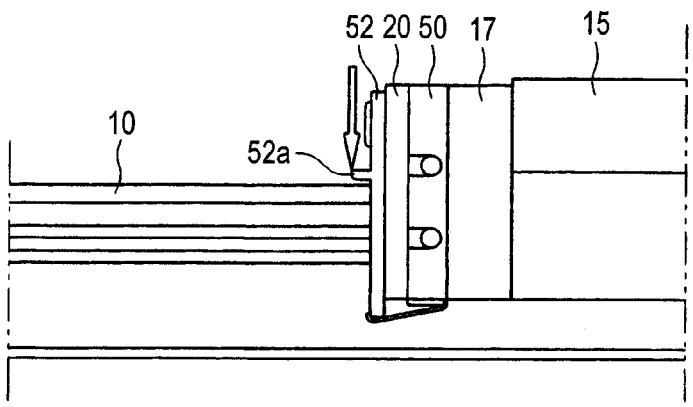
FIGS. 23A to 23D are drawings showing a procedure for removing the lubricant application member from the interior of the lubricant application member accommodation case.
Figure 23B:
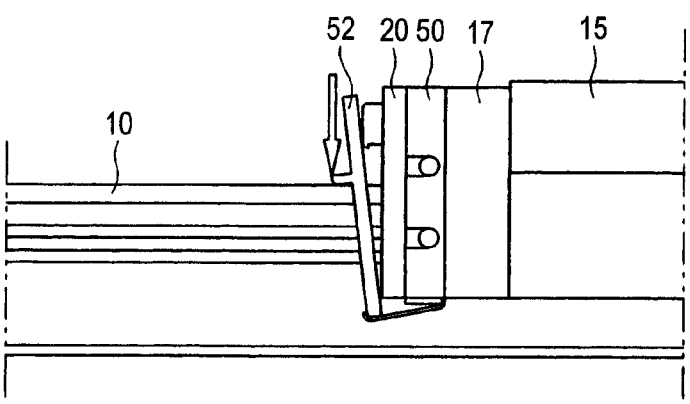
Figure 23C:
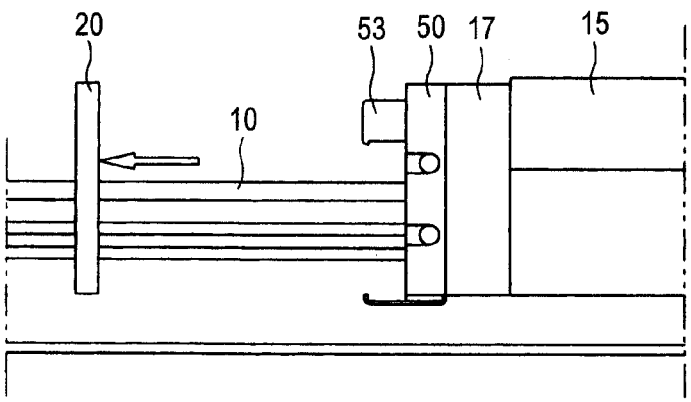
Figure 23D:
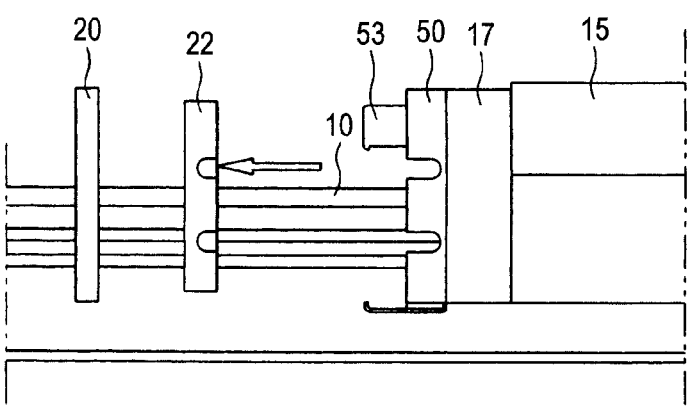

FIG. 19 is a front view of the lubricant application member 22, and as is shown in the same figure, pin insertion holes 23 are provided transversely symmetrically in a front surface portion of the lubricant application member 22 which function as jig insertion holes into which the jig 60 (shown in FIG. 20) is inserted when attempting to dismount and mount the lubricant application member 22 from and on the guide rail 10 by means of the jig 60.

The jig 60 has at a distal end portion thereof opening and closing pins 60a, 60b which function as engagement portions which can freely be opened and closed in a width direction of the guide rail 10. When these opening and closing pins 60a, 60b are operated in an opening direction after the opening and closing pins 60a, 60b have been inserted into the pin insertion holes 23 which function as engaged portions provided in the lubricant application member 22, the lubricant application member 22 is designed to be deformed elastically in the width direction of the guide rail 10. In addition, the lubricant accommodation member 22 is made up rolling groove slide contact portions (arm portions) 22a, 22b which are brought into slide contact with the rolling element rolling grooves 13 formed on the left and right side surface portions of the guide rail 10 and a connecting portion 22c which connects together upper end portions of the rolling groove slide contact portions 22a, 22b in a position above the guide rail 10. In addition, four arc-shaped projections 22d (refer to FIG. 19) which function as rolling groove contact portions which are brought into slide contact with the rolling element rolling grooves 13 on the guide rail 10 are provided on the rolling groove slide contact portions 22a, 22b of the lubricant application member 22, so that lubricant is designed to be supplied from these arc-shaped projections 22d to the rolling element rolling grooves 13 on the guide rail 10. Note that while the lubricant application member 22 is described as being brought into contact with the guide rail 10 only at these arc-shaped projections 22d, the lubricant application member 22 may be brought into contact with other portions than the rolling element rolling grooves on the side surface portions of the guide rail 10.

In addition, the connecting portion 22c has a relief 71 relative to an upper surface portion of the guide rail 10. Namely, a gap between the connecting portion 22c and the upper surface portion of the guide rail 10 is made large. This is preferable in the replacement of lubricant application members 22 because interference between the guide rail 10 and the lubricant application member 22 can be avoided, so as to ease the lubricant application member replacement operation. In addition, the lubricant application member 22 is made of a polymer material (for example, polyurethane rubber, polyolefin-based resin or the like) which contains a lubricant such as synthetic oil of, for example, poly-alpha olefin (PAO) or mineral oil.

A front view and a side view of the lubricant application member accommodation case 50 are shown in FIG. 21. As is shown in the same figure, the lubricant application member accommodation case 50 has a cover plate portion 50a which covers left and right side surface portions and an upper side surface portion of the lubricant application member 22, and in the cover plate portion 50a, slits 50b, 50c are formed through which a rod-shaped portion 60c of the jig 60 shown in FIG. 20 is inserted into the jig insertion holes 58a, 58b in the lubricant application member 22. Note that in FIG. 21, reference numeral 50d denotes a through hole for a fixing screw for fixing the case 50 together with the end cap 17 to the bearing 15.

FIG. 22 is a sectional view taken along the line XXII-XXII in FIG. 21, and as is shown in the same figure, a forcible expanding portion 53a is provided on the shaft 53 in such a manner as to fit in a substantially circular notched portion 22e (refer to FIG. 19) which is formed in an upper end portion of the lubricant application member 22 so as to forcibly expand the notched portion 22e in the width direction of the guide rail 10. When an upper portion of the lubricant application member 22 is forcibly expanded in the width direction, arm portions of the lubricant application member 22 are deformed oppositely, that is, inwards in the width direction, whereby inner side surfaces of the arm portions are brought into press abutment with the guide rail, so as to supply lubricant effectively.

FIG. 23 shows a series of drawings which show a procedure for removing the lubricant application member from the interior of the lubricant application member accommodation case. As is shown in these drawings, when the push-down piece 52a, which is provided on the side seal pressing member 52 in such a manner as to project therefrom, is pushed downwards by the finger and the side seal pressing member 52 is tilted forwards in this state, the engagement between the claw portion 54 provided at the distal end portion of the shaft 53 and the open window 55 formed in the central portion of the side seal pressing member 52 is released. Consequently, when the lubricant application member 22 is removed from the interior of the lubricant application member accommodation case 50, the side seal 20 is moved in a direction in which the side seal 20 moves away from the end cap 17 after the engagement between the claw portion 54 and the open window 55 has been released so as to remove the side seal pressing member 52. Accordingly, the lubricant application member 22 can be removed from the interior of the lubricant application accommodation case 50. A method of replacing lubricant application members 22 with the jig 60 which will happen next is similar to that described in the first embodiment, and therefore, the description thereof will be omitted here.

In the third embodiment that has been described heretofore, since the side seal 20 and the lubricant application member 22 are not screwed to the end cap 17, when replacing the lubricant application member 22 whose lubricant content is decreased to a low level with a new one, the replacement of the lubricant application member 22 with the new one can be facilitated.

In addition, since the engagement between the claw portion 54 provided at the distal end portion of the shaft and the open window 55 formed in the central portion of the side seal pressing member 52 is released only by pushing down the push-down piece 52a provided on the side seal pressing member 52 with the finger, the lubricant application member 22 can be removed easily from the interior of the lubricant application member accommodation case 50.

Figure 2:
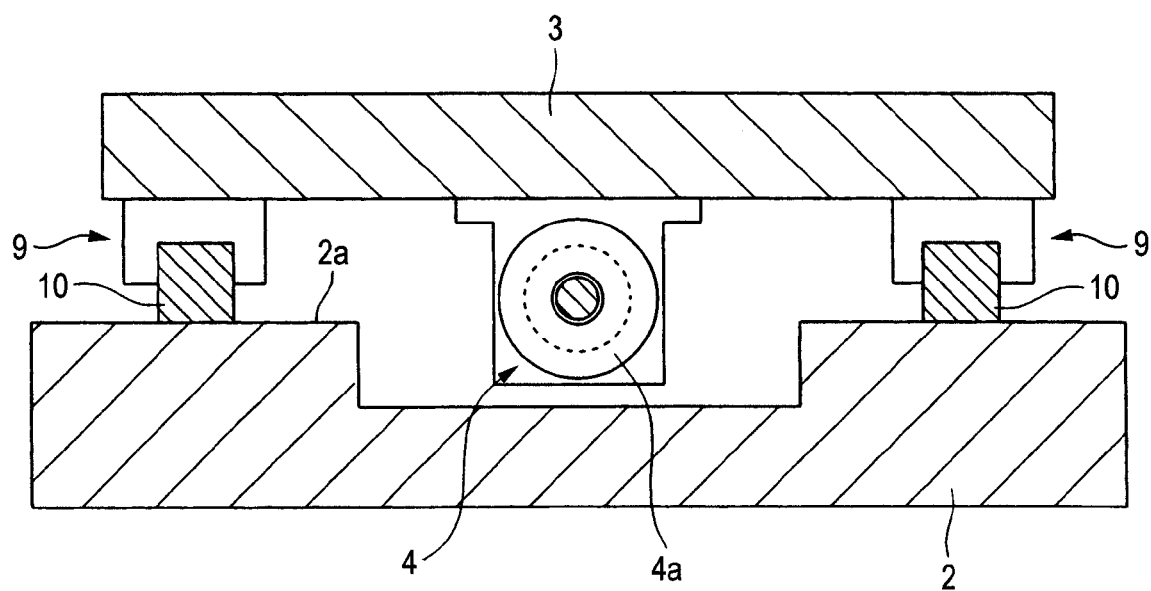
FIG. 2 is a sectional view of the slide table apparatus shown in FIG. 1.
Figure 3:
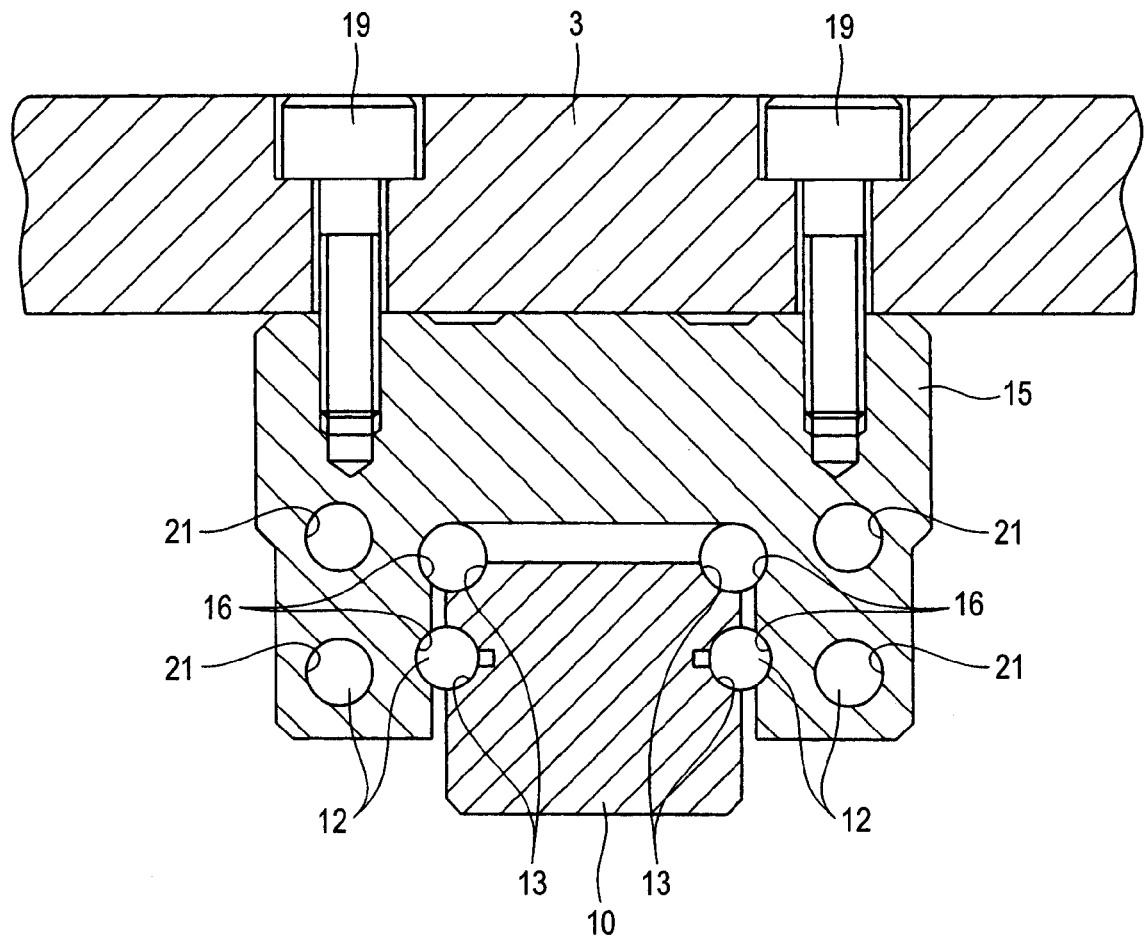
FIG. 3 is a sectional view of a linear guide apparatus according to a first embodiment of the invention.

In particular, when the linear guide apparatus of this embodiment is adopted in, for example, the slide table apparatus shown in FIGS. 1 and 2, even in the event that the lubricant application member 22 which lies on the inner side (that is, the lubricant application member 22 which lies on the side of the slider 11A or 11B which faces the side of the slider 11B or 11A), the relevant lubricant application member 22 can easily be replaced with a new one without disassembling the slide table apparatus.

Furthermore, since the side seal pressing member 52 is formed into the plate shape, the side seal pressing member 52 can hold the side seal 20 over the surface thereof, whereby deterioration in the sealing performance of the side seal 20 can be prevented which would otherwise be caused by a deviation in position of the side seal 20 due to a friction force generated the guide rail 10 and the side seal 20.

In addition, since the necessity is obviated of securing a space for removing the side seal 20 and the side seal pressing member 52 to the side of the slider 11, the invention can preferably be used in industrial machines or the like in which such a space is difficult to be secured to the side of the slider 11.

In the third embodiment that has been described above, while the plate-shaped elastic pieces 56a, 56b are provided integrally with the lubricant application member accommodation case 50, the lubricant application member accommodation case 50 and the plate-shaped elastic pieces 56a, 56b may be formed separately from each other. For example, a configuration may be adopted in which a lubricant application member accommodation case 50 is prepared from a resin through injection molding and plate-shaped elastic pieces 56a, 56b are attached to a lower end portion of the lubricant application accommodation case 50 so prepared through insert molding or by means of a fixing unit such as screws. The utilization of insert molding is preferred since the numbers of components and assembling manhours can be reduced.

Figure 24:
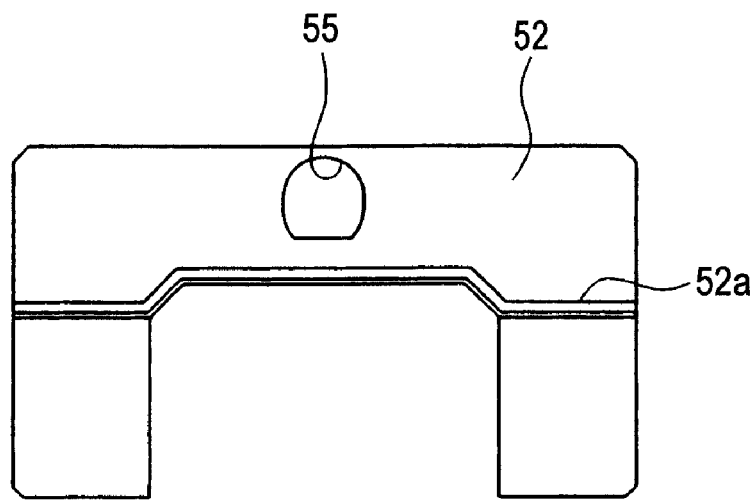
FIG. 24 is a drawing showing a modified example of a side seal pressing member.

In addition, in the third embodiment, while the push-down piece which is made parallel to the upper surface portion of the guide rail 10 is illustrated as the push-down piece for pushing downwards the side seal pressing member 52 against the elastic forces of the plate-shaped elastic pieces 56a, 56b, the shape of the push-down piece can be set to an arbitrary shape, provided that the required function is fulfilled, and for example, a push-down piece formed into a shape shown in FIG. 24 (a push-down piece which is not parallel partially to the upper surface portion of the guide rail) may be provided on the side seal pressing member 52 with a view to increasing the strength of the push-down piece or facilitating the catching of the finger on the push-down piece (facilitating the securing of a space where the finger is to be inserted) even in such a state that the linear guide apparatus is left mounted on the table system.

Furthermore, while the lubricant application member accommodation case 50 having the cover plate portion 50a is used as the seal retaining member, for example, the cover plate portion 50*a* may be extended down to lower sides of the arm portions. In addition, the cover plate portion 50*a* may be omitted.

Figure 25A:
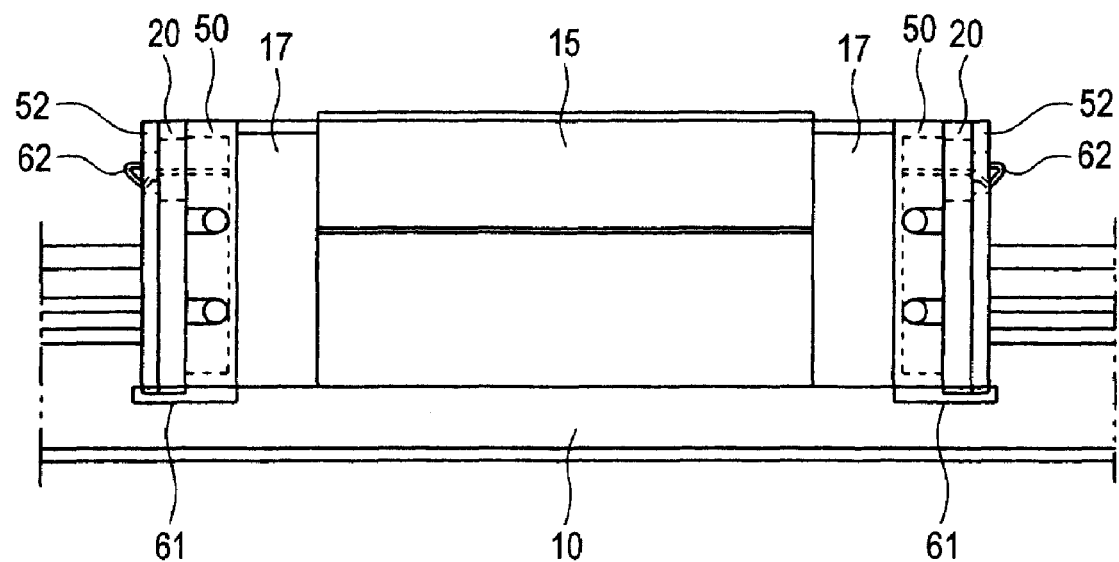
FIGS. 25A and 25B are side and front views of a linear guide apparatus according to a fourth embodiment of the invention.
Figure 25B:
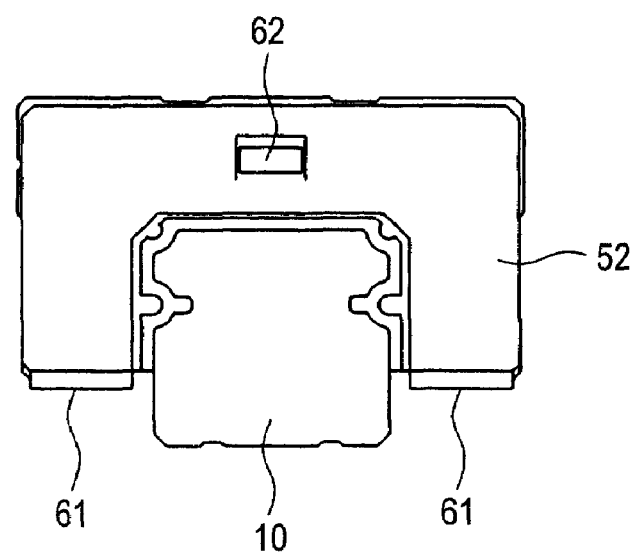

Furthermore, in the third embodiment, while the invention is illustrated as being applied to the linear guide apparatus which adopts the lubricant application member removing mode in which the lubricant application member 22 is removed from the interior of the lubricant application member accommodation case 50 by pushing downwards the side seal pressing member 52, the invention is not limited thereto. For example, as in the case of a fourth embodiment shown in FIG. 25, the invention can be applied to a linear guide apparatus which employs a lubricant application member removing mode in which plate-shaped portions 61 are provided on a lubricant application member accommodation case 50 as projecting portions which support a side seal pressing member 52 from below, and a plate-shaped elastic piece 62 is provided on the lubricant application member accommodation case 50 as an elastic projecting portion which pushes downwards the side seal pressing member 52 via an open window 55 formed in a central portion of the side seal pressing member 52. Therefore, the side seal pressing member 52 is pushed upwards against the elastic force of the plate-shaped elastic piece 62 so as to remove a lubricant application member 22 from an interior of the lubricant application member accommodation case 50.

Figure 26A:
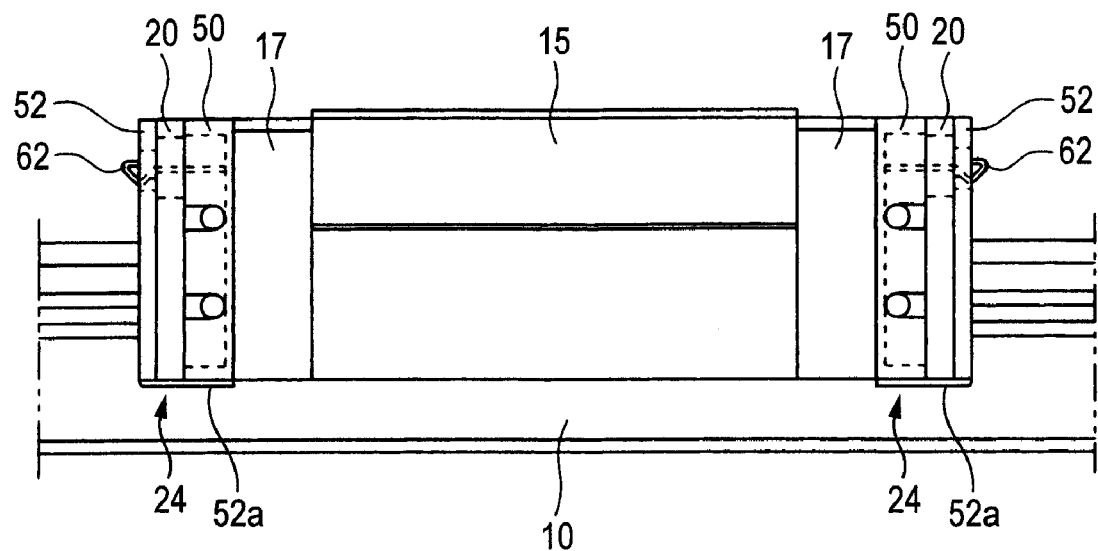
FIGS. 26A and 26B are side and front views of a linear guide apparatus according to a fifth embodiment of the invention.
Figure 26B:
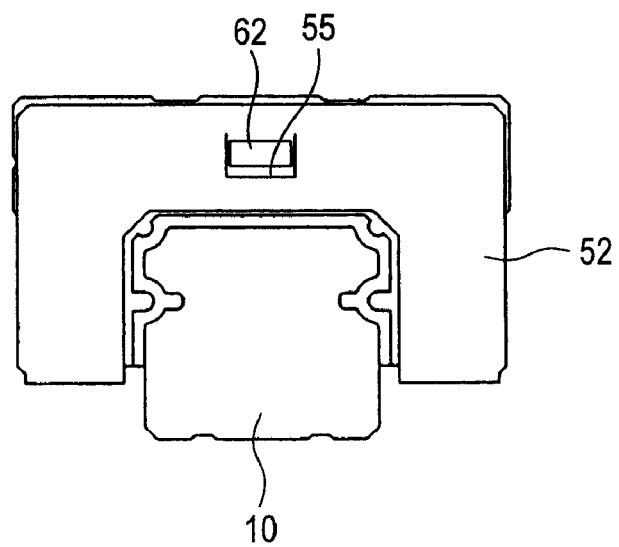

In addition, as in the case of a fifth embodiment shown in FIG. 26, the invention can be applied to a linear guide apparatus which employs a side seal pressing member fixing mode in which plate-shaped portions 52*a* functioning as projecting portions which extend toward a slider main body are provided at a lower end portion of a side seal pressing member 52, and a plate-shaped elastic piece 62 functioning as an elastic projecting portion which pushes upwards the side seal pressing member 52 via an open window 55 formed in a central portion of the side seal pressing member 52 is provided on a lubricant application member accommodation case 50. Therefore, distal end portions of the plate-shaped portions 52*a* are caused to be caught on the lubricant application member accommodation case 50, so as to fix the side seal pressing member 52 to the slider main body.

Next, a sixth embodiment of the invention will be described by reference to FIGS. 27 to 33.

Figure 27A:
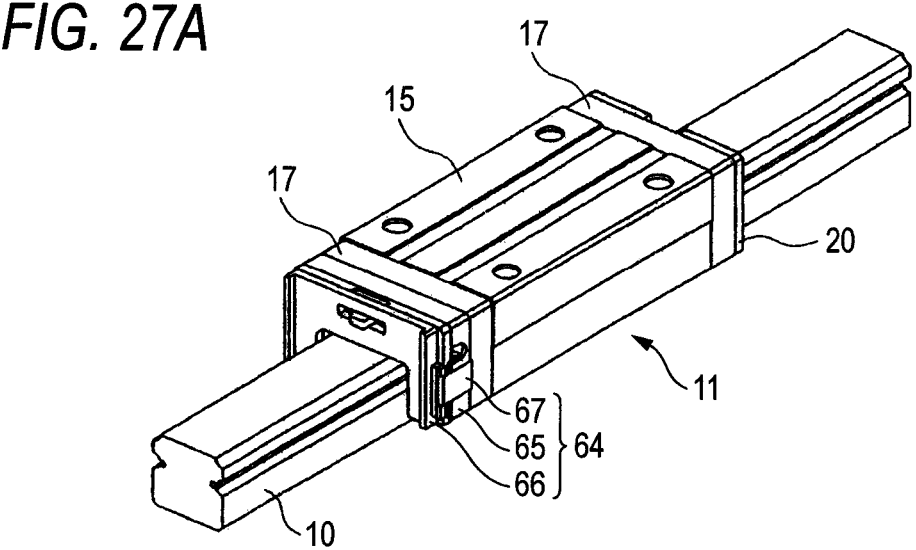
FIGS. 27A and 27B are perspective views of a linear guide apparatus according to a sixth embodiment of the invention.
Figure 27B:
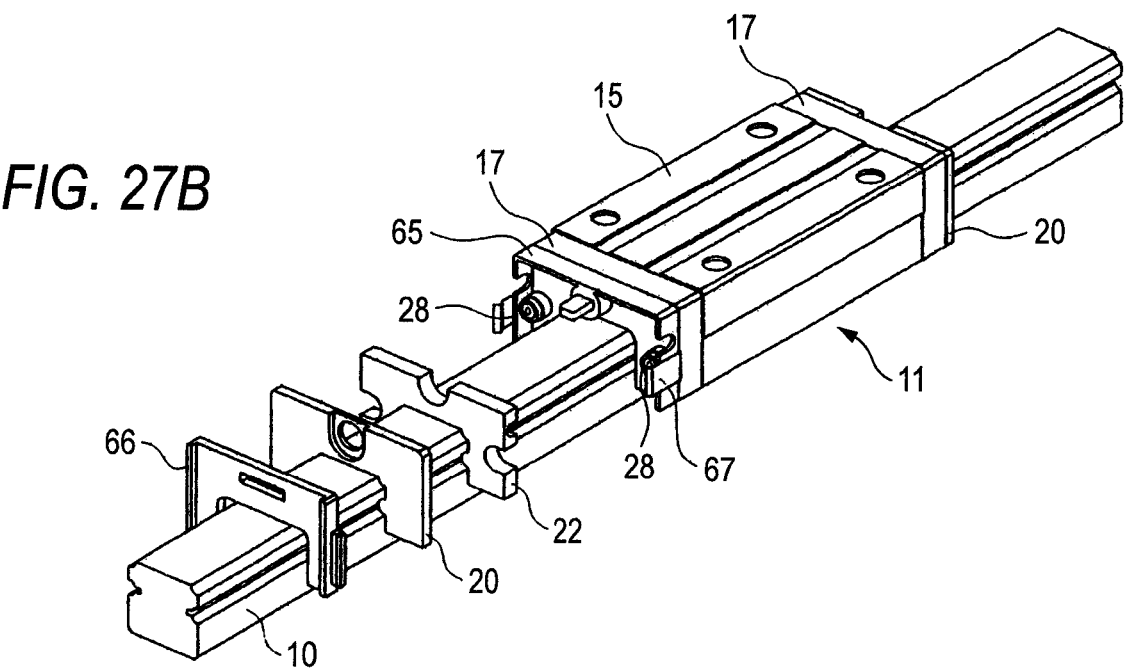
Figure 28:
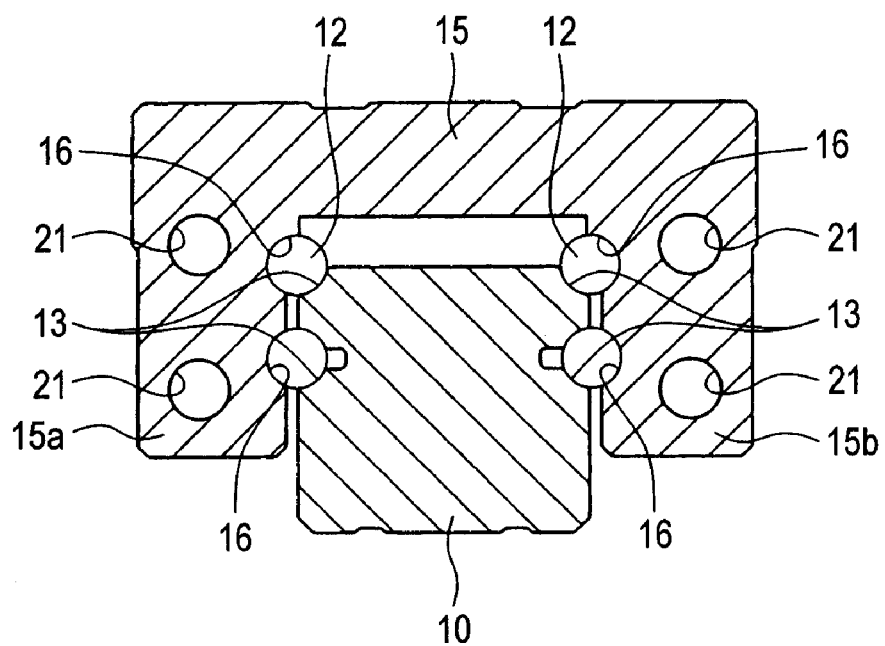
FIG. 28 is a sectional view of the linear guide apparatus shown in FIG. 27.
Figure 29:
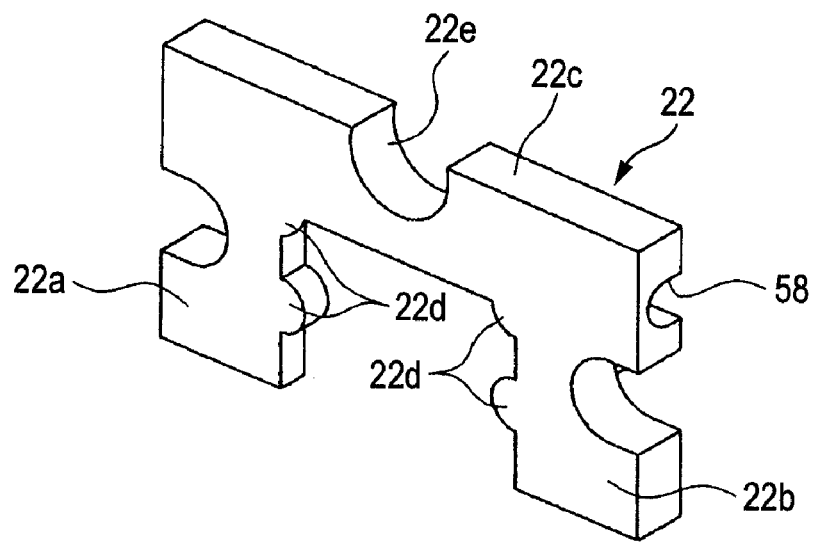
FIG. 29 is a perspective view of the lubricant application member shown in FIG. 27.
Figure 30:
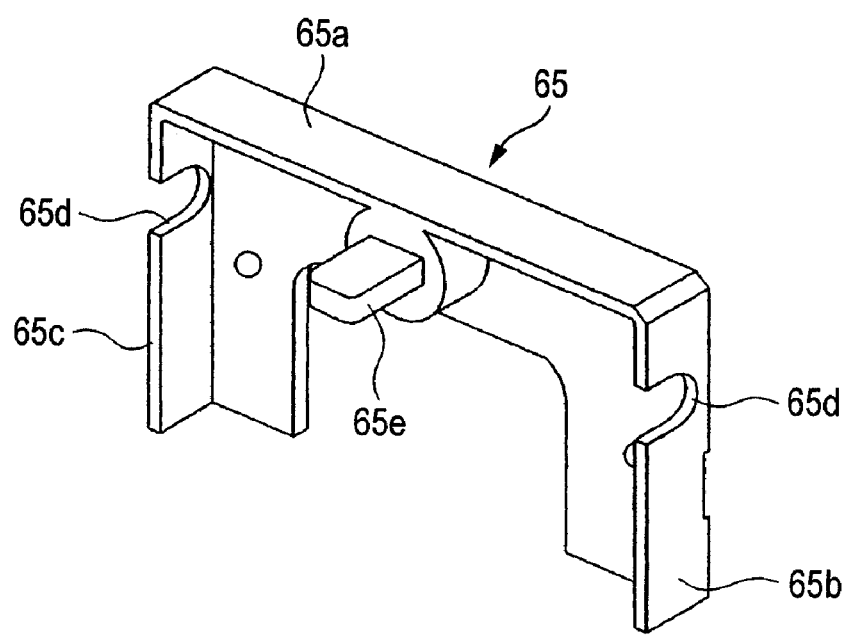
FIG. 30 is a perspective view of an accommodation member shown in FIG. 27.
Figure 31:
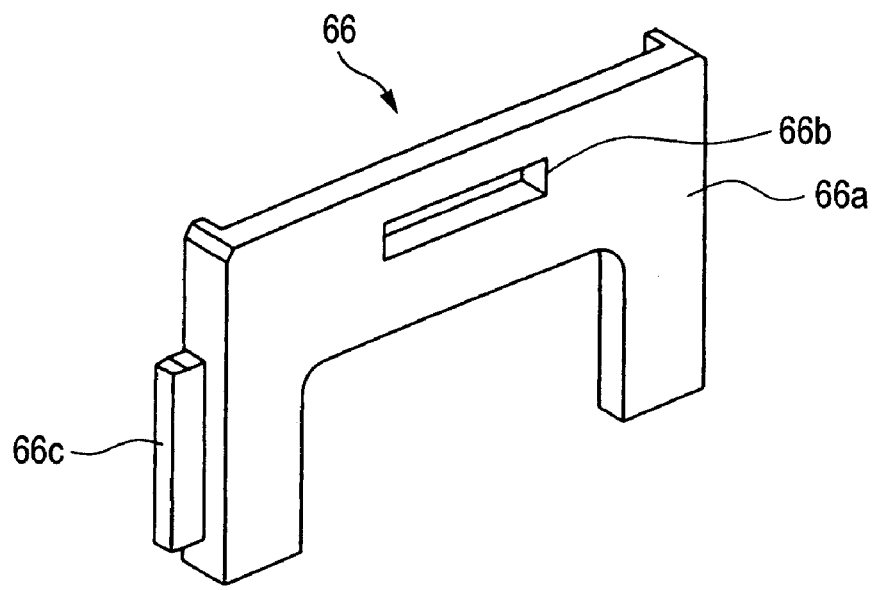
FIG. 31 is a perspective view of a holding plate shown in FIG. 27.
Figure 32A:
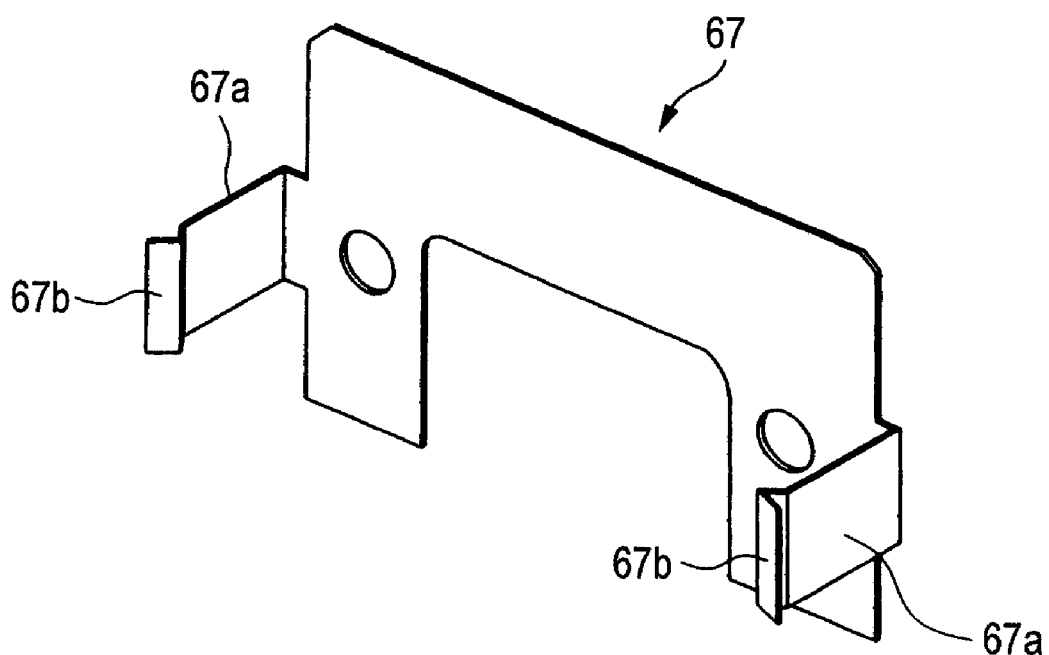
FIG. 32A is a perspective view of a holding plate fixing member shown in FIG. 27.
Figure 32B:
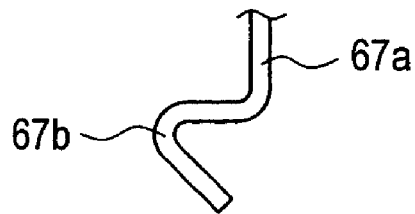
FIGS. 32B and 32C are enlarged view of the holding plate fixing member.

FIG. 27 is a perspective view of a linear guide apparatus according to a sixth embodiment of the invention, FIG. 28 is a sectional view of the linear guide apparatus shown in FIG. 27, FIG. 29 is a perspective view of a lubricant application member shown in FIG. 27, FIG. 30 is a perspective view of a lubricant supply member accommodation member (hereinafter, referred to as an "accommodation member") as a seal retaining member shown in FIG. 27, FIG. 31 is a perspective view of a holding plate as a seal pressing member shown in FIG. 27, and FIG. 32 is a perspective view of a holding plate fixing member as a seal pressing member fixing member shown in FIG. 27, and as is shown in FIG. 27, the linear guide apparatus according to the sixth embodiment includes a guide rail 10 and a slider 11.

The guide rail 10 is formed in a straight line, and a slider main body of a slider 11 which is provided in such a manner as to move relatively in a longitudinal direction of the guide rail is made up of a bearing 15, a pair of end caps 17, return guides and a large number of rolling elements 12. The slider 11 is made up of the slider main body, the side seals 20, a lubricant application members, an accommodation member 65, a holding plate 66, a holding plate fixing member 67 (will all be described later) as well as other components which are added as required (for example, seal members other than the side seals, separators and the like).

Note that while in this embodiment, a lubricant application member and the like are provided only at one end of the slider main body, they may be provided at both end portions of the slider main body.

The bearing 15 has arm portions 15*a*, 15*b* (refer to FIG. 28) on left and right sides of the guide rail 10, and a plurality of spherically shaped rolling elements 12 are incorporated between rolling element rolling grooves 16 which are formed, respectively, on inner side surfaces of the arm portions 15*a*, 15*b* and rolling element rolling grooves 13 which are formed, respectively, on left and right side surface portions of the guide rail 10 in such a manner as to roll freely.

The end caps 17 are mounted on a front end face and a rear end face of the bearing 15, respectively, and gaps defined between the end caps 17 and the guide rail 10 are sealed by side seals 20 which are seal members disposed in front of the end caps 17.

The rolling elements 12 are designed to roll between the rolling element rolling grooves 13 and the rolling element rolling grooves 16 as the slider 11 moves relatively in a longitudinal direction of the guide rail 10. In addition, the rolling elements 12 that have finished rolling between the rolling element rolling grooves 13 and the rolling element rolling grooves 16 change their directions in direction changing paths formed between the end caps 17 and return guides (not shown) and are thereafter introduced into rolling element return passages 21 (refer to FIG. 28) formed in the bearing 15 for circulation through the rolling element return passages 21.

A lubricant application member 22, which is made of a polymer material (for example, polyurethane rubber, polyolefin-based resin or the like) which contains a lubricant such as a synthetic oil of, for example, poly-alpha olefin (PAO) or mineral oil, is provided between the end cap 17 and the side seal 20 of the slider 11. This lubricant accommodation member 22 is made up rolling groove slide contact portions 22*a*, 22*b* which are brought into slide contact with the rolling element rolling grooves 13 formed on the left and right side surface portions of the guide rail 10 and a connecting portion 22*c* which connects together upper end portions of the rolling groove slide contact portions 22*a*, 22*b* in a position above the guide rail 10, and four arc-shaped projections 22*d* (refer to FIG. 29) which function as rolling groove contact portions which are brought into slide contact with the rolling element rolling grooves 13 on the guide rail 10 are provided on the rolling groove slide contact portions 22*a*, 22*b* of the lubricant application member 22, so that lubricant is designed to be supplied from these arc-shaped projections 22*d* to the rolling element rolling grooves 13 on the guide rail 10. Note that while the lubricant application member 22 is described as being brought into contact with the guide rail 10 only at these arc-shaped projections 22*d*, the lubricant application member 22 may be brought into contact with other portions than the rolling element rolling grooves on the side surface portions of the guide rail 10.

In addition, the connecting portion 22*c* has a relief relative to an upper surface portion of the guide rail 10. Namely, a gap between the connecting portion 22*c* and the upper surface portion of the guide rail 10 is made large. This is preferable in the replacement of lubricant application members 22 because interference between the guide rail 10 and the lubricant application member 22 can be avoided, so as to ease the lubricant application member replacement operation.

As is shown in FIG. 27, the lubricant application of member 22 and the side seal 20 are fixed to the slider main body by means of a fixing unit 64 which is made up of an accommodation member 65 as a seal retaining member which is fixed to the slider main body (more specifically, together with the end cap 17 to the bearing 15) by means of a plurality of fixing screws 28, a holding plate 66 as a seal pressing member for holding the lubricant application member 22 and the side seal 20 against the accommodation member 65 and a holding plate fixing member 67 as a seal pressing member fixing member for fixing the holding plate 66 to the accommodation member 65.

The accommodation member 65 is formed by molding, for example, a synthetic resin into a shape which resembles substantially the external shape of the end cap 17. In addition, the accommodation member 65 has cover plate portions 65a, 65b, 65c (refer to FIG. 30) which cover an upper surface portion and left and right side surface portions of the lubricant application member 22. Among these cover plate portions 65a, 65b, 65c, on the cover plate portions 65b, 65c which cover the left and right side surface portions of the lubricant application member 22, notches 65d are formed through which a rod-shaped jig is inserted into jig insertion holes 58 (refer to FIG. 29) which are formed in the left and right side surface portions of the lubricant application member 22.

The holding plate 66 is such as to be made by forming, for example, a synthetic resin into a shape which is substantially the same as the external shape of the accommodation member 65 and has a holding surface 66a (refer to FIG. 31), and a rectangular through hole 66b is formed in a central portion of the holding surface 66a as a positioning portion which fits on a plate-shaped projection 65e which projects from the accommodation member 65 to the lubricant application member side so as to position the holding plate 66 in such a state that the holding plate 66 floats above the upper surface portion of the guide rail 10.

The holding plate fixing member 67 is formed by forming, for example, a thin sheet material of spring steel into a predetermined shape and bending both end portions of the predetermined shape into U-shapes. The holding plate fixing member 67 has a pair of left and right plate-shaped elastic pieces 67a, and these plate-shaped elastic pieces 67a made free to be deformed elastically in a width direction of the slider 11. Furthermore, as is shown in, for example, FIG. 32B, the holding plate fixing member 67 has claw portions 67b, which are each formed substantially into a V-shape, at distal end portions of the plate-shaped elastic pieces 67a, whereby the holding plate 66 is fixed to the accommodation member 65 by those claw portions 67b being brought into engagement with raised portions 66c which are formed on left and right side surface portions of the holding plate 66.

Figures 33A, 33B, 33C:
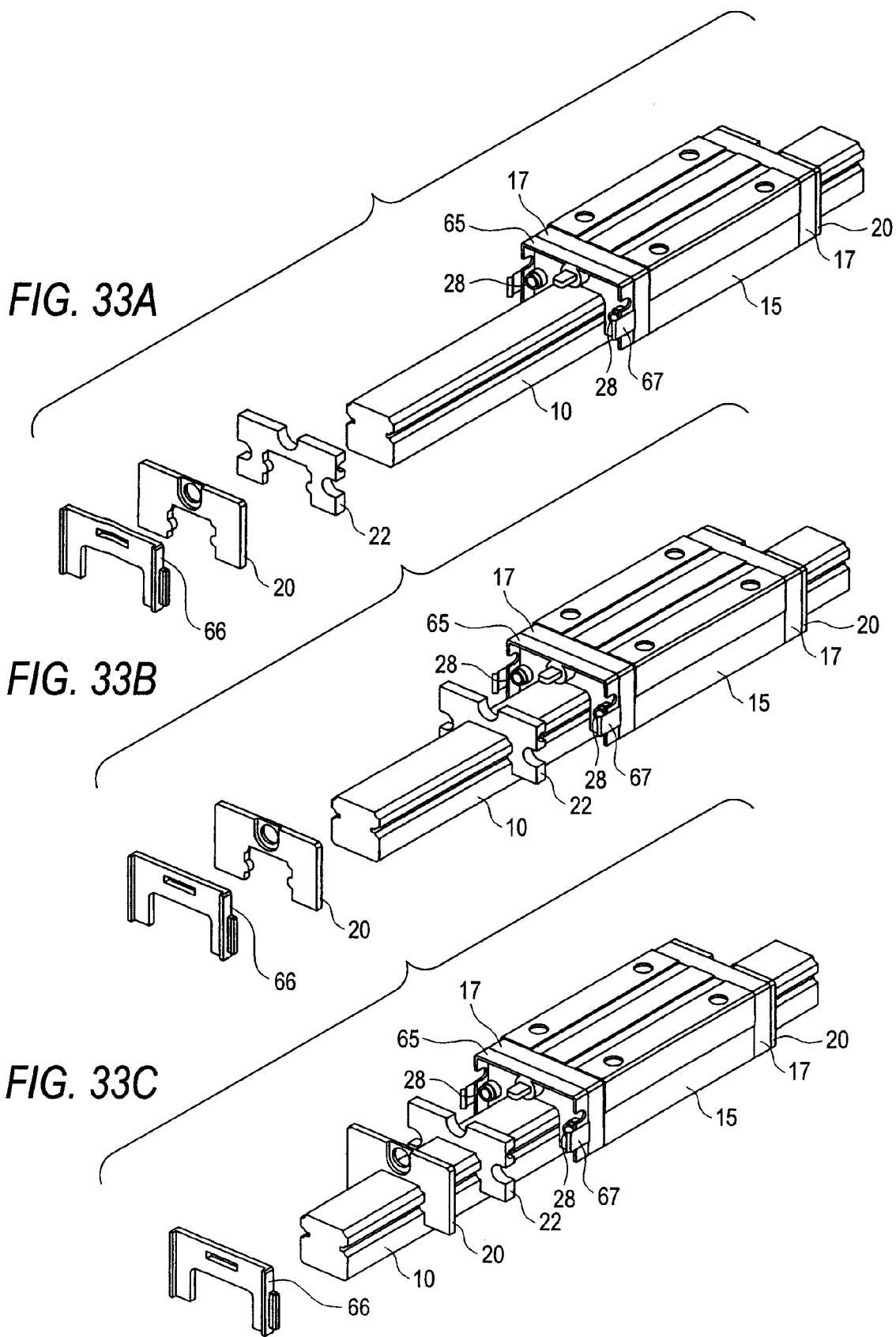
FIGS. 33A to 33C are drawings showing a procedure for fixing the holding plate to the accommodation member.

In the configuration that has been described heretofore, when the lubricant application member 22 and the side seal 20 are disposed between the accommodation member 65 fixed to the end cap 17 and the holding late 66 as is shown in FIG. 33 and the holding plate 66 is thereafter moved towards the accommodation member 65, the raised portions 66c provided on the left and right side surface portions of the holding plate 66 are brought into engagement with the claw portions 67b of the holding plate fixing member 67, whereby the holding plate 66 is fixed to the accommodation member 65. In addition, when the plate-shaped elastic pieces 67a of the holding plate fixing member 67 are elastically deformed in the width direction of the slider 11, the engagement between the raised portions 66c of the holding plate 66 and the claw portions 67b of the holding plate fixing member 67 is cancelled, so that the replacement operation of lubricant application members 22 is enabled.

Consequently, in the sixth embodiment that has been described above, since the necessity of using the plurality of fixing screws which are used in the conventional example that has been described before is obviated, when the lubricant application member 22 whose lubricant content is decreased to a low level is replaced with a new lubricant application member 22, the lubricant application members 22 can be replaced without requiring many labor hours and much time.

In particular, when adopting the linear guide apparatus of this embodiment which includes the lubricant application members at the end portions of the slider main body in, for example, the slide table apparatus shown in FIGS. 1 and 2, even in the event that the lubricant application member 22 which lies inwards (that is, the lubricant application member 22 which lies on the side of the sliders 11A or 11B which faces the slider 11B or 11A) is replaced, the relevant lubricant application member 22 can easily be replaced with a new one without disassembling the slide table apparatus.

In addition, in the sixth embodiment that has been described above, since the holding plate 66 is fixed to the accommodation member 65 through the engagement of the pair of left and right plate-shaped elastic pieces 67a provided on the holding plate fixing member 67 with the raised portions 66c provided on the left and right side surface portions of the holding plate 66, the necessity is obviated of providing the plate-shaped elastic pieces 56a, 56b on the lower surface portion of the seal retaining member 50 as in the case of the third embodiment shown in FIG. 15. Consequently, although a shoulder portion needs to be provided on the base 2 where the guide rail 10 is fixed along a longitudinal direction thereof in order to define a position of the guide rail 10, even in the event that it is true, the accommodation member 65 as the seal retaining member can be prevented from interfering with the shoulder portion on the base to which the guide rail 10 is fixed.

In addition, when the projection 65c which projects from the accommodation member 65 towards the lubricant application member fits in the through hole 66b provided in the holding surface 66a of the holding plate 66, the holding plate 66 is positioned in such a state that the holding plate 66 floats above the upper surface portion of the guide rail 10. Consequently, an increase in traveling resistance in the slider 11 can be prevented which would otherwise be generated by the holding plate 66 being brought into contact with the upper surface portion of the guide rail 10.

In addition, although in the event that the shapes of the projection 65e and the through hole 66b are made circular, there will be caused a possibility that the holding plate 66 oscillates to the left and right about the projection 65a, in the sixth embodiment that has been described above, the shapes of the projection 65e and the through hole 66b are made non-circular, whereby the leftward and rightward oscillation of the holding plate 66 can be prevented.

Note that while in the sixth embodiment that has been described above, the holding plate fixing member 67 and the accommodation member 65 have been described as being formed separately, the holding plate fixing member 67 and the accommodation member 65 may be formed integrally through, for example, insert molding.

In addition, while in the sixth embodiment, the holding plate 66 is made to be defined its position in such a state that the holding plate 66 floats above the upper surface portion of the guide rail 10 by fitting the projection 65a of the accommodation member 65 in the through hole 66b formed in the holding surface 66a of the holding plate 66, the holding plate 66 may be made to be positioned in such a state that the holding plate 66 floats above the upper surface portion of the guide rail 10 by providing a recessed portion on the holding surface 66a of the holding plate 66 as a positioning portion and causing the projection 65e of the accommodation member 65 to fit in the recessed portion so provided.

Furthermore, while in the sixth embodiment, the raised portions 66c are provided on the left and right side surface portions of the holding plate 66 so that the claw portions 67b of the holding plate fixing member 67 are brought into engagement with the raised portions 66c so provided, the invention is not limited thereto but may adopt. For example, a configuration in which the raised portions 66c are omitted and the claw portions 67b are made to be brought into direct engagement with end faces of the holding plate 66 which lie adjacent to the side surface portions thereof or in which grooves are provided on the side surface portions of the holding plate 66 for engagement with the claw portions 67b, so that the claw portions 67b are brought into engagement with these grooves.

Figure 32C:
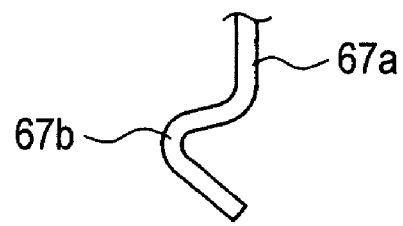

Additionally, while in the sixth embodiment, the claw portions 67b of the holding plate fixing member 67 are each formed substantially into the V-shape, the invention is not limited thereto. In stead, the claw portions may be formed substantially into another V-shape as shown in FIG. 32C. In the event that the claw portions of the holding plate fixing member 67 are each formed substantially into another V-shape in this way, so as to be brought into contact with the holding plate 66 while being inclined thereagainst, the holding plate 66 is pressed against the side seal in an ensured fashion by means of the spring force of the holding plate fixing member 67.

In addition, also in the sixth embodiment, engaged portions such as holes with which engagement portions such as the pins of the jig 35 illustrated in the first embodiment, the jig 60 illustrated in the third embodiment or pins of a jig 70 of a seventh embodiment which will be described later can be brought into engagement may be provided on the lubricant application member, so that a corresponding jig is used for replacement of lubricant application members.

While in the third to sixth embodiments, the side seal pressing member or holding plate is made to hold the side seal over the whole of the surface which faces the side seal, the invention is not limited thereto. The side seal may be held by a plurality of small points, small straight lines, or small surfaces which are not aligned in a straight line. Therefore, an increase in friction in the seal portion due to the tilt of the side seal can be prevented, as with the case where the side seal is held over the whole of the facing surface of the side seal pressing member. In addition, according to such a configuration, the side seal is made to move easily within a plane which intersects the moving direction of the slider 11 at right angles. This allows the adjustment in position of the side seal to be implemented in such a manner as to follow the guide rail, thereby making it possible to prevent the generation of a gap or large friction between the side seal and the guide rail.

Next, referring to FIGS. 34 to 50, a seventh embodiment of the invention will be described.

Figure 34:
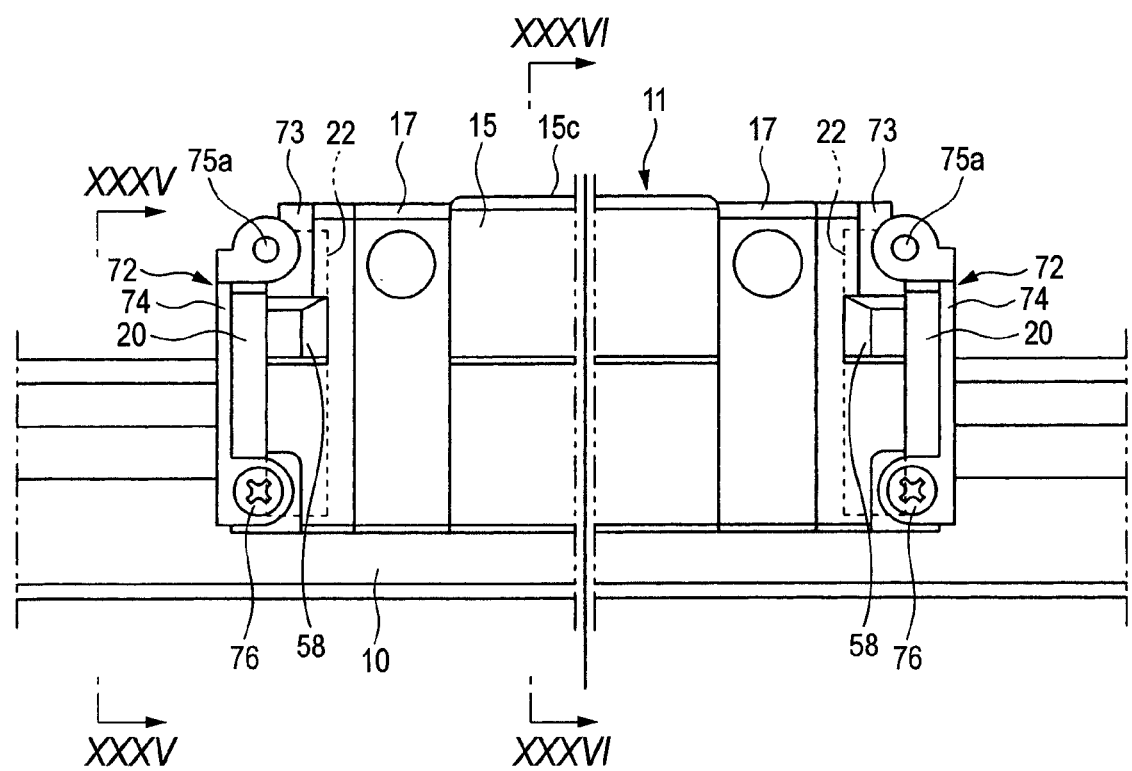
FIG. 34 is a side view showing a linear guide apparatus according to a seventh embodiment of the invention.
Figure 35:
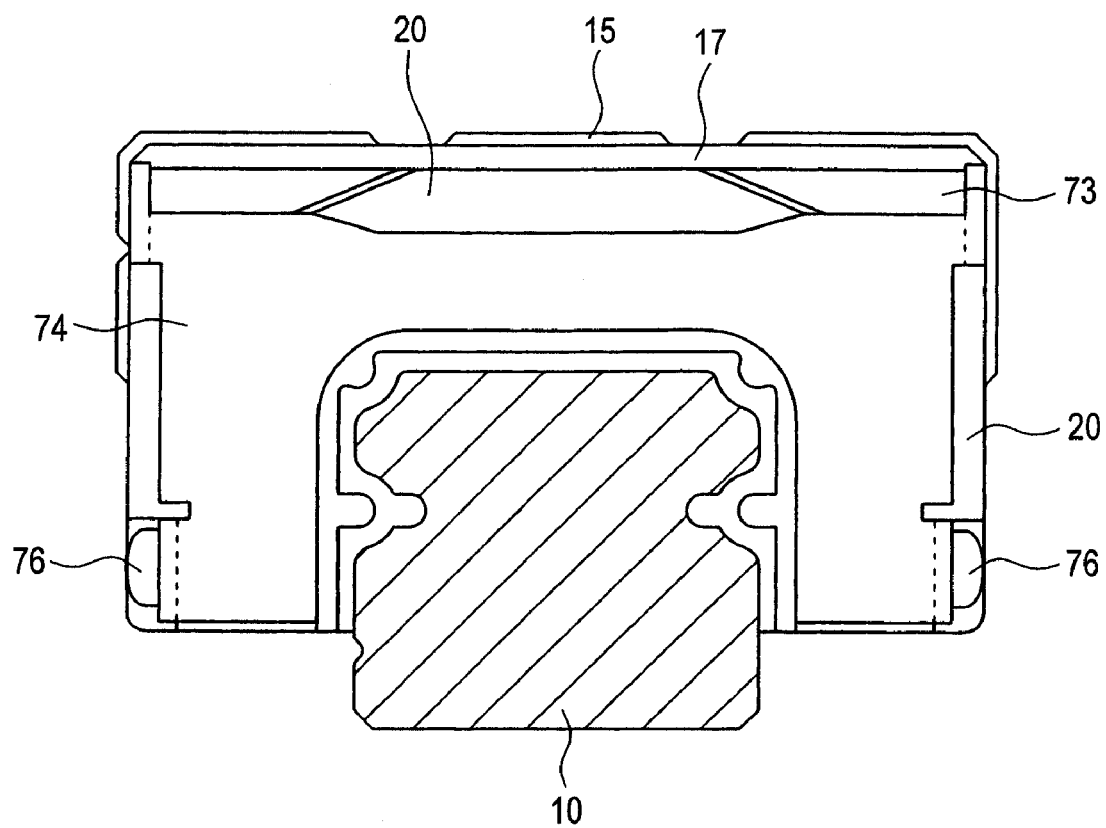
FIG. 35 is a partially sectional view taken along the line XXXV-XXXV in FIG. 34.
Figure 36:
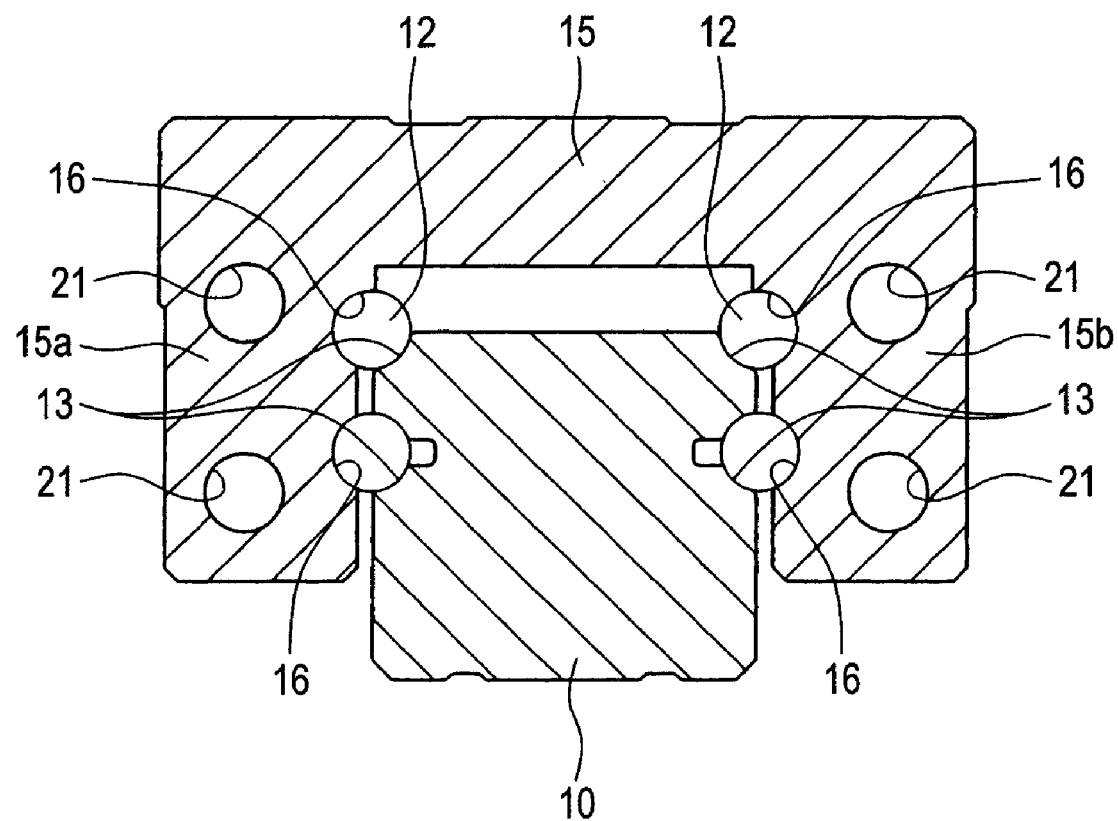
FIG. 36 is a sectional view taken along the line XXXVI-XXXVI in FIG. 34.

As shown in FIG. 34, a linear guide apparatus according to a seventh embodiment of the invention is made up of a slider 11 and a guide rail 10 which guides the slider 11, and a slider main body of the slider 11 is made up of a bearing 15, end caps 17, 17, return guides (not shown) and a large number of rolling elements 12. The slider 11 is made up of, in addition to the slider main body, side seals 20, lubricant application members 22 and lubricant application member retaining unit 72, which will all be described later, as well as other components which are added as required (for example, seal members other than the side seals, separators and the like).

The bearing 15 has arm portions 15a, 15b (refer to FIG. 36) which lie on left and right sides of the guide rail 10, and two rolling element rolling grooves 16 are formed on each of inner surfaces of these arm portions 15a, 15b along a longitudinal direction of the guide rail 10. In addition, an upper surface portion 15c of the bearing 15 is fixed to a lower surface of a slide table not shown.

The rolling element rolling grooves 16 face, respectively, rolling element rolling grooves 13 which are formed in two rows on each of left and right side surface portions of the guide rail 10, and the large number of spherical rolling elements 12, which are incorporated between the rolling element rolling surfaces 16 and the rolling element rolling surfaces 13, are designed to roll on groove surfaces of the rolling element rolling grooves 16 and the rolling element rolling grooves 13 as the slider moves relatively in the longitudinal direction of the guide rail 10.

The end caps 17, 17 are mounted on the bearing 15 in such a manner as to cover end faces of the bearing 15, and direction changing paths (not shown) are formed between the end caps 17, 17 and the return guides, not shown, where the rolling elements 12 which have finished rolling on the groove surface of the rolling element rolling grooves 16, 13 are made to change their directions so as to be introduced into rolling element return passages 21 (refer to FIG. 36) which are formed in the arm portions 15a, 15b of the bearing 15.

The side seals 20, 20, which seal gaps defined between the guide rail 10 and the end caps 17, are disposed in front of the end caps 17, 17, respectively, and plate-shaped lubricant application members 22 are provided, respectively, between the side seals 20, 20 and the end caps 17, 17 for applying lubricant to the rolling element rolling grooves 13 formed on the left and right side surface portions of the guide rail 10.

Figure 37:
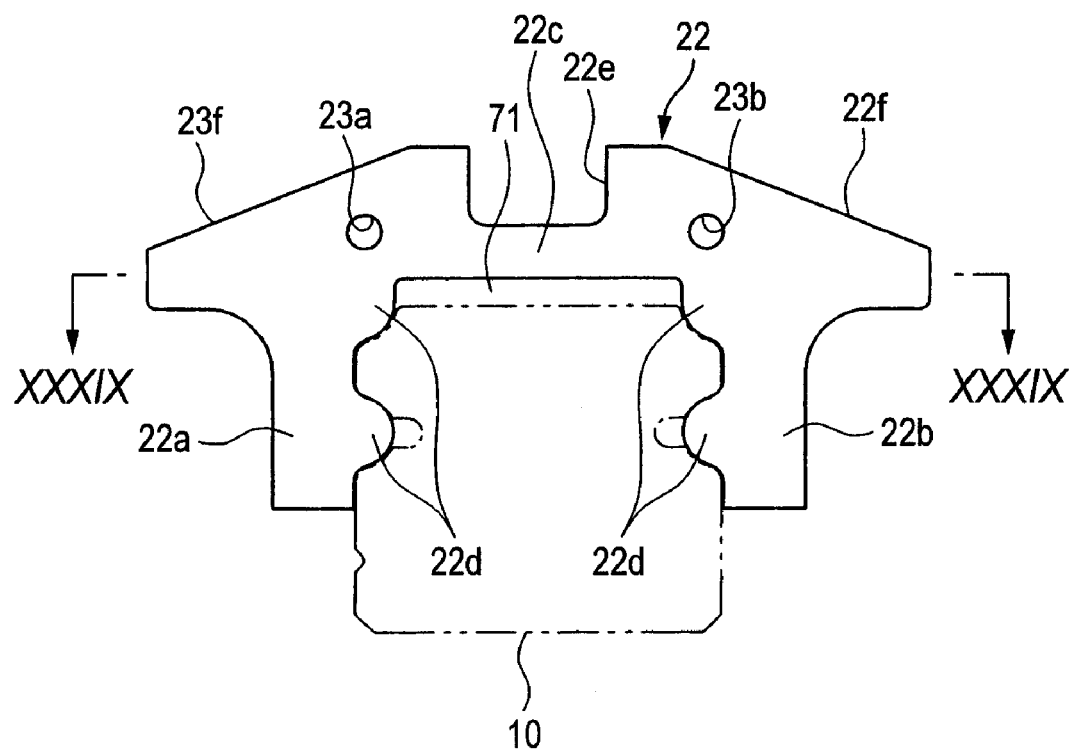
FIG. 37 is a front view of a lubricant application member shown in FIG. 34.
Figure 38:
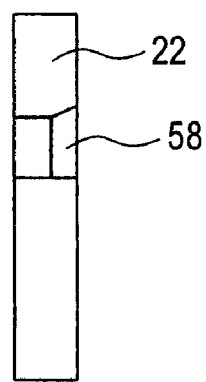
FIG. 38 is a side view of the lubricant application member shown in FIG. 37.
Figure 39:
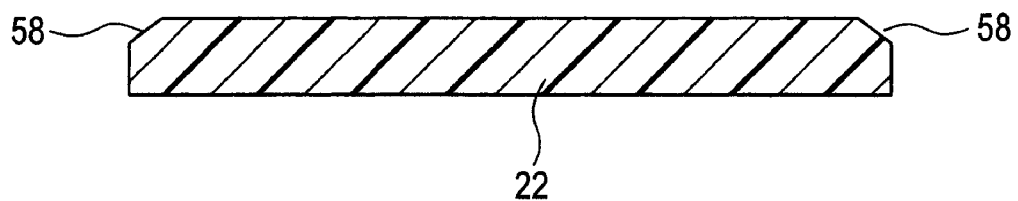
FIG. 39 is a sectional view taken along the line XXXIX-XXXIX in FIG. 37.

As is shown in FIG. 37, the lubricant application member 22 is made up of a pair of left and right rolling groove slide contact portions (arm portions) 22a, 22b which are brought into slide contact with the rolling element rolling grooves 13 formed on the left and right side surface portions of the guide rail 10 and a connecting portion 22c which connects together upper end portions of the rolling groove slide contact portions 22a, 22b in a position above the guide rail. A notched portion 22c is formed in a central portion of an upper surface of the connecting portion 22c for the purpose of facilitating the elastic deformation of the lubricant application member 22. In addition, four arc-shaped projections 22d (refer to FIG. 37) which function as rolling groove contact portions which are brought into slide contact with the rolling element rolling grooves 13 on the guide rail 10 are provided on the rolling groove slide contact portions 22a, 22b of the lubricant application member 22, so that lubricant is designed to be supplied from these arc-shaped projections 22d to the rolling element rolling grooves 13 on the guide rail 10. Note that while the lubricant application member 22 is described as being brought into contact with the guide rail 10 only at these arc-shaped projections 22d, the lubricant application member 22 may be brought into contact with other portions than the rolling element rolling grooves on the side surface portions of the guide rail 10.

Figure 40:
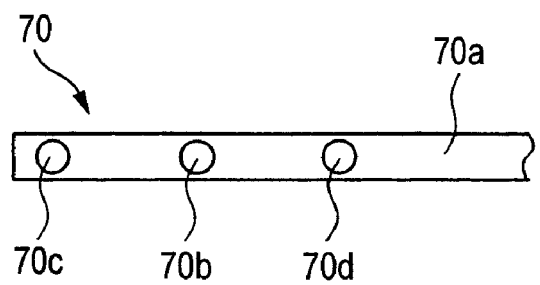
FIG. 40 is a front view showing an example of a lubricant application member replacement jig which is used when replacing the lubricant application member shown in FIG. 37.
Figure 41:
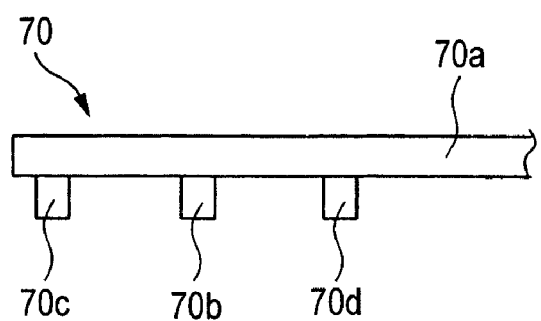
FIG. 41 is a plan view of the lubricant application member replacement jig shown in FIG. 40.
Figure 42:
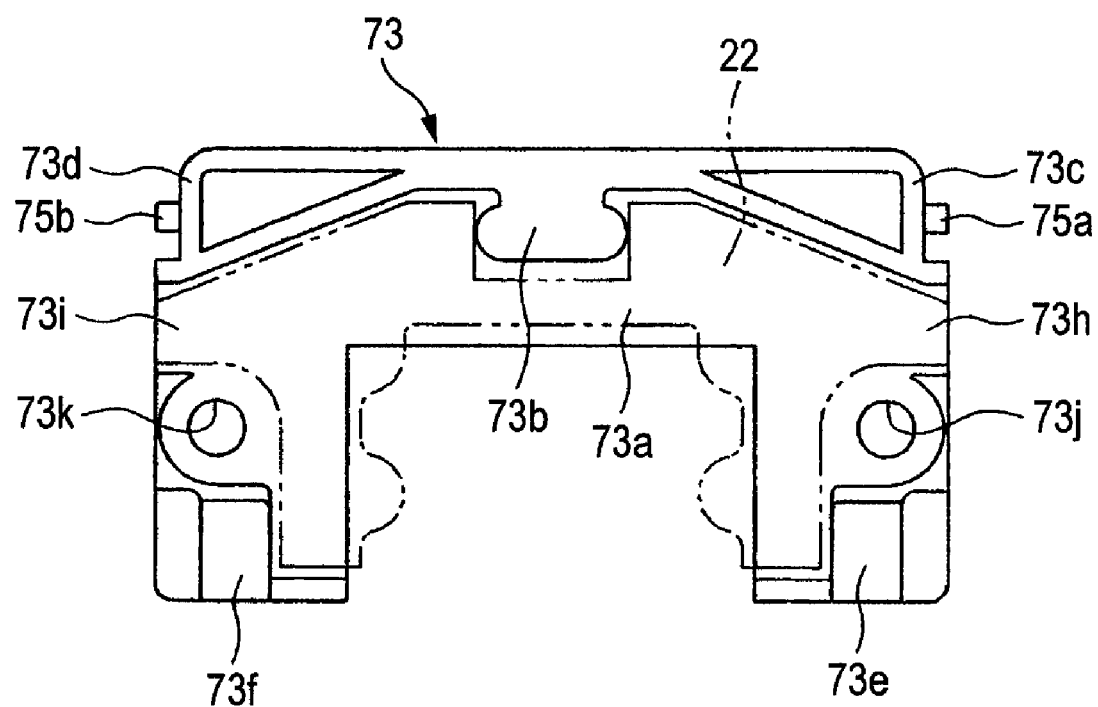
FIG. 42 is a front view of a cover member shown in FIG. 34.
Figure 43:
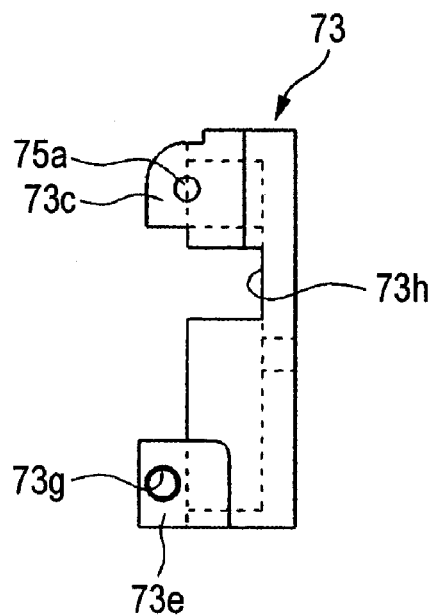
FIG. 43 is a side view of the cover member shown in FIG. 42.
Figure 44:
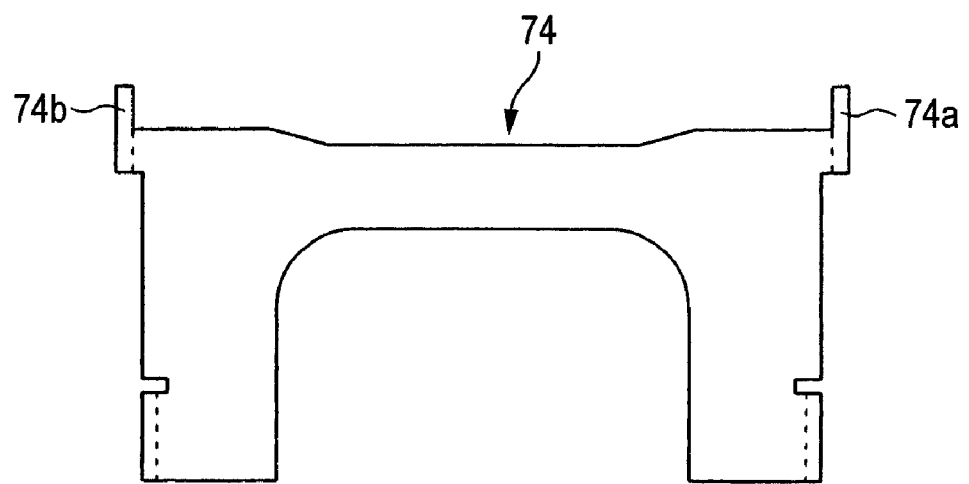
FIG. 44 is a front view of a side seal pressing plate shown in FIG. 34.
Figure 45:
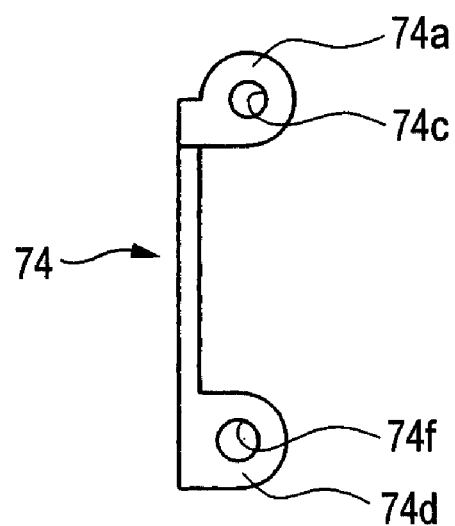
FIG. 45 is a side view of the side seal pressing plate shown in FIG. 44.
Figure 46:
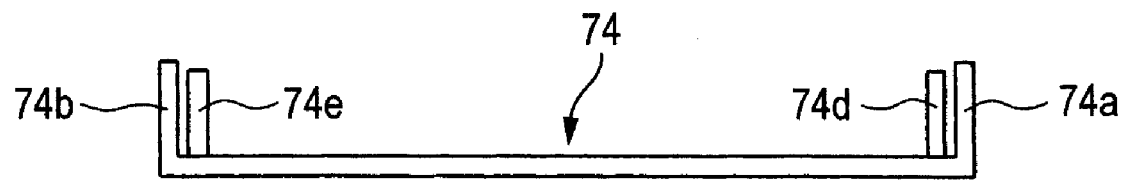
FIG. 46 is a plan view of the side seal press holding late shown in FIG. 45.

In addition, the lubricant application member 22 is made of a polymer material (for example, polyurethane rubber, polyolefin-based resin or the like) which contains a lubricant such as a synthetic oil of, for example, poly-alpha olefin (PAO) or mineral oil, and jig insertion recessed portions 58 (refer to FIGS. 38, 39) are provided on left and right side surface portions of the lubricant application member 22 in such a manner that the side surface portions are so recessed. In addition, the lubricant application member 22 has pin insertion holes 23a, 23b (refer to FIG. 37) on left and right sides of the notched portion 22e, so that pins 70c, 70d provided on a lubricant application member replacement jig 70 shown in FIGS. 40 and 41 are inserted when lubricant application members 22 are replaced. In addition, an upper surface portion of the connecting portion 22c of the lubricant application member 22 is formed into a slope portion 22f (refer to FIG. 37) on each of the left and right sides of the notched portion 22e in order to avoid the interference with the slide table. In addition, the connecting portion 22c of the lubricant application member 22 has a relief 71 relative to an upper portion of the guide rail 10. Due to the slope portion 22f and the relief 71, the replacement operation of lubricant application members 22 can be facilitated.

As is shown in FIGS. 40 and 41, the lubricant application member replacement jig 70 has a rod-shaped member 70a, and an engagement pin 70b, which is adapted to fit in the notched portion 22e formed in the central portion of the upper surface of the connecting portion 22c of the lubricant application member 22, is provided on the rod-shaped member 70a in such a manner as to project therefrom. Pins 70c, 70d, which are adapted to fit in the pin insertion holes 23a, 23b in the lubricant application member 22, are provided on the rod-shaped member 70a in such a manner as to project therefrom at an interval which is narrower than an interval at which the pin insertion holes 23a, 23b are provided. More specifically, when the lubricant application member 22 is elastically deformed in a direction in which the rolling groove slide contact portions 22a, 22b of the lubricant application member 20 move apart from each other and the engagement pins 70c, 70d of the lubricant application member replacement jig 70 are caused to fit in the pin insertion holes 23a, 23b, respectively, the central engagement pin 70b of the lubricant application member replacement jig 70 is brought into abutment with a bottom portion of the notched portion 22c. Accordingly, the lubricant application member 22 can be retained in three positions in a stable state. In addition, in this state, the lubricant application member is deformed in such a state that the lubricant application member 22 can be pulled out or pushed in relative to the guide rail 10 in a vertical direction as when lubricant application members 22 are replaced.

A lubricant application member retaining unit 72 (refer to FIG. 34) is provided between the end cap 17 and the lubricant application member 22 for retaining the side seal 20 and the lubricant application member 22 against the end portion of the slider 11. This lubricant application member retaining unit 72 is made up of a cover member 73 which covers side surface portions of the rolling groove slide contact portions 22a, 22b of the lubricant application member 22 and an upper surface portion of the connecting portion 22c, a side seal pressing plate 74 as a pressing plate which presses the a slider side end face of the side seal 20 towards the lubricant application member 22, pivot shafts 75a, 75b (refer to FIG. 42) which support pivotally an upper end portion of the side seal pressing plate 74 in such a manner as to rotate relative to the cover member 73, and two fastening screws 76 functioning as a pressing member fixing unit which fixes a lower end portion of the side seal pressing plate 74 to the cover member 73. The pivot shafts 75a, 75b are disposed at right angles to the left and right side surface portions of the guide rail 10 and horizontally relative to the upper surface portion of the guide rail 10. Note that while in FIG. 35 the pressing plate 74 is illustrated as being fixed to the cover member 73 with the two fastening screws 76, that is, on both sides in a width direction, the pressing plate 74 can be fixed to the cover member 73 only by either of them.

The cover member 73 has a U-shaped plate portion 73a (refer to FIG. 42) which is fixed to the slider main body or more specifically to the bearing 15 together with the end cap 17 with two fixing screws 28a, 28b, not shown, and a projection 73b is formed on the plate portion 73a in such a manner as to fit in the notched portion 22e in the lubricant application member 22. Furthermore, the cover member 73 has upper projecting pieces 73c, 73d which project in an opposite direction to the end cap 17, and the pivot shafts 75a, 75b project, respectively, from external surface of the upper projecting pieces 73c, 73d in a horizontal direction relative to the upper surface portion of the guide rail 10.

In addition, the cover member 73 has lower projecting pieces 73e, 73f which project in the opposite direction to the end cap 17 below fixing screws 28a, 28b. Threaded holes 73g (refer to FIG. 43) into which the fastening screws 76 thread fit are provided in the lower projecting pieces 73e, 73f. Furthermore, the cover member 73 has notched portions 73h, 73i, and these notched portions 73h, 73i are formed in the cover member 73 in such a manner as to correspond to the jig insertion recessed portions 58 which are provided by setting them back into the left and right side surface portions of the lubricant application member 22.

Note that 73j, 73k denote through holes through which fixing screws 28a, 28b (not shown) pass to fix the cover member 73 to the slider main body.

As has been described heretofore, the lubricant application member 22 has the notched portion 22e in the upper portion thereof so as to facilitate the elastic deformation of the lubricant application member 22, whereby the replacement operation of lubricant application members 22 is facilitated. On the other hand, when the lubricant application member 22 is accommodated within the cover member 73, the notched portion 22e fits on the projection 73b, whereby the lubricant application member 22 is put in a reinforced state, so that the arc-shaped projections 22d are brought into slide contact with the rolling element rolling grooves 13 on the guide rail 10 under an appropriate pressure.

The side seal pressing plate 74 has upper engagement pieces 74a, 74b (refer to FIGS. 44 and 46) which are adapted to be brought into engagement with external surfaces of the upper projecting pieces 73c, 73d of the cover member 73, and through holes 74c (refer to FIG. 45) are provided to be opened in the upper engagement pieces 74a, 74b in such a manner as to fit on the pivot shafts 75a, 75b, respectively. In addition, the side seal pressing plate 74 has lower engagement pieces 74d, 74e (refer to FIG. 46) which are adapted to be brought into engagement with external surfaces of the lower projecting pieces 73e, 73f of the cover member 73, and through holes 74f (refer to FIG. 45) through which the fastening screws 76 pass are provided to be opened in the lower engagement pieces 74d, 74e.

Figure 47:
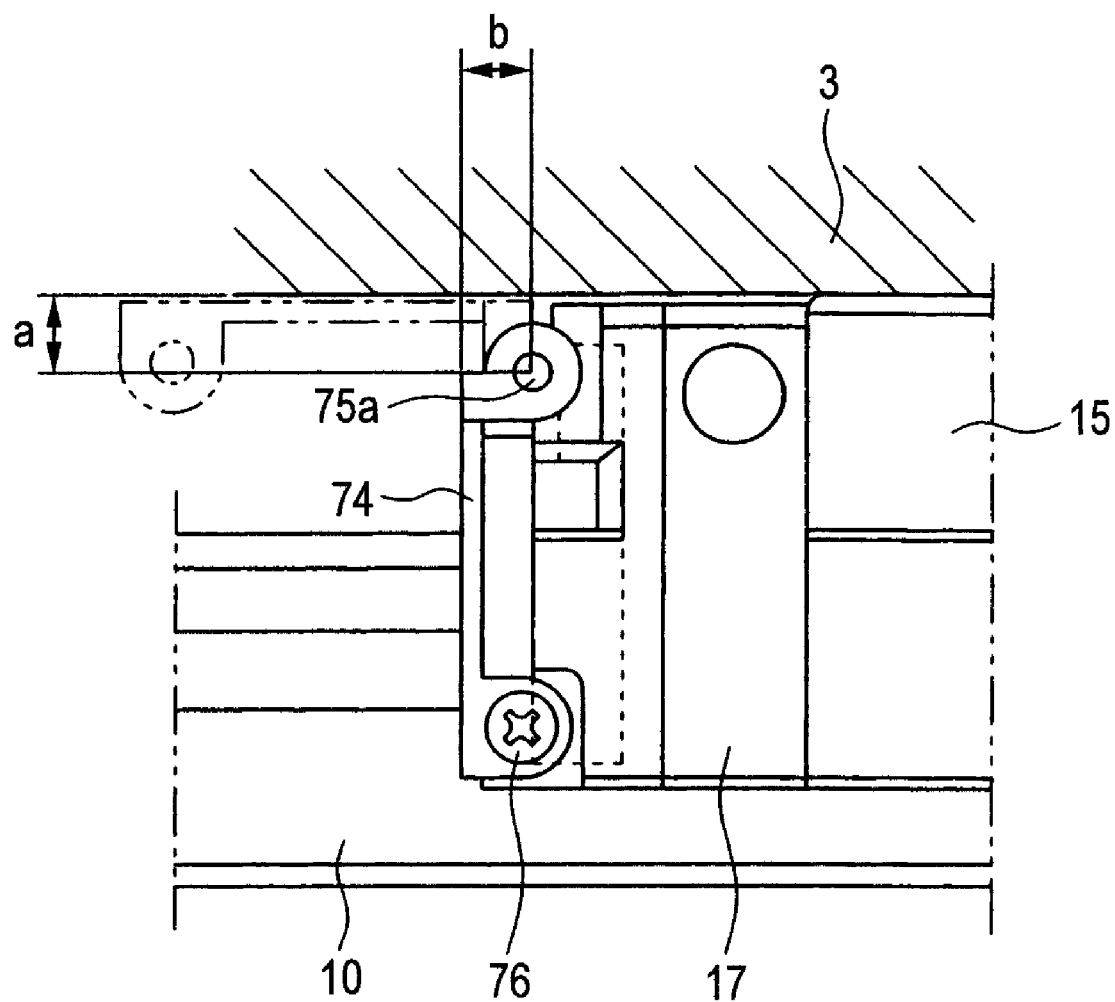
FIG. 47 is a side view showing part of the linear guide apparatus shown in FIG. 34.

FIG. 47 is a drawing which shows part of the linear guide apparatus in such a state that the slider 11 of the linear guide apparatus shown in FIG. 34 is fixed to a lower surface of a slide table 3. As is shown in the same figure, letting a distance from the center of the pivot shafts 75a, 75b to the lower surface of the slide table 3 be "a" and a distance from the center of the pivot shafts 75a, 75b to a front surface of the side seal pressing plate 74 in such a state that a lower end portion of the side seal pressing plate 74 is fixed to the cover member 73 with the fastening screws 76 as the pressing member fixing unit be "b", a>b.

Next, referring to FIG. 48, a procedure will be described which is followed when the lubricant application member 22 retained at the end portion of the slider 11 is replaced with a new lubricant application member.

Figure 48A:
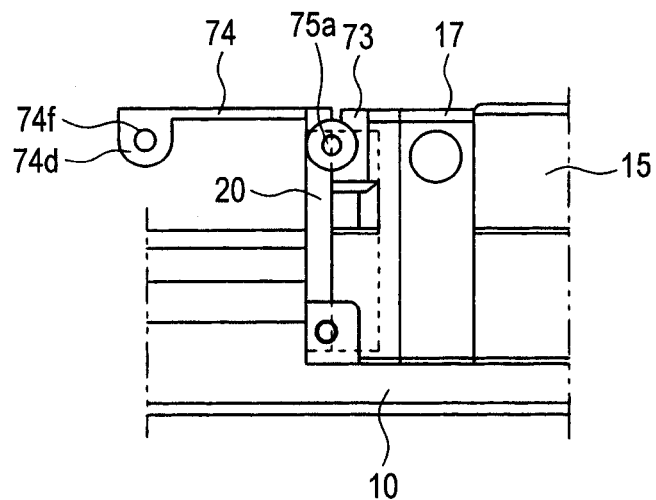
FIGS. 48A to 48C are drawings showing a procedure for replacing the lubricant application member retained at an end portion of a slider by a lubricant application member retaining unit with a new lubricant application member.
Figure 48B:
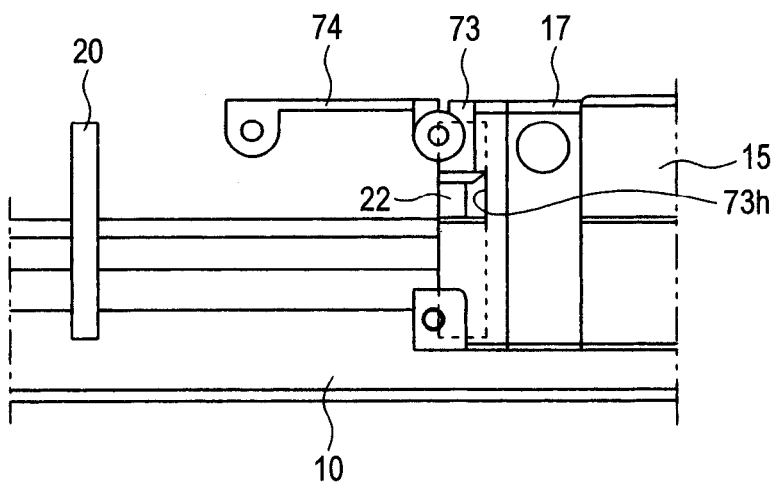
Figure 48C:
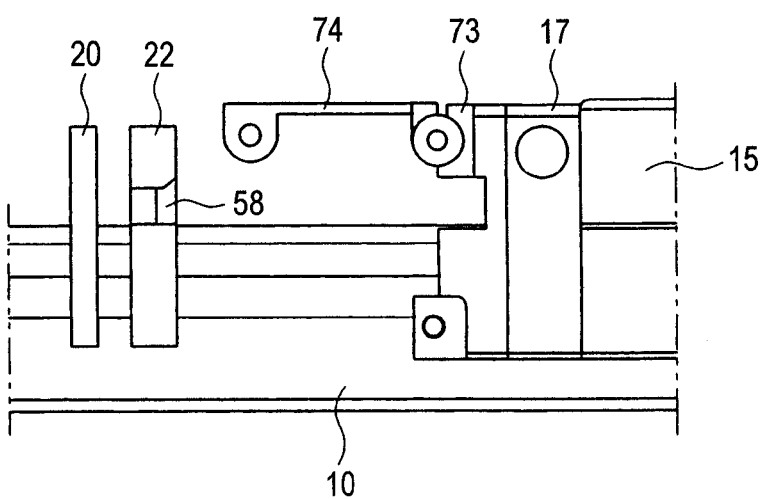

Firstly, after the fastening screws 76 are removed from the through holes 74f formed in the lower engagement pieces 74d, 74e of the side seal pressing plate 74, the side seal pressing plate 74 is operated to open (refer to FIG. 48A) about the pivot shafts 75a, 75b to a position where the side seal 20 which is retained at the end portion of the slider 11 is allowed to move in the longitudinal direction of the guide rail 10. Next, as is shown in FIG. 48B, after the side seal 20 is caused to move in the longitudinal direction of the guide rail 10, a rod-shaped jig such as forceps is inserted into the jig insertion recessed portion 58 provided by setting it back into the side wall portion of the lubricant application member 22 from the notched portion 73h or 73i of the cover member 73, so that the lubricant application member 22 is pushed out from the interior of the cover member 73 (refer to FIG. 48C). Then, the lubricant application member 22 pushed out from the interior of the cover member 73 is removed from the guide rail 10 for replacement with a new lubricant application member.

Next, referring to FIG. 49, a procedure will be described which is followed when the replacement operation of lubricant application members is carried out by employing the lubricant application member replacement jig 70 shown in FIG. 40.

Firstly, as is shown in FIG. 49A, the lubricant application member 22 is deformed elastically, and the engagement pin 70b provided on the rod-shaped member 70a of the lubricant application member replacement jig 70 in such a manner as to project therefrom is brought into engagement with the notched portion 22e formed in the central portion of the upper surface of the connecting portion 22c of the lubricant application member 22, the pins 70c, 70d as the engagement portions provided on the left and right sides of the engagement pin 70b being inserted, respectively, into the pin insertion holes 23a, 23b as the engaged portions provided on the lubricant application member 22, whereby the lubricant application member 22 is allowed to be retained on the jig 70. Next, as is shown in FIG. 49B, after the lubricant application member 22 is inserted between the lower surface of the slide table 3 and the upper surface portion of the guide rail 10, both the lubricant application member 22 and the lubricant application member replacement jig 70 are rotated through 90 degrees (refer to FIG. 49C). Thereafter, when the pins 70c, 70d of the lubricant application member replacement jig 70 are withdrawn from the pin insertion holes 23a, 23b of the lubricant application member 22, the arc-shaped projections 22d of the rolling groove slide contact portions 22a, 22b of the lubricant application member 22 are, as is shown in FIG. 49(d), allowed to fit in the rolling element rolling grooves 13 formed on the left and right side surface portions of the guide rail 10. Thereafter, firstly, the lubricant application member 22 is caused to move along the guide rail 10 until it is accommodated in the interior of the cover member, then, moving the side seal 20 along the guide rail 10 to a location neighboring the cover member 73, and following this, the side seal pressing plate 74 is rotated about the pivot shafts 75a, 75b to be closed, finally, the side seal pressing plate 74 being fixed to the cover member 73 with the fastening screws 76.

Figure 50:
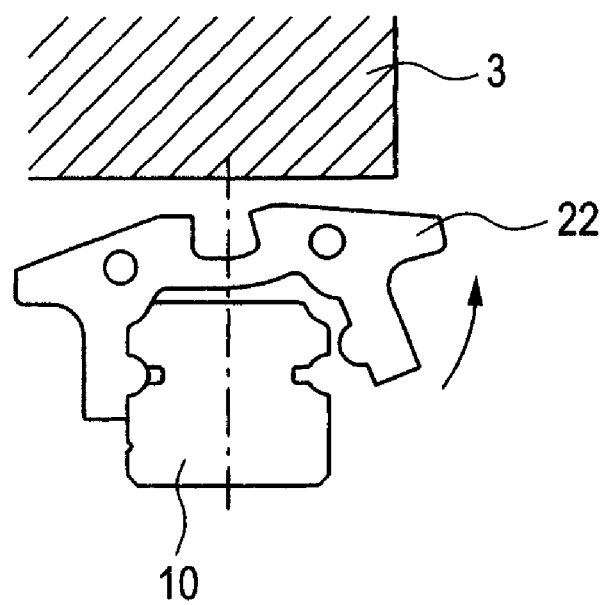
FIG. 50 is a drawing showing an example of a method for removing the lubricant application member from a guide rail.

In addition, when the lubricant application member 22 is removed from the guide rail 10, by elastically deforming the lubricant application member 22 in a way as shown in FIG. 50, the lubricant application member 22 can be removed from the guide rail 10.

As in the case of the seventh embodiment that has been described heretofore, in the event that the lubricant application member retaining unit 72, which is made up of the cover member 73 which covers the side surface portions of the rolling groove slide contact portions 22a, 22b and the upper surface portion of the connecting portion 22c of the lubricant application member, the side seal pressing plate 74 as the pressing member which presses and holds the slider side end face of the side seal 20 against the lubricant application member 22, the pivot shafts 75a, 75b which support pivotally the upper end portion of the side seal pressing plate 74 in such a manner as to rotate freely relative to the cover member 73 and the fastening screws 76 as the pressing member fixing unit for fixing the lower end portion of the side seal pressing plate 74 to the cover member 73, is provided between the end cap 17 and the lubricant application member 22, the side seal 20 and the lubricant application member 22 can be retained to the end portion of the slider without using fastening screws which pass through the side seal 20 and the lubricant application member 22. Consequently, the replacement operation of the lubricant application member 22 with a new one can be facilitated without requiring many labor hours and much time.

Furthermore, the fastening screw 76 which is effective in maintaining the side seal pressing plate 74 in the closed state more stably may be used on only either of the left and right sides which is selectively decided. Consequently, in particular, when the linear guide apparatus of this embodiment is adopted in, for example, the slide table apparatus shown in FIGS. 1 and 2, even in the event that the lubricant application member 22 which lies on the inner side (that is, the lubricant application member 22 which lies on the side of the slider 11A or 11B which faces the side of the slider 11B or 11A), the relevant lubricant application member 22 can easily be replaced with a new one without disassembling the slide table apparatus. Namely, fixing by the fastening screw 76 may be carried out on a side which corresponds to the external side in the width direction of the slide table 3 (the end portion side in the direction which intersects the traveling direction of the slide table 3 at right angles). Namely, when fixing the side seal pressing plate 74 to the cover member 73 with the fastening screw 76, of the lower engagement pieces 74d, 74e of the side seal pressing plate 74, the lower engagement piece which lies on the external side in the width direction of the slide table 3 can be selected. Consequently, even when the side seal pressing plate 74 on either side of the slider 11A or 11B is attempted to be fixed, the side can be selected which facilitates the work. Moreover, since the fastening screw 76 only has to be mounted and dismounted from the lateral side where the space is secured, the work can be carried out simply and easily.

In addition, since the side seal pressing plate is made to hold the side seal by its surface, the side seal can be fixed in a stable state.

Additionally, when a relief 71 relative to the upper surface portion of the guide rail 10 is provided on the connecting portion 22c of the lubricant application member 22, since the interference of the connecting portion 22c of the lubricant application member 22 with the upper surface portion of the guide rail 10 can be prevented when the replacement of the lubricant application member 22 is carried out, the replacement operation can be performed easily.

In addition, both sides of an upper side of the lubricant application member 22 are formed into a shape whose height is decreased towards end portions. Due to this, even in the event that the lubricant application member 22 is oriented, in particular, as shown in FIG. 49C with the lubricant application member 22 elastically deformed in association with the replacement operation of the lubricant application member 22, the interference with the lower surface of the slide table and the upper surface portion of the guide rail 10 can be prevented, and consequently, the replacement operation can be facilitated.

Additionally, when a horizontal distance "b" from the center of the pivot shafts 75a, 75b to a front surface of the side seal pressing plate 74 is made smaller than a vertical distance "a" from the center of the pivot shafts 75a, 75b to the lower surface of the slide table 3 in such a state that the side seal pressing plate 74 is closed or in such a state that the lower end portion of the side seal pressing plate 74 can be fixed to the cover member 73 by means of the fastening screws 76 as the pressing member fixing unit, a space which avoids the interference of the side scale press holding late 74 with the slide table 3 is formed between the slide table 3 and the side seal pressing plate 74. Consequently, the interference of the side seal pressing plate 74 with the slide table 3 can be prevented when the side seal pressing plate 74 is opened about the pivot shafts 75a, 75b through 90 degrees from the state in which the cover member 73 is closed (the state shown in FIG. 34), whereby the replacement operation of the lubricant application member 22 with a new one can be facilitated.

Figure 51:
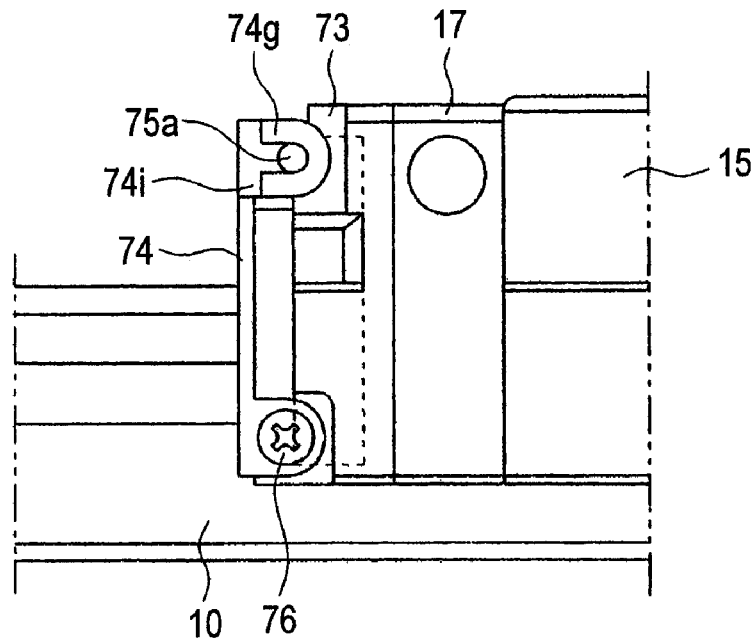
FIG. 51 is a side view of a linear guide apparatus according to an eighth embodiment of the invention.
Figure 52A:
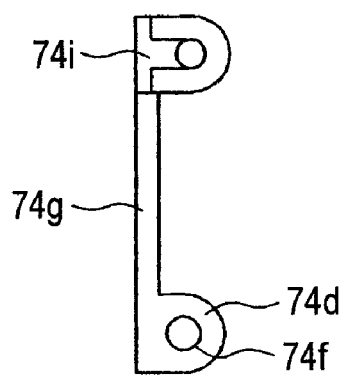
FIGS. 52A and 52B are side views of a side seal pressing plate shown in FIG. 51.
Figure 52B:
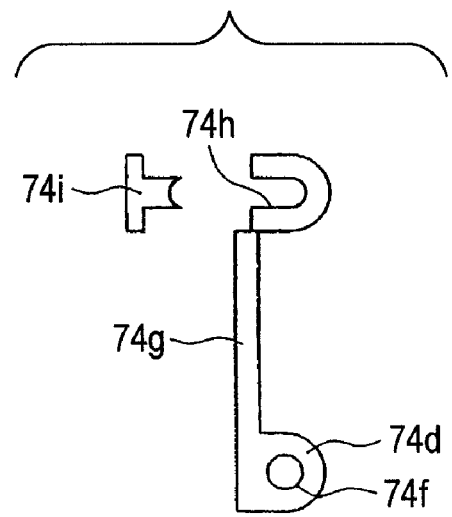

While in the seventh embodiment that has been described above, the side seal pressing plate having the through holes 74c which fit on the pivot shafts 75a, 75b is illustrated as being used as the side seal pressing plate which presses and holds the slider side end face of the side seal 20 against the lubricant application member 22 and the pivot shafts 75a, 75b are illustrated as being brought into engagement with the through holes 74c through elastic deformation of the side seal pressing plate or the cover member, the invention is not limited thereto. For example, as in the case of an eighth embodiment shown in FIGS. 51 and 52, as the side seal pressing plate 74 which presses and holds the slider side end face of the side seal 20 against the lubricant application member 22, a side seal pressing plate may be used which is made up of a pressing plate main body 74a having a pair of left and right U-shaped notched portions 74h and fitting members 74i adapted to fit in the U-shaped notched portions 74h of the pressing plate main body 74g.

Figure 53:
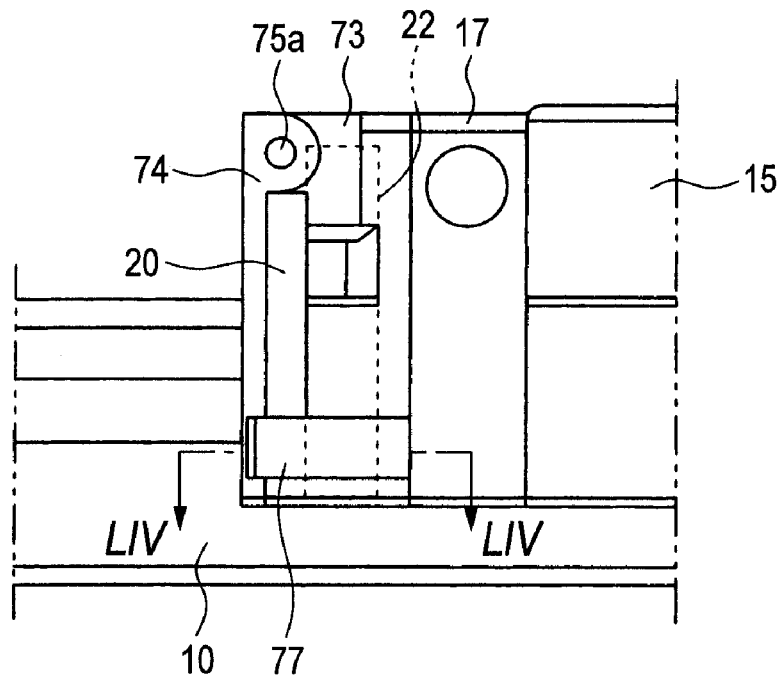
FIG. 53 is a side view of a linear guide apparatus according to a ninth embodiment of the invention.
Figure 54:
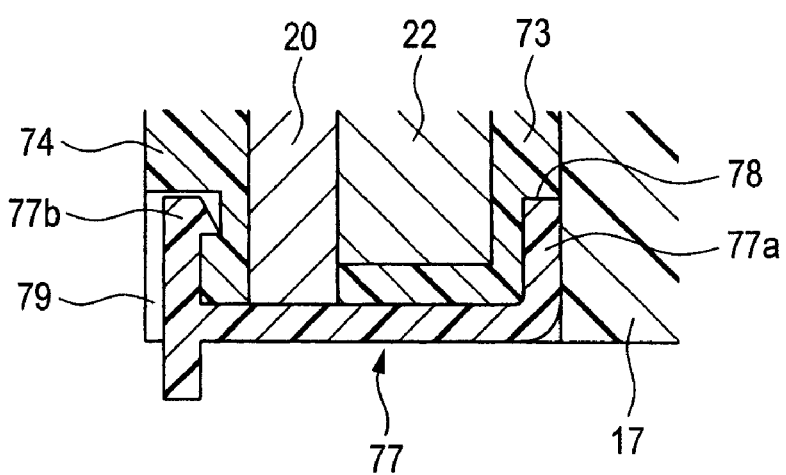
FIG. 54 is a sectional view taken along the line LIV-LIV in FIG. 53.

Furthermore, while in the seventh embodiment that has been described above, the fastening screws 76 are illustrated as function as the pressing member fixing unit which fixes the lower end portion of the side seal pressing plate 74 to the cover member 73, the invention is not limited thereto. For example, as in the case of a ninth embodiment shown in FIGS. 53 and 54, as the pressing member fixing unit which fixes the lower end portion of the side seal pressing plate 74 to the cover member 73, a resin clip 77 may be used which has projections 77a adapted to fit in groove portions 78 formed on side surface portions of a cover member 73 and claw portions 77b adapted to fit in groove portions formed on side surface portions of a side seal pressing plate 74. The clip 77 is preferably such as to be deformed elastically so as to be removed freely.

Figure 55:
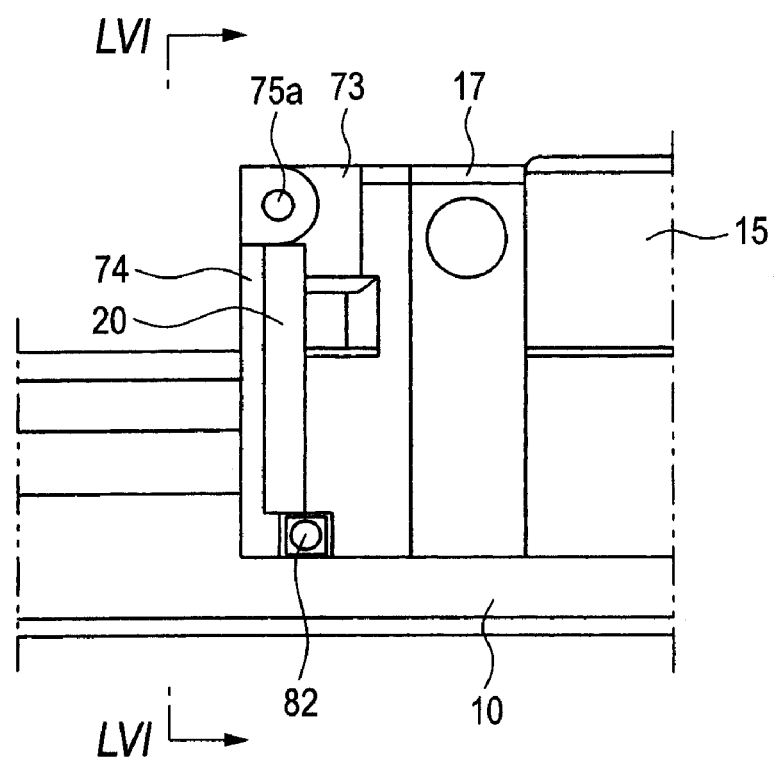
FIG. 55 is a side view of a linear guide apparatus according to a tenth embodiment of the invention.
Figure 56:
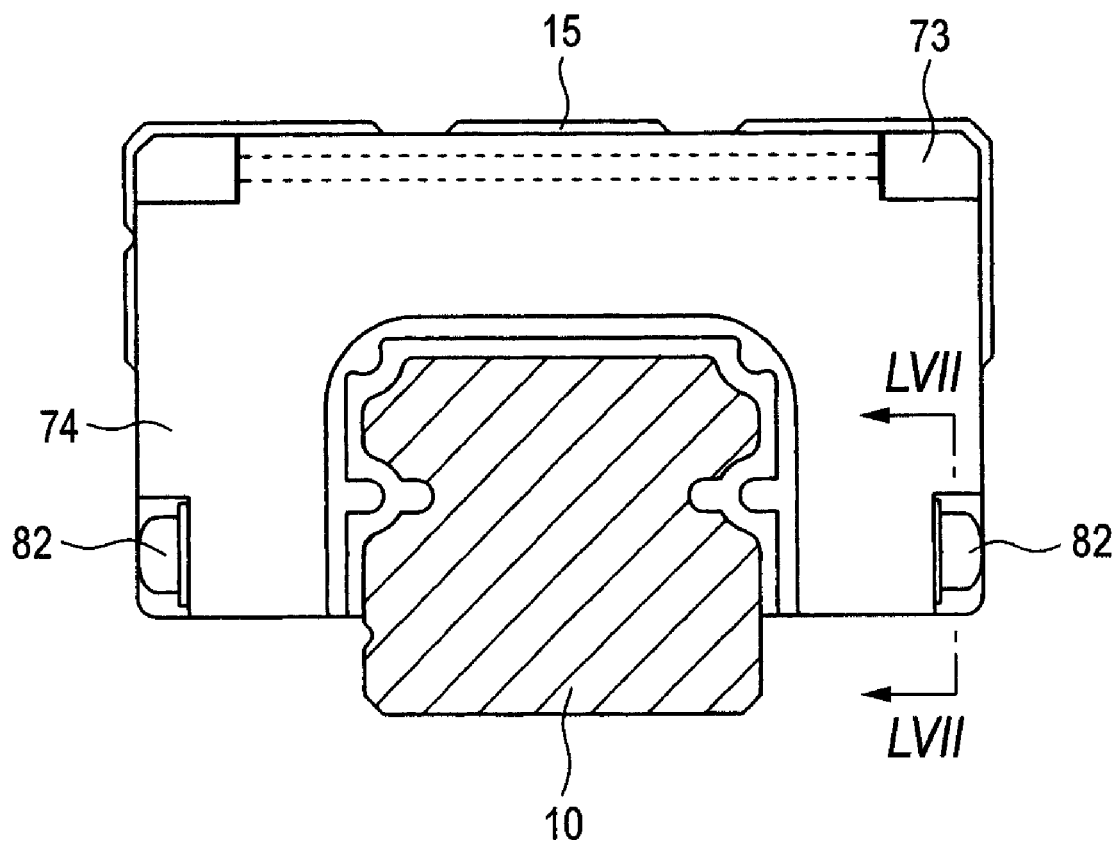
FIG. 56 is a sectional view taken along the line LVI-LVI in FIG. 55.
Figure 57:
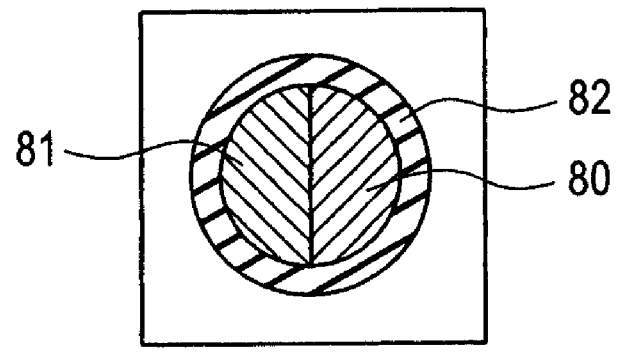
FIG. 57 is a sectional view taken along the line LVII-LVII in FIG. 56.
Figure 58:
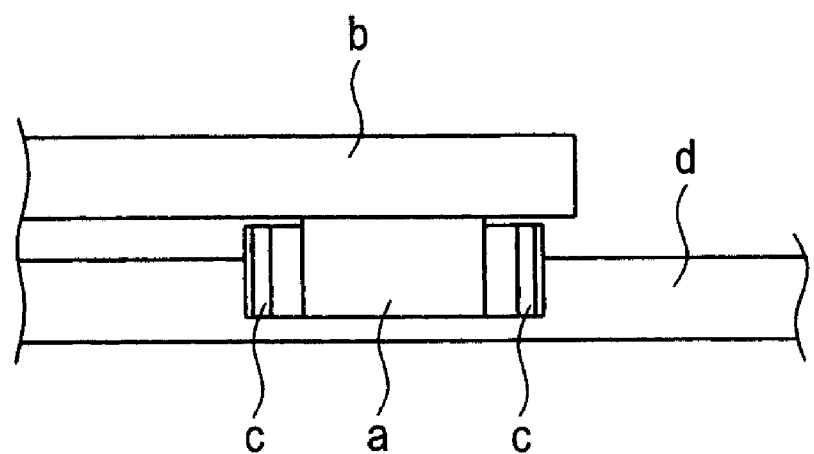
FIG. 58 is a drawing showing a conventional example.

In addition, as in the case of a tenth embodiment shown in FIGS. 55 to 57, as the pressing member fixing unit which fixes the lower end portion of the side seal pressing plate 74 to the cover member 73, cap-shaped components 82 may be used which are adapted to fit on both semicircular projections 80 provided on side surface portions of a cover member 73 and semicircular projections 81 provided on side surface portions of a side seal pressing plate 74.

While in the first to tenth embodiments that have been described above, the slider 11 is described as having the side seals 20, 20, the invention is not limited thereto. The invention can be applied to a linear guide apparatus in which a slider has no side seal.

In addition, while in the first to tenth embodiments that have been described above, the invention is described as being applied to the rolling-guide type linear guide apparatus, the invention is not limited thereto. For example, the invention can be applied to a slide-guide type linear guide apparatus in which a slider has neither rolling elements nor end caps.

Additionally, while in the first to tenth embodiments that have been described above, the invention is described as being applied to the rolling-guide type linear guide apparatus in which the balls are used as the rolling elements, the invention is not limited thereto. The invention can be applied to rolling-guide type linear guide apparatuses in which other types of rolling elements including a substantially cylindrical rolling element are used.

Furthermore, while the invention is described as being applied to the linear guide apparatus which uses the straight-line guide rail, the invention can be applied to a guide system which uses a curved guide rail.

While in the first to tenth embodiments that have been described above, as the lubricant application member for applying lubricant to the rolling element rolling grooves formed on the left and right side surface portions of the guide rail, the lubricant application member is illustrated which is made of the polymer material containing a lubricant, the invention is not limited thereto. Any type of lubricant application member can be used, provided that it is elastically deformed in the width direction of the guide rail. For example, the invention can be applied to a linear guide apparatus in which a lubricant application member is made of a felt-like material which contains, for example, grease or oil.

In addition, while as the slide table apparatus which uses any of the linear guide apparatuses set forth in the first to tenth embodiments, the invention is described as being applied to the slide table apparatus in which the two sliders are assembled on to each of the two guide rails. However, the number of sliders that are to be assembled on to each guide rail is not limited thereto, one or three or more sliders may be assembled on to each guide rail.

In addition, while in the embodiments above, the three types of jigs 35, 60, 70 are illustrated as the examples of the lubricant application member replacement jigs, the invention is not limited thereto but can be modified as required. While in the embodiments, on the lubricant application member replacement jigs, the cylindrical pins are provided as the engagement portions and, on the lubricant application members, the pin insertion holes or the like into which the cylindrical pins can be inserted are provided as the engaged portions, the combination of the engagement portions and the engaged portions is not limited thereto. Any combination may be adopted, provided that the combination can retain the lubricant application member in such a state that it is elastically deformed.

Additionally, while in the lubricant application member replacement jig 70, the positional relationship between the pins 70b, 70c, 70d is fixed, for example, using the position of the intermediate pin 70b as the fulcrum, a distal portion lying further forwards than the fulcrum may be made into a jig which can be operated to rotate, whereby the lubricant application member is switched between a state where it is elastically deformed and a state where it is not elastically deformed by rotating the distal portion of the jig.

In addition, when on the respective lubricant application members, engaged portions which are formed to correspond to the respective lubricant application member replacement jigs 35, 60, 70 and their modified examples are provided, the respective lubricant application member replacement jigs 35, 60, 70 and their modified examples can be applied to replace such the lubricant application members having engaged portions.

What is claimed is:

1. A linear guide apparatus comprising:
a guide rail;
a slider which moves relatively in a longitudinal direction of the guide rail and includes a slider main body;
a lubricant application member containing a lubricant and provided at an end portion of the slider main body; and
a pressing member provided on a front side of the lubricant application member, wherein
the pressing member is brought into engagement with a side surface of the slider so that the lubricant application member is fixed to the slider.

2. A linear guide apparatus comprising:
a guide rail; and
a slider which moves relatively in a longitudinal direction of the guide rail,
wherein the slider comprises:
a slider main body having an end cap;
a side seal which seals a gap between the guide rail and the end cap;
a lubricant application member interposed between the side seal and the end cap;
a side seal fixing unit disposed between the end cap and the lubricant application member, and comprising:
a pressing member which presses the side seal against the lubricant application member;
a pivot shaft provided at one end portion of the pressing member along a height direction of the guide rail; and
a support plate which rotatably supports the pressing member via the pivot shaft.

3. The linear guide apparatus as set forth in claim 2, wherein
the support plate is fixed to the end cap with a plurality of bolts.

4. The linear guide apparatus as set forth in claim 2, wherein
the support plate comprises a recessed portion on a side surface portion thereof,
the pressing member has a locking projection at an opposite end side of the pivot shaft so as to fit in the recessed portion.

5. A linear guide apparatus comprising:
a guide rail; and
a slider which moves relatively in a longitudinal direction of the guide rail,
wherein the slider comprises:
a slider main body having an end cap;
a side seal which seals a gap between the guide rail and the end cap;
a lubricant application member interposed between the side seal and the end cap;
a side seal fixing unit comprising:
a pressing member which presses the side seal against the lubricant application member and comprises raised portions or recessed portions; and
a lubricant application member receiving member provided between the end cap and the lubricant application member,
wherein the lubricant application member receiving member comprises locking portions which are brought into engagement with the raised portions or recessed portions of the pressing member and are provided on left and right side surface portions.

6. A linear guide apparatus comprising:
a guide rail;
a slider provided so as to move in a direction in which the guide rail extends, the slider comprising:
a slider main body;
a seal member disposed at an end portion of the slider main body in a moving direction thereof; and
a lubricant application member interposed between the seal member and the slider main body for application of a lubricant;
a seal retaining member which is interposed between the slider main body and the lubricant application member and retains the seal member against the slider main body; and
a seal pressing member which presses the seal member from an outside of the seal retaining member, wherein
the seal pressing member is brought into contact with the seal member over a surface, or at a plurality of points or lines which are not aligned in a straight line.

7. The linear guide apparatus as set forth in claim 6, wherein
the seal retaining member comprising:
a projecting portion which projects substantially in a moving direction of the slider while avoiding the lubricant application member and the seal member; and
an elastic projecting portion which projects substantially in the moving direction of the slider while avoiding the lubricant application member and the seal member and has elasticity, wherein
the seal pressing member and the seal member are retained by bringing the seal pressing member into engagement with the projecting portion by virtue of the elasticity of the elastic projecting portion.

8. The linear guide apparatus as set forth in claim 6, wherein
the seal retaining member comprising an elastic projecting portion which projects substantially in a moving direction of the slider while avoiding the lubricant application member and the seal member and has elasticity,
the seal pressing member has a projecting portion which projects substantially in the moving direction of the slider while avoiding the lubricant application member and the seal member, and
the seal pressing member and the seal member are retained by bringing the projecting portion of the seal pressing member into engagement with the slider main body by virtue of the elasticity of the elastic projecting portion.

9. The linear guide apparatus as set forth in claim 6, comprising:
a seal pressing member fixing member which projects substantially in a moving direction of the slider from the slider main body while avoiding the lubricant application member and the seal member to be brought into engagement with the seal pressing member.

10. The linear guide apparatus as set forth in claim 9, wherein
the seal pressing member is fixed to the seal retaking member by the seal pressing member fixing member which is provided between the slider main body and the seal pressing member.

11. The linear guide apparatus as set forth in claim 10, wherein
the seal pressing member fixing member comprises:
a pair of left and right plate-shaped elastic pieces which are elastically deformable in a width direction of the slider; and
claw portions at distal end portions of the plate-shaped elastic pieces which are brought into engagement with left and right side surface portions of the seal pressing member.

12. The linear guide apparatus as set forth in claim 9, wherein
the seal pressing member comprises a positioning portion which fits on a projection which projects from the seat retaining member for positioning the seal pressing member in such a state that the seal pressing member floats above an upper surface of the guide rail.

13. The linear guide apparatus as set forth in claim 12, wherein
a cross section of the projection is a square shape.

14. A linear guide apparatus comprising:
a guide rail;
at least one slider provided so as to move in a direction in which the guide rail extends, the slider comprising:
a slider main body; and
a lubricant application member which is disposed at an end portion of the slider main body in a moving direction thereof and contains a lubricant;
a lubricant application member retaining unit comprising:
a cover member which is fixed to an end portion of the slider main body and accommodates therein the lubricant application member;
a plate-shaped pressing member provided on a front side of the cover member; and
a pivot shaft which supports pivotally an upper end portion of the pressing member so that the upper end portion of the pressing member rotates freely relative to the cover member.

15. The linear guide apparatus as set forth in claim 14, wherein
the pivot shaft is disposed at right angles to the direction in which the guide rail extends and horizontally relative to an upper surface portion of the guide rail and
the lubricant application member retaining unit comprises a pressing member fixing unit which fixes a lower end portion of the pressing member to the cover member.

16. The linear guide apparatus as set forth in claim 15, wherein
a horizontal distance from the center of the pivot shaft to a front surface of the pressing member in such a state that the pressing member is closed is made smaller than a vertical distance from the center of the pivot shaft to an upper surface of the slider main body.

17. The linear guide apparatus as set forth in any one of claims 1 through 16, wherein
the slider main body comprises:
a bearing having arm portions lying on left and right sides of the guide rail; and
a large number of rolling elements which are incorporated between rolling element rolling grooves formed on inner surfaces of the arm portions of the bearing and rolling element rolling grooves formed on left and right side surface portions of the guide rail, wherein
the lubricant application member comprises:
a pair of left and right rolling groove slide contact portions which are brought into slide contact with the rolling element rolling grooves formed on the left and right side surface portions of the guide rail; and
a connecting portion which connects together upper end portions of the rolling groove slide contact portions at a position above the guide rail.

18. The linear guide apparatus as set forth in claim 17, wherein
the connecting portion of the lubricant application member has a relief relative to the upper surface portion of the guide rail.

19. A slide table apparatus comprising:
a base;
at least two sets of linear guide apparatuses which are disposed in parallel to each other on the base and each of which comprises:
a guide rail; and
at least one slider which moves relatively in a direction in which the guide rail extends; and
a slide table to which upper surfaces of the sliders of the linear guide apparatuses are fixed and is movably guided relative to the base, wherein
the linear guide apparatuses are a linear guide apparatus as set forth in claim 18.

20. The slide table apparatus as set forth in claim 19, wherein
the linear guide apparatuses are the linear guide apparatus as set forth in claim 14, and
a horizontal distance from the center of the pivot shaft to a front surface of the pressing member in such a state that the pressing member is closed is made smaller than a vertical distance from the center of the pivot shaft to a lower surface of the slide table.

21. A lubricant application member replacement jig used when a lubricant application member as set forth in claim 18 is replaced, comprising:
at least two engagement portions which are brought into engagement with the lubricant application member and elastically deform the lubricant application member in such a manner as to be freely pushed in or pulled out relative to the guide rail in a vertical direction.

22. The lubricant application member replacement jig as set forth in claim 21, wherein
the engagement portions comprise a pair of left and right pins, and
the lubricant application member replacement jig further comprises a pair of operation members which operate to open and close the pair of pins in a width direction of the lubricant application member.

23. The lubricant application member replacement jig as set forth in claim 21, wherein
the engagement portions comprise two pins which fit, respectively, in two pin insertion holes provided in advance in the lubricant application member, and
a space between the pins is smaller than a space between the pin insertion holes.

24. The lubricant application member replacement jig as set forth in claim 23, wherein
an engagement pin which is brought into engagement with a notched portion formed in a central portion on an upper surface of the lubricant application member is provided between the two pins.

* * * * *